United States Patent
Zhdankin et al.

(10) Patent No.: US 12,443,344 B2
(45) Date of Patent: Oct. 14, 2025

(54) SUBMISSION QUEUE ENTRY AGE TRACKING

(71) Applicant: Samsung Electronics Co., Ltd., Suwon-si (KR)

(72) Inventors: Vasili Viktorovich Zhdankin, Prior Lake, MN (US); Kiran Kumar Muralidharan, Karnataka (IN); Vipin Kumar Agrawal, San Jose, CA (US); Sumanth Jannyavula Venkata, Pleasanton, CA (US); Chun-Chu Chen-Jhy Archie Wu, San Carlos, CA (US)

(73) Assignee: SAMSUNG ELECTRONICS CO., LTD. (KR)

(*) Notice: Subject to any disclaimer, the term of this patent is extended or adjusted under 35 U.S.C. 154(b) by 134 days.

(21) Appl. No.: 17/972,574

(22) Filed: Oct. 24, 2022

(65) Prior Publication Data

US 2024/0061580 A1 Feb. 22, 2024

Related U.S. Application Data

(60) Provisional application No. 63/399,578, filed on Aug. 19, 2022.

(51) Int. Cl.
*G06F 3/06* (2006.01)
(52) U.S. Cl.
CPC ............ *G06F 3/061* (2013.01); *G06F 3/0644* (2013.01); *G06F 3/0683* (2013.01)

(58) Field of Classification Search
CPC ....... G06F 3/061; G06F 3/0644; G06F 3/0683
See application file for complete search history.

(56) References Cited

U.S. PATENT DOCUMENTS

| | | | |
|---|---|---|---|
| 9,069,485 B2 | 6/2015 | Manula et al. | |
| 10,019,181 B2 | 7/2018 | Singh et al. | |
| 10,466,903 B2 | 11/2019 | Benisty et al. | |
| 10,572,185 B2 | 2/2020 | Hahn et al. | |
| 10,642,536 B2 | 5/2020 | Chaturvedi et al. | |
| 10,817,446 B1 | 10/2020 | Saxena | |
| 11,169,938 B2 | 11/2021 | Gissin et al. | |
| 2003/0182506 A1* | 9/2003 | Kusumi | G06F 13/385 711/112 |

(Continued)

FOREIGN PATENT DOCUMENTS

KR 20210148852 A 12/2021

OTHER PUBLICATIONS

Awad, Amro Jihad, "Towards Efficient Integration of Emerging NVM Technologies in Future Systems," North Carolina State University ProQuest Dissertations Publishing, 2016, 207 pages.

(Continued)

*Primary Examiner* — Jae U Yu
(74) *Attorney, Agent, or Firm* — Renaissance IP Law Group LLP

(57) ABSTRACT

A storage device is described. A first storage may store a data. An interface may be used to access a command from a host, the command applicable to the data. A controller may execute the command. A second storage may store an entry. The entry may include a first data field for a timestamp and a second data field for a reference to the command.

20 Claims, 28 Drawing Sheets

(56) References Cited

U.S. PATENT DOCUMENTS

| | | | |
|---|---|---|---|
| 2008/0077764 A1* | 3/2008 | Pierce | G06F 12/123 |
| | | | 711/E12.072 |
| 2014/0331001 A1 | 11/2014 | Liu et al. | |
| 2015/0186068 A1 | 7/2015 | Benisty et al. | |
| 2017/0115923 A1* | 4/2017 | Hurvitz | G06F 12/023 |
| 2017/0177241 A1 | 6/2017 | Erickson et al. | |
| 2018/0314421 A1 | 11/2018 | Linkovsky et al. | |
| 2019/0121545 A1 | 4/2019 | La Fratta et al. | |
| 2019/0303024 A1 | 10/2019 | Iwai et al. | |
| 2020/0326890 A1 | 10/2020 | Benisty | |
| 2021/0374079 A1 | 12/2021 | Shin et al. | |

OTHER PUBLICATIONS

Gugnani, Shashank et al., "Analyzing, Modeling, and Provisioning QoS for NVMe SSDs," 2018 IEEE/ACM 11th International Conference on Utility and Cloud Computing (UCC), IEEE, 2018, pp. 247-256.

European Extended Search Report for Application No. 23183520.8, mailed Jan. 17, 2024.

European Office Action for Application No. 23183520.8, mailed Oct. 29, 2024.

European Office Action for Application No. 23183520.8, mailed Feb. 17, 2025.

European Office Action for Application No. 23183520.8, mailed May 12, 2025.

\* cited by examiner

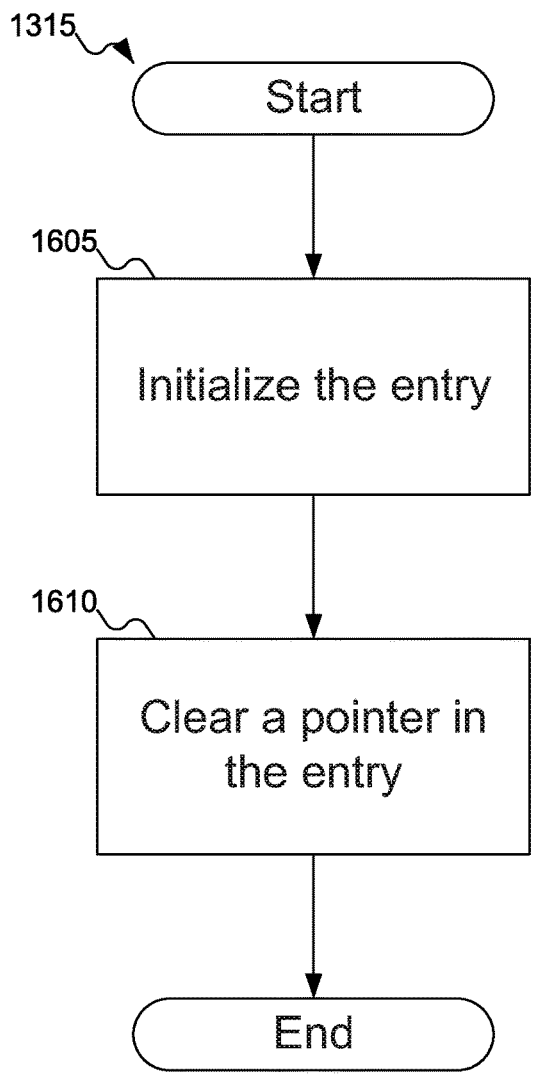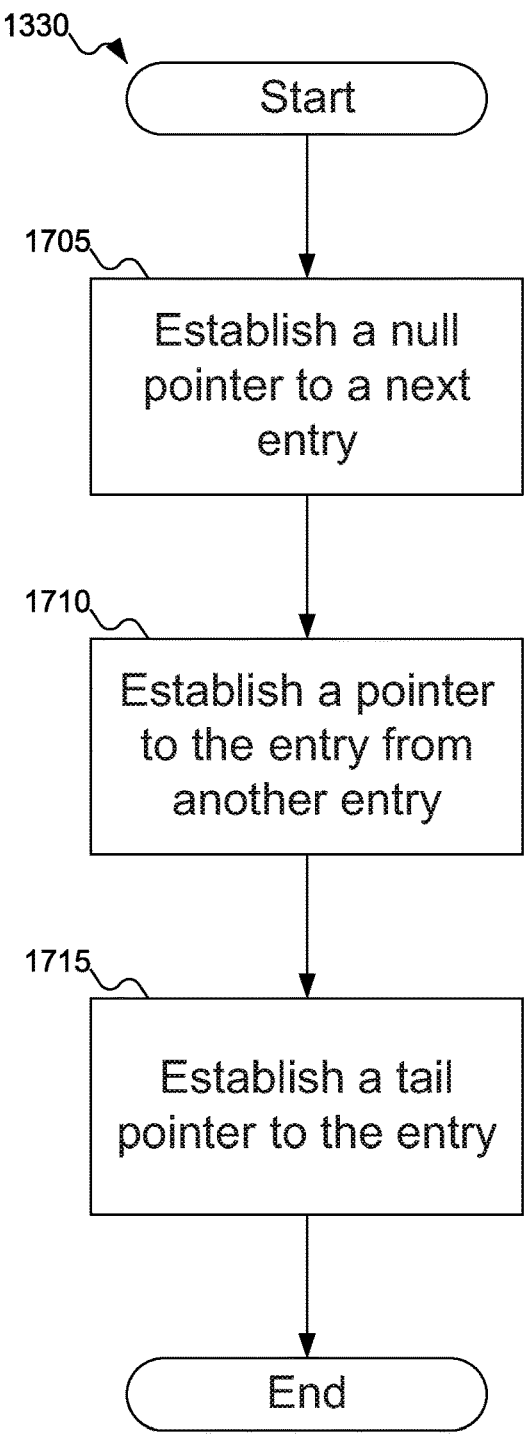
FIG. 16
FIG. 17

SUBMISSION QUEUE ENTRY AGE TRACKING

RELATED APPLICATION DATA

This application claims the benefit of U.S. Provisional Patent Application Ser. No. 63/399,578, filed Aug. 19, 2022, which is incorporated by reference herein for all purposes.

FIELD

The disclosure relates generally to storage devices, and more particularly to tracking the age of entries in a submission queue in the storage device.

BACKGROUND

Storage devices may receive commands from a host. The storage devices may track the time spent processing the command: that is, the time from when the storage device begins to carry out operations to perform the command up until the storage device has completed processing the command. This information may be useful to the host: for example, to ensure the storage device is processing commands within the promised amount of time.

A need remains for a way to improve how storage devices track the age of command.

BRIEF DESCRIPTION OF THE DRAWINGS

The drawings described below are examples of how embodiments of the disclosure may be implemented, and are not intended to limit embodiments of the disclosure. Individual embodiments of the disclosure may include elements not shown in particular figures and/or may omit elements shown in particular figures. The drawings are intended to provide illustration and may not be to scale.

FIG. 16 shows a flowchart of an example procedure for the storage device of FIG. 1 to initialize the entries of FIGS. 7-9C, according to embodiments of the disclosure.

FIG. 17 shows a flowchart of an example procedure for the storage device of FIG. 1 to add the entries of FIGS. 7-9C to the data structures of FIGS. 6A-6C, according to embodiments of the disclosure.

SUMMARY

Figure 1:
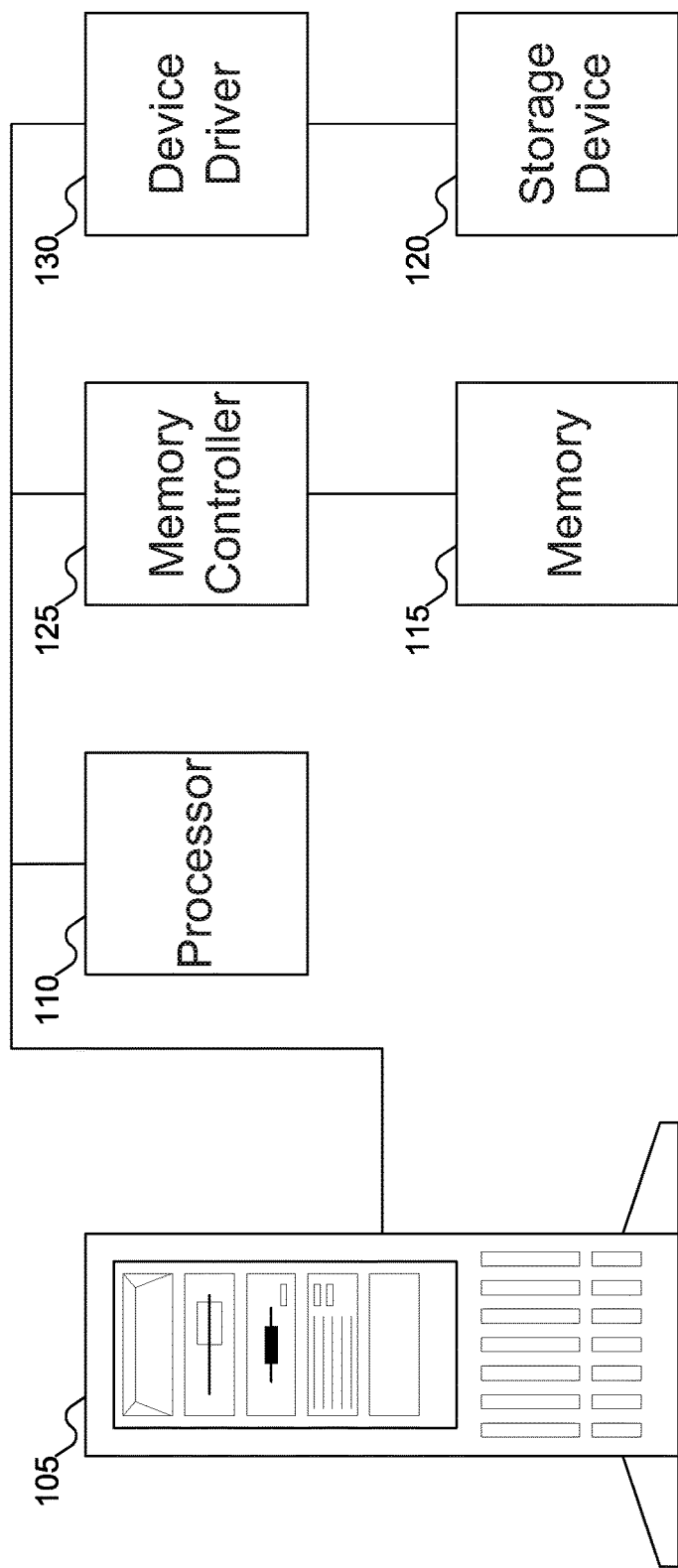
FIG. 1 shows a system including a storage device supporting age tracking, according to embodiments of the disclosure.

Embodiments of the disclosure include a storage device. The storage device may include storage for a data structure. Entries stored in the data structure may be used to store the timestamp when the host notifies the storage device that a new command is available. The timestamp may then be used to track the command age.

DETAILED DESCRIPTION

Reference will now be made in detail to embodiments of the disclosure, examples of which are illustrated in the accompanying drawings. In the following detailed description, numerous specific details are set forth to enable a thorough understanding of the disclosure. It should be understood, however, that persons having ordinary skill in the art may practice the disclosure without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the disclosure.

The terminology used in the description of the disclosure herein is for the purpose of describing particular embodiments only and is not intended to be limiting of the disclosure. As used in the description of the disclosure and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

A host may send commands to a storage device. The host may notify the storage device that the command is waiting for processing: for example, by ringing a doorbell (which may be a form of interrupt to the controller of the storage device). The storage device may then retrieve the command and carry out the operations requested.

The storage device may track the amount of time (called age tracking) between when the storage device retrieves the command and the storage device returns a result to the host. This information may be useful for a number of reasons. First, the host may be interested in verifying that the storage device is completing command processing within the expected time limits. Second, the storage device may use the age tracking to profile itself.

But storage devices might not start processing the command at the moment the doorbell is rung. For example, if the storage device is busy processing other commands already, the command may wait to be processed. Similarly, if there are other commands pending when the host rings the doorbell, those other commands might be processed first, delaying the start of processing of the command in question.

The storage device might only track the time actually spent processing the command. That is, the storage device may start a timer when the storage device retrieves the command, and end the timer when the storage device completes processing of the command. But the time between when the host rings the doorbell and when the storage device retrieves the command might not be tracked. As a result, the age tracking as reported by the storage device might not fully describe the age of the command.

In addition, the host may have certain expectations regarding how long the storage device may take to process a command. If a command is not processed within the expected amount of time, a timeout (an error) may have occurred. But the storage device might not be able to determine that a command has been waiting for processing in excess of the expected amount of time.

To address these problems, embodiments of the disclosure may include a data structure, such as a linked list, to store timestamps of doorbell events. When the host rings the doorbell, the storage device may add an entry to the linked list, storing a timestamp of when the host rang the doorbell and identifying the command in question. When the storage device retrieves the command, the storage device may also retrieve the associated entry from the linked list. The storage device may then use the timestamp of the entry in the linked list as the start time for command processing, and may then release the entry from the linked list. When the storage device completes processing of the command, the storage device may then determine how long the command took to process starting from the timestamp in the entry in the linked list.

Depending on how the storage device stores timestamps and the size of the memory where the commands are stored, each entry in the linked list might need, for example, eight bytes to store the timestamp and eight bytes to point to the command in its queue. But the storage device might support queues of millions or billions of commands. 16 bytes of storage per entry in the linked list, multiplied by four billion entries, would require approximately 68 gigabytes (GB) of storage. The linked list might be stored in Static Random Access Memory (SRAM) or Dynamic Random Access Memory (DRAM): equipping the storage device with 68 GB of SRAM or DRAM might be relatively expensive. To reduce the cost of the storage device, embodiments of the disclosure may include storage for a number of linked list entries that is smaller than the number of commands that might be pending. Linked list entries may be allocated from a free pool and returned to the free pool when no longer needed, reducing the amount of space that may be needed to store the linked list.

But if the number of linked list entries is smaller than the number of commands that might be pending, it is possible for all the linked list entries to be used. To address this situation, embodiments of the disclosure may determine whether a linked list entry may be immediately reused (to limit the amount of time during which the command's timestamp is not tracked). Alternatively, embodiments of the disclosure may use linked list entries to track an interval of time (rather than a particular doorbell timestamp), and may be used for all commands for which the host rang the doorbell during that interval. Alternatively, embodiments of the disclosure may use a single linked list entry to store the timestamp of the most recent doorbell event for more than one command received when there were no free linked list entries, or may attach a command associated with a more recent doorbell event to an earlier-allocated linked list entry.

FIG. 1 shows a system including a storage device supporting age tracking, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration: embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may be a volatile or non-volatile memory, as desired. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115. When storage device 120 is used to support applications reading or writing data via some sort of file system, storage device 120 may be accessed using device driver 130. While FIG. 1 shows one storage device 120, there may be any number of storage devices in machine 105. Storage device 120 may support any desired protocol or protocols, including, for example, the Non-Volatile Memory Express (NVMe) protocol. Different storage devices 120 may support different protocols and/or interfaces. For example, storage device 120 might support a cache coherent interconnect protocol, which may support both block-level protocol (or any other higher level of granularity) access and byte-level protocol (or any other lower level of granularity) access to data on storage device 120. An example of such a cache coherent interconnect protocol is the Compute Express Link (CXL) protocol, which supports accessing data in blocks using the CXL.io protocol and accessing data in bytes using the CXL.mem protocol. In this manner, data on a CXL storage device may be accessed as either block-level data (like an SSD) or byte-level data (such as a memory): the CXL storage device may be used to extend the system memory.

While FIG. 1 uses the generic term "storage device", embodiments of the disclosure may include any storage device formats that may benefit from the use of computational storage units, examples of which may include hard disk drives and Solid State Drives (SSDs). Any reference to "SSD" below should be understood to include such other embodiments of the disclosure. Further, different types of storage devices may be mixed. For example, one storage device 120 might be a hard disk drive, and another storage device 120 might be an SSD.

Figure 2:
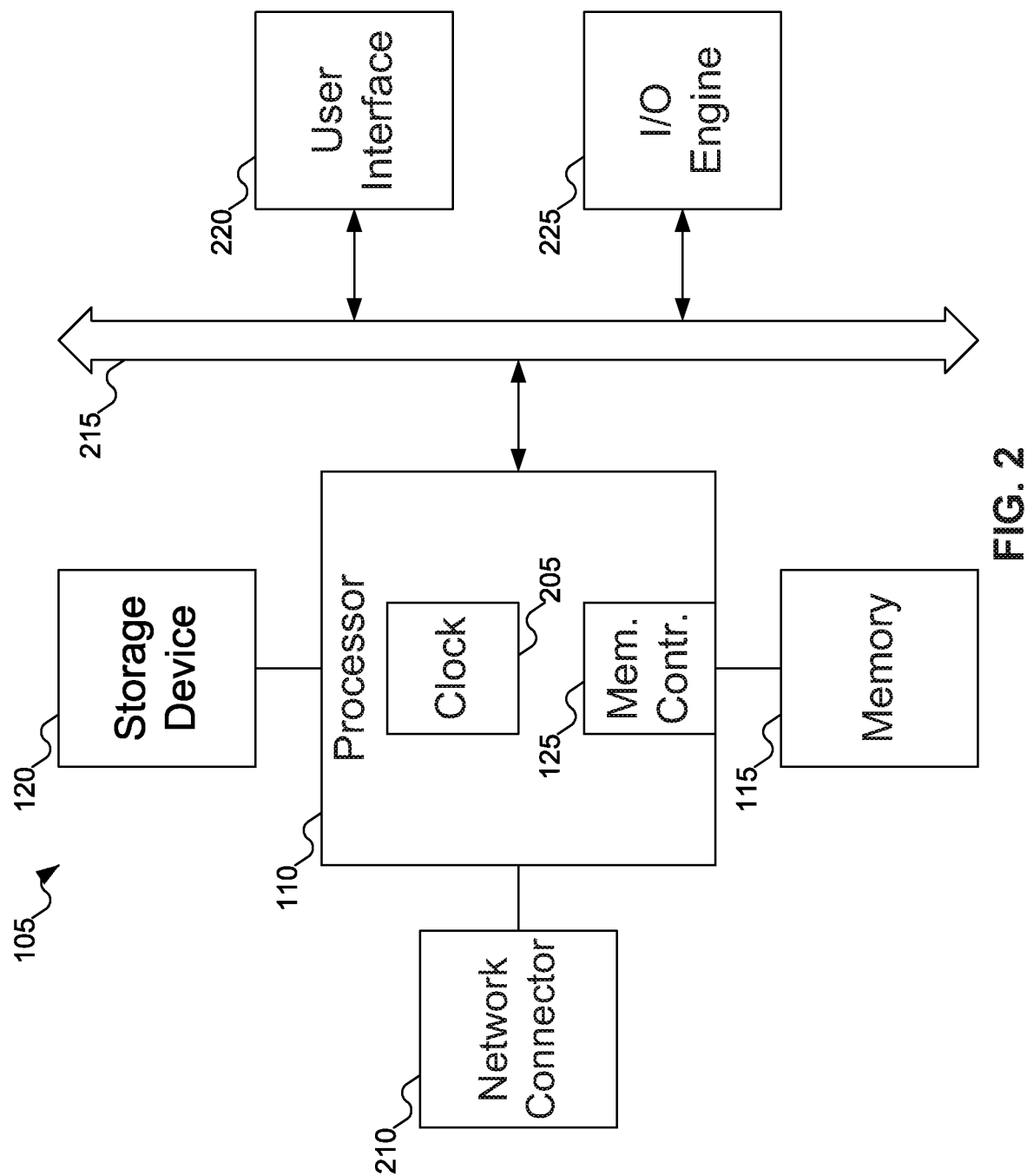
FIG. 2 shows details of the machine of FIG. 1, according to embodiments of the disclosure.

FIG. 2 shows details of machine 105 of FIG. 1, according to embodiments of the disclosure. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3:
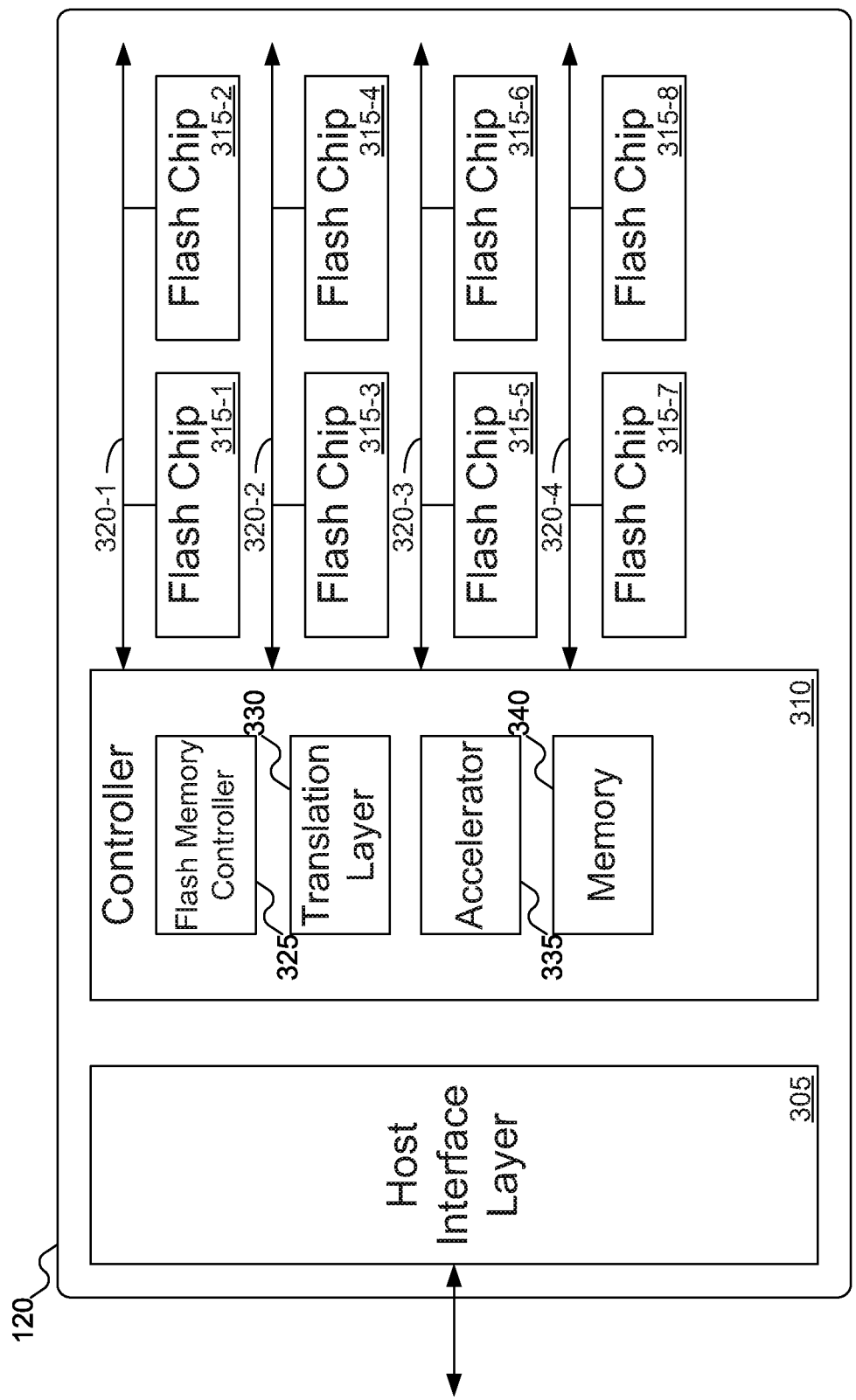
FIG. 3 shows details of the storage device of FIG. 1, according to embodiments of the disclosure.

FIG. 3 shows details of storage device 120 of FIG. 1, according to embodiments of the disclosure. In FIG. 3, the implementation of storage device 120 is shown as for a Solid State Drive. In FIG. 3, storage device 120 may include host interface layer (HIL) 305, controller 310, and various flash memory chips 315-1 through 315-8 (also termed "flash memory storage" or just "storage", and which may be referred to collectively as flash memory chips 315 or storage 315), which may be organized into various channels 320-1 through 320-4 (which may be referred to collectively as channels 320). Host interface layer 305 may manage communications between storage device 120 and other components (such as processor 110 of FIG. 1). Host interface layer 305 may also manage communications with devices remote from storage device 120. That is, host interface layer 305 may manage communications with devices other than processor 110 of FIG. 1 (for example, an accelerator or network interface card, among other possibilities), and which may be local to or remote from machine 105 of FIG. 1: for example, over one or more network connections. These communications may include read requests to read data from storage device 120, write requests to write data to storage device 120, and delete requests to delete data from storage device 120.

Host interface layer 305 may manage an interface across only a single port, or it may manage interfaces across multiple ports. Alternatively, storage device 120 may include multiple ports, each of which may have a separate host interface layer 305 to manage interfaces across that port. Embodiments of the inventive concept may also mix the possibilities (for example, an SSD with three ports might have one host interface layer to manage one port and a second host interface layer to manage the other two ports).

Controller 310 may manage the read and write operations, along with garbage collection and other operations, on flash memory chips 315 using flash memory controller 325. Controller 310 may also include translation layer 330 which may manage the mapping of logical addresses (such as logical block addresses (LBAs)) as used by host 105 of FIG. 1 to physical addresses (such as physical block addresses (PBAs)) where the data is actually stored on storage device 120. By using translation layer 330, machine 105 of FIG. 1 does not need to be informed when data is moved from one physical address to another within storage device 120.

In some embodiments of the disclosure, controller 310 may include accelerator 335. Accelerator 335 may add functionality to storage device 120 that may be utilized by applications running on (or connected to) machine 105 of FIG. 1.

In some embodiments of the disclosure, controller 310 may also include memory 340. Memory 340 may be a memory local to storage device 120 that may be used by controller 310 to perform various functions. Memory 340 may be any form of memory, such as SRAM or DRAM. Memory 340 is discussed further with reference to FIG. 4 below, and may be used to store information such as the data structures and entries discussed further with reference to FIGS. 7-9B below.

While FIG. 3 shows storage device 120 as including eight flash memory chips 315 organized into four channels 320, embodiments of the inventive concept may support any number of flash memory chips organized into any number of channels. Similarly, while FIG. 3 shows the structure of a SSD, other storage devices (for example, hard disk drives) may be implemented using a different structure from that shown in FIG. 3 to manage reading and writing data, but with similar potential benefits.

In some embodiments of the disclosure, a storage device may be divided into units of storage of various size. For example, an SSD might be divided into pages, each of which may store approximately 8 kilobytes (KB) ($2^{14}$ bytes) of data. A block may include 128 pages: therefore, a block may be approximately 1 megabyte (MB) ($2^{21}$ bytes) in size. In addition, blocks may be grouped together to form superblocks.

An SSD might include such various unit sizes because different operations may be performed on different units. For example, an SSD might read or write a page of data. So, when processor 110 of FIG. 1 issues a read or write request, processor 110 of FIG. 1 may provide up to one full page of data to be written to the SSD (the page may be padded with any desired bits to fill the page) or a buffer large enough to store one full page of data to be read from the SSD. But SSDs typically do not support overwriting of data. That is, if processor 110 of FIG. 1 wants to replace some data already written to the SSD, the SSD might instead write the updated data to a new page, and invalidate the original page. Translation table 330 may then be updated to reflect the new page where the updated data is stored.

Because SSDs might invalidate a page rather than overwriting it with new data, at some point the SSD may erase the data on the invalidated page (so that new data may be written to the page). This process may be termed garbage collection. But SSDs might erase data in units of blocks (or superblocks), rather than in units of pages. Thus, to recover pages that have been marked as invalidated, the SSD might need to erase all data in the block including that page.

If the SSD erases blocks rather than pages, then the SSD might wait until all the pages in the block have been erased. But there is no way to know when (or even if ever) that all the pages in an individual block will be invalidated. If the SSD were to wait until all the pages in a block are invalidated before erasing the block, the SSD might run out of free space. Thus, garbage collection might sometimes involve erasing a block that stores some valid data. To prevent the data loss, the SSD may copy the valid data from the block to a free page, and then may erase the block (thereby returning the block to the free block pool and making all of the pages in that block available to store data again).

Figure 4:
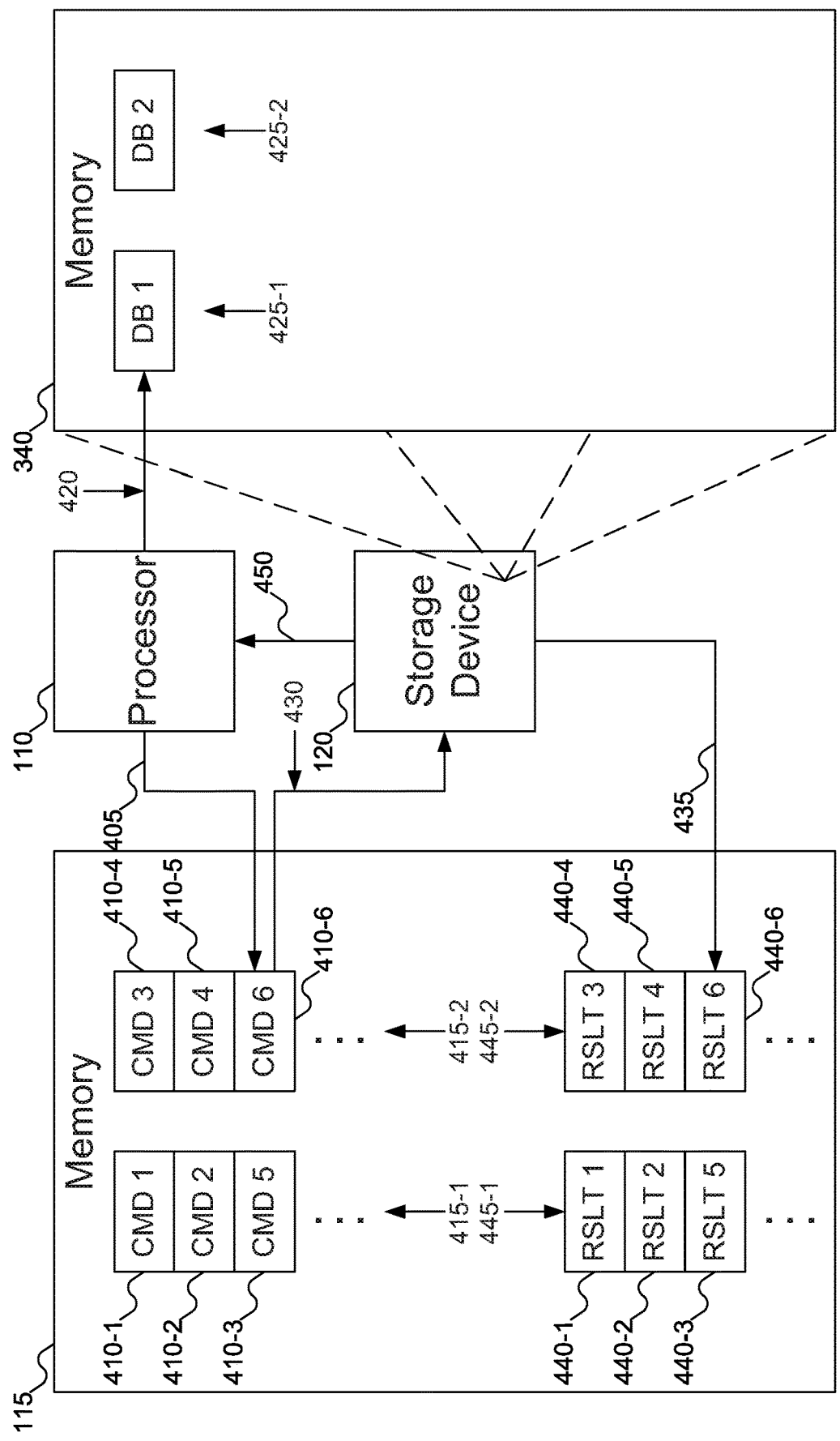
FIG. 4 shows the process by which the storage device of FIG. 1 may execute a command, according to embodiments of the disclosure.

FIG. 4 shows the process by which storage device 120 of FIG. 1 may execute a command, according to embodiments of the disclosure. When a command is to be sent to storage device 120, processor 110 may store the command, shown as operation 405. In FIG. 4, commands 410-1 through 410-6 (which may be referred to collectively as commands 410) may be stored in memory 115 of host 105 of FIG. 1, embodiments of the disclosure may store commands 410 in any desired location. The description below may be used for NVMe storage devices, such as SSD 120 of FIG. 3, but embodiments of the disclosure may be applicable to storage devices using other protocols as well.

In some embodiments of the disclosure, commands 410 may be organized into submission queues. For example, different processes running on processor 110 may have separate submission queues, or different submission queues may have different priorities for execution by storage device 120. In FIG. 4, two submission queues 415-1 and 415-2 (which may be referred to collectively as submission queues 415) are shown: submission queue 415-1 is shown as including commands 410-1, 410-2, and 410-3, and submission queue 415-2 is shown as including commands 410-4, 410-5, and 410-6. By using different submission queues, it may be possible for processor 110 to notify the correct process when storage device 120 completes executing a command for that process. While FIG. 4 shows two submission queues 415, embodiments of the disclosure may include any number (one or more) of submission queues. In addition, while the term "submission queue" may be normally understood to mean a particular data structure used to submit commands to, for example, storage device 120, embodiments of the disclosure may include any equivalent or alternative data structure, whether or not called a "submission queue". Commands 410 may be placed in submission queues 415 in any order. For example, in FIG. 4 commands 410-1 and 410-2 may be placed in submission queue 415-1 first, then commands 410-4 and 410-5 may be placed in submission queue 415-2, then command 410-3 may be placed in submission queue 415-1, and finally command 410-6 may be placed in submission queue 415-2.

Once command 410 has been stored in memory 115, processor 110 may notify storage device 120 that command 410 is available for execution, shown as operation 420. In some embodiments of the disclosure, processor 110 may "ring a doorbell" to notify storage device 120. Similar to an interrupt, processor 110 may write the address where command 410 is stored in memory to inform storage device 120 where the command may be retrieved. This address may be written, for example, to doorbells 425-1 and/or 425-2 (which may be referred to collectively as doorbells 425). Doorbells 425 may be, for example, a register in memory 340 in storage device 120. Storage device 120 may detect the change in the address in doorbells 425 and recognize that command 410 is available in submission queue 415.

In embodiments of the disclosure where multiple submission queues 415 are used, memory 340 may include multiple doorbells 425: one for each submission queue 415. In this manner, storage device 120 may be aware of which submission queue 415 stores command 410. Embodiments of the disclosure may support any number (one or more) of doorbells 425. In addition, while the term "doorbell" may be normally understood to mean a particular data structure used to notify storage device 120 that commands 410 are available for execution, embodiments of the disclosure may include any equivalent or alternative data structure, whether or not called a "doorbell".

Once storage device 120 is aware that command 410 is available, storage device 120 may retrieve command 410 from memory 115, shown as operation 430. Storage device 120 may retrieve command 410 from memory 115 in any desired manner: for example, by using the address stored in to doorbell 425 to locate command 410 in memory 115 and read the command. Storage device 120 may then execute command 410.

Once storage device 120 has completed executing command 410, storage device 120 may store the result in memory 115, shown as operation 435. Each command 410 may produce a result. Thus, commands 410-1 through 410-6 may produce results 440-1 through 440-6 (which may be referred to collectively as results 440). Just as commands 410 may be placed in multiple submission queues 415, results 440 may be placed in multiple completion queues. FIG. 4 shows results 440 placed in two completion queues 445-1 and 445-2 (which may be referred to collectively as completion queues 445), but embodiments of the disclosure may support any number of completion queues 445. In some embodiments of the disclosure, there may be one completion queue 445 for each submission queue 415; in other embodiments of the disclosure, the number of submission queues 415 and the number of completion queues 445 may differ.

Once result 440 has been stored, storage device 120 may notify processor 110 that command 410 has been executed, shown as operation 450. As with the ringing of doorbell 425, storage device 120 may perform an interrupt or otherwise notify processor 110 that command 410 has executed.

The above discussion focuses on a single command 410 being added to submission queue 415 and processor 110 notifying storage device 120 about each command 415 separately. But in some embodiments of the disclosure, processor 110 may add multiple (two or more) commands to submission queue 415 and notify storage device 120 about all of the commands with a single notification.

Figure 5:
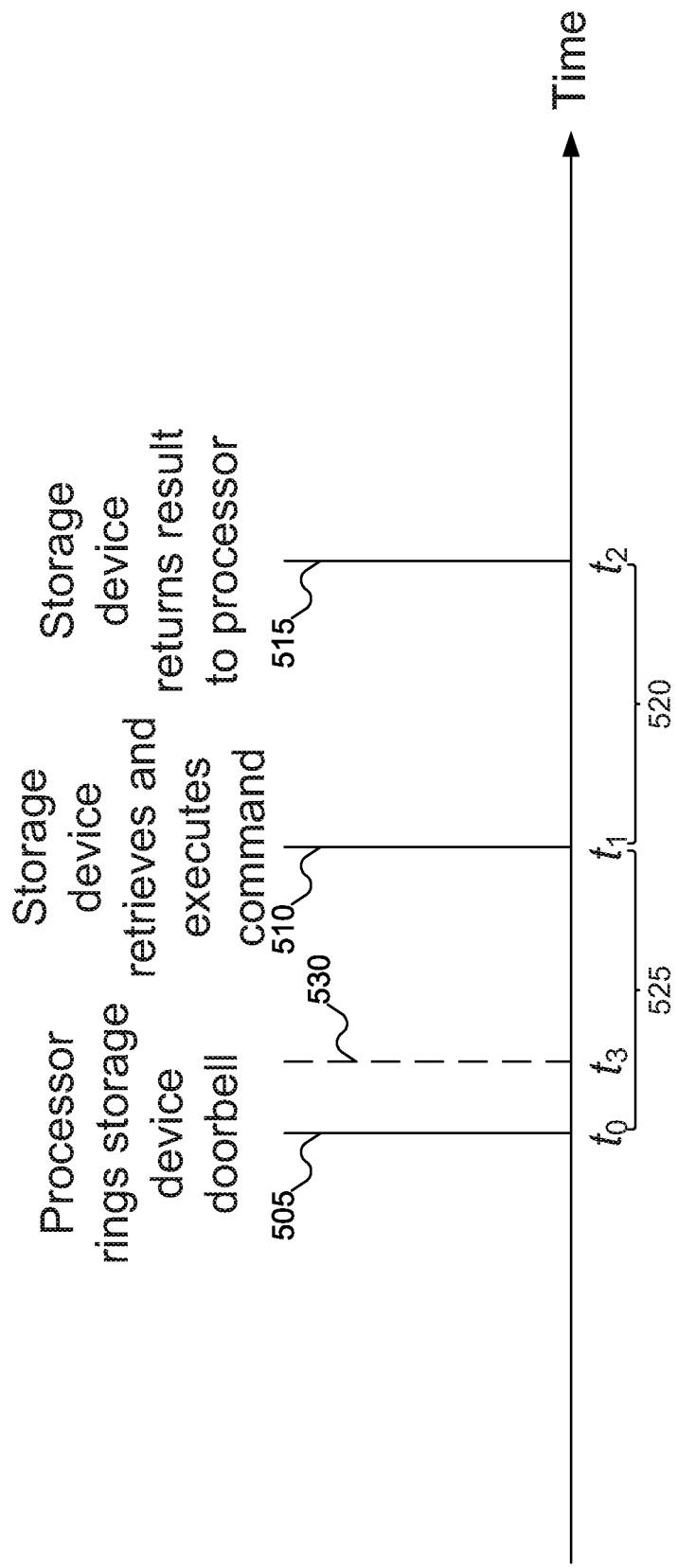
FIG. 5 shows a timeline of events in processing the commands of FIG. 4 by the storage device of FIG. 1, according to embodiments of the disclosure.

FIG. 5 shows a timeline of events in processing commands 410 of FIG. 4 by storage device 120 of FIG. 1, according to embodiments of the disclosure. In FIG. 5, at time to (some point in time during the operation of host 105 of FIG. 1), processor 110 of FIG. 1 may ring doorbell 425 of FIG. 4 to inform storage device 120 of FIG. 1 that command 410 of FIG. 4 is available for execution, shown as operation 505. At time $t_1$, storage device 120 may retrieve and execute command 410 of FIG. 4, shown as operation 510. At time $t_2$, storage device 120 of FIG. 1 may then return the result of command 410 of FIG. 4 to processor 110 of FIG. 1, shown as operation 515.

If age tracking only measures the time between when storage device 120 of FIG. 1 retrieves and begins to execute command 410 and when storage device 120 of FIG. 1 completes execution of command 410 and returns the results to processor 110 of FIG. 1, age tracking only measures time interval 520 between times $t_1$ and $t_2$: the time from when processor 110 of FIG. 1 informed storage device 120 of FIG. 1 that command 410 of FIG. 4 is available and when storage device 120 of FIG. 1 retrieves command 410—time interval 525, between times to and $t_1$—is not measured. But by not tracking time interval 525, the age of command 410 of FIG. 4 may be inaccurate (depending on how long time interval 525 is). Embodiments of the disclosure may improve age tracking of commands 410 by performing an additional operation 530: recording a timestamp. This timestamp may be recorded at time $t_3$, somewhere between times to and $t_1$. Ideally, operations 530 may be performed right after operation 505; in practice, operation 530 may be performed as soon as possible after operation 505: that is, as close to time to as possible, to minimize any inaccuracy. Thus, the inaccuracy resulting from not measuring time interval 525 may be eliminated or at least minimized.

Figure 6A:
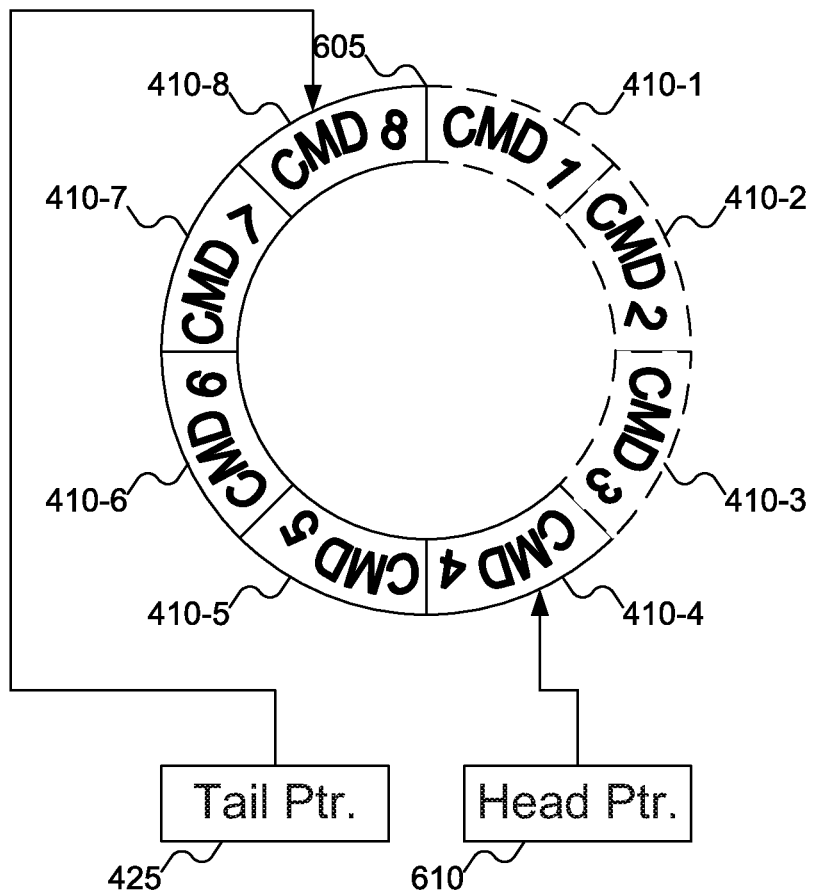
FIG. 6A shows a first representation of a data structure, according to some embodiments of the disclosure.

FIG. 6A shows a first representation of a data structure, according to some embodiments of the disclosure. In FIG. 6A, circular queue data structure 605 is shown, which may be used, for example, for submission queue 415 of FIG. 4. That is, each command 410 in the circular queue both precedes and is followed by another command 410 in the circular queue. In this manner, the circular queue has neither an end nor a beginning.

Because the circular queue is circular, there is no particular entry in the circular queue that may be considered the start or end of commands 410 in the queue. To that end, head pointer 610 and tail pointer 425 may be used. Head pointer 610 may point to the oldest command 410 in the circular queue (assuming that the circular queue implements a first in, first out (FIFO) queue where the oldest command 410 in the circular queue should be executed next), and tail pointer 425 may point to the newest command 410 in the circular queue. In some embodiments of the disclosure, tail pointer 425 may be the same register as doorbell 425 of FIG. 4 (hence the reuse of reference number 425); in other embodiments of the disclosure, doorbell 425 of FIG. 4 and tail pointer 425 may be different data managed by storage device 120 of FIG. 1. The discussion below assumes that tail pointer 425 and doorbell 425 of FIG. 4 are the same register, but may easily be modified for these elements to be different.

In FIG. 6A, commands 410-1 through 410-3 are "stored" in the circular queue, but are not between the commands 410 pointed to by head pointer 610 and tail pointer 425. That these commands 410-1 through 410-3 are not considered to be pending commands 410 although "stored" in the circular queue is shown by the dashed outlines for commands 410-1 through 410-3.

The number of commands 410 in the circular queue may vary over time. That is, at any point in time, the circular queue might contain no commands 410, the circular queue might be completely full with commands, or the circular queue might contain some commands and also have some openings. Head pointer 610 and tail pointer 425 may be used to differentiate between these possibilities.

As discussed above with reference to FIG. 4, tail pointer 425 may be advanced by processor 110 of FIG. 1 when a new command is available for storage device 120 of FIG. 1 to execute. In a parallel manner, head pointer 610 may be advanced when storage device 120 removes command 410 from submission queue 415 of FIG. 4. Thus, if head pointer 610 and tail pointer 425 both point to the same "command" 410 in the circular queue, there are currently no commands 410 waiting for storage device to execute. Storage device 120 may use this information to determine whether it is idle (or free to execute background processes without impacting requests from host 105 of FIG. 1).

On the other hand, if tail pointer 425 points to a command 410 before the command 410 pointed to by head pointer 610, then the circular queue is full: there are no slots available for processor 110 of FIG. 1 to place a new command in the circular queue. Processor 110 may use this information to determine that it may have to wait to insert a new command 410 into the circular queue.

Any other combination of values for head pointer 610 and tail pointer 425 may indicate that there is at least one command 410 waiting to be executed, but also room to add at least one new command 410 to the circular queue.

It might be noticed that although commands 410-1 through 410-3 are shown in FIG. 6A, commands 410-1 through 410-3 are not actually in the circular queue, since head pointer 610 has been advanced to point to command 410-4 (the next command to retrieved from data structure 605). The reason for this fact is that some embodiments of the disclosure do not erase commands from submission queue: once "removed" from the circular queue (by advancing head pointer 610 past the command), any information in the entry in the circular queue may be ignored. When processor 110 of FIG. 1 adds a new command to replace command 410-1 (and advances tail pointer 425), the old command may be overwritten with the new command.

When a circular queue as shown in FIG. 6A may be used, the number of commands 410 that may be stored may be fixed in advance, based on the size of the circular queue and the size of each individual command 410 in the circular queue. An alternative data structure 605 that may support any number of commands is the linked list, shown in FIG. 6B.

Figure 6B:
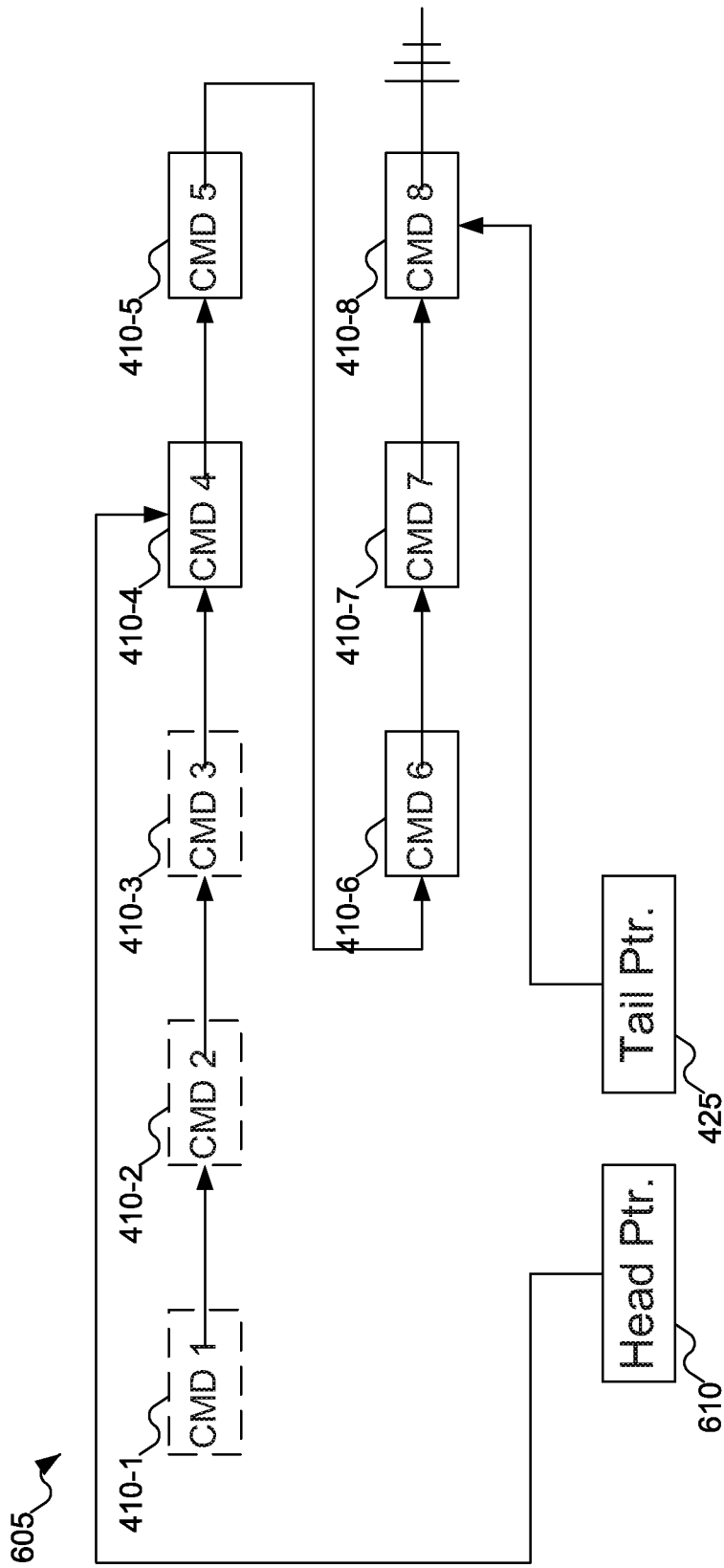
FIG. 6B shows a second representation of a data structure, according to some embodiments of the disclosure.

In FIG. 6B, a linked list data structure 605 is shown. In a linked list, each element includes a value and a pointer to the next entry in the linked list. Thus, for example, command 410-1 may point to command 410-2, which in turn may point to command 410-3, and so on. The last entry in the linked list (command 410-8) may include a null pointer. A null pointer is a pointer to a special address (such as zero) where data is not expected to be stored. FIG. 6B shows embodiments of the disclosure using a singly linked list: other embodiments of the disclosure may use a doubly linked list, where each node includes a pointer to both the next and previous nodes in the linked list.

Head pointer 610 may point to the first entry in the linked list data structure, and tail pointer 425 may point to the last entry in the linked list data structure. Thus, command 410-4, pointed to by head pointer 610, may represent the next command to be accessed from the linked list. When storage device 120 of FIG. 1 removes command 410-4 from the linked list, head pointer 425 may be updated to point to the next command (command 410-5), as identified by the pointer in command 410-4. Similarly, when processor 110 of FIG. 1 adds a new command to the linked list, a new entry may be allocated from memory 115 of FIG. 1 and filled with the command (with a null pointer used to indicate that the new entry does not point to any other entry in the linked list. The entry pointed to by tail pointer 425 (command 410-8) may have its pointer updated to point to the new entry, as may be tail pointer 425, after which the new entry has been added to the linked list.

It may be noticed that while commands 410-1 through 410-3 are shown as part of the linked list, they come before the entry pointed to by head pointer 610. These entries may represent commands that have already been processed and removed from the linked list (shown by the dashed lines around commands 410-1 through 410-3). In some embodiments of the disclosure, these entries may be deallocated and returned to memory 115 of FIG. 1 (such deallocation may be considered a good programming practice, although its implementation is not technically required if garbage collection of memory 115 of FIG. 1 may be performed). But if left "in" the linked list, commands 410-1 through 410-3 may still be technically considered part of the linked list, even if not accessible (as there is no outside pointer to any of these commands 410-1 through 410-3, neither processor 110 of FIG. 1 nor storage device 120 of FIG. 1 may be able to locate and access commands 410-1 through 410-3).

A circular queue as shown in FIG. 6A may represent a good abstraction for how to manage submission queues 415 of FIG. 4. But aside from the fact that a circular queue as shown in FIG. 6A may have a predetermined number of commands 410 that may be stored in the circular queue, in practice a circular queue may be more difficult to implement. Typically, addresses in memory are sequential, with a "lowest" or "smallest" address at one end and a "highest" or "largest" address at the other end. Thus, a true circular queue as shown in FIG. 6A may not be practical to implement without a few changes.

An advantage of using a linked list as shown in FIG. 6B is that there is no upper bound to the number of commands in data structure 605 (other than memory available for use by data structure 605). But management of a linked list may be more complicated than that of a circular queue as shown in FIG. 6A: if anything should interrupt the linked list, data may be lost. For example, if some process were to accidentally overwrite command 410-5 with other data (and in particular may overwrite the pointer to command 410-6), it might happen that storage device 120 of FIG. 1 may not be used to access commands 410-5 through 410-7 (command 410-8 may at least be retrieved because tail pointer 425 may still point to command 410-8). While there are ways to modify a linked list so that the linked list may be traversed in either direction, these modifications may involve storing more data in commands 410. These modifications may mean more operations are involved in adding or removing commands 410 from the linked list. In addition, allocating or deallocating memory for commands 410 may take some additional time, whereas a data structure that is fixed in advance might not spend time allocating or deallocating memory.

Figure 6C:
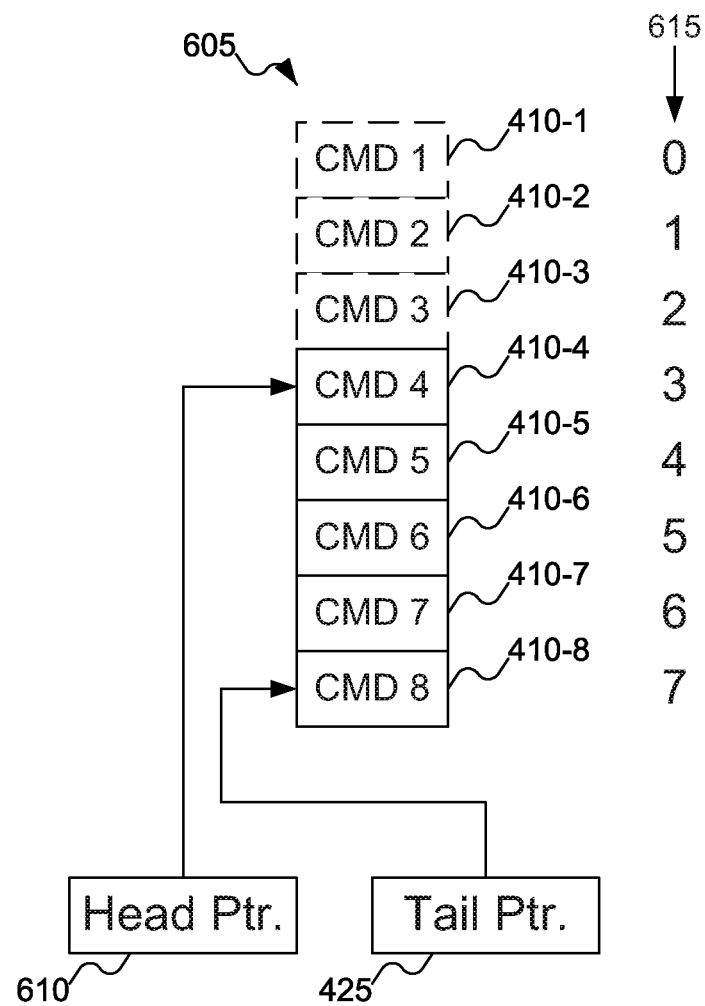
FIG. 6C shows a third representation of a data structure, according to some embodiments of the disclosure.

FIG. 6C represents another data structure 605 that may be used to implement submission queues 415 of FIG. 4. In FIG. 6C, data structure 605 may be implemented as an array (or equivalent thereof). Each element in the array may be used to store a command 410. Head pointer 610 and tail pointer 425 may then point to the head and tail of commands 410 that are waiting for storage device 120 to retrieve.

While the array of FIG. 6C does not look like it is circular, the array may be used like a circular queue. For example, tail pointer 425 is shown as pointing to command 410-8. When processor 110 of FIG. 1 is ready to add another command to the array, that command may be added as command 410-1: that is, the array wraps from one end to the other to function like a circular queue.

To have the array function like a circular queue, processor 110 of FIG. 1 and/or storage device 120 of FIG. 1 may track when a pointer is currently pointing at the last entry in the array, and update the pointer with the address of the first entry in the array when moving the pointers. But there is another way. Each element in the array may have an index, such as indices 615. Instead of storing the address of a particular element, head pointer 610 and tail pointer 425 may store the indices identifying the elements, and may access commands 410 using indices 615 instead. In addition, rather than performing a test to see if head pointer 610 or tail pointer 425 currently has the index for command 410-8 (the last element in the array), head pointer 610 or tail pointer 425 may instead increment its value, then take the result modulo the number of elements in the array. For example, consider tail pointer 425, which may store the index value 7. As the array includes a total of eight elements, when a new element is added tail pointer 425 may be incremented by one (to the value eight), with the result taken modulo eight (resulting in the value zero). If the size of the array is a power of two, a modulo operation may be performed by masking the higher order bits in the value. For example, seven in binary may be represented as 0000 0111. Upon incrementing to eight, the binary representation may become 0000 1000. Masking the five higher order bits results in 0000 0000, or zero, which may represent the first element in the array.

Figure 7:
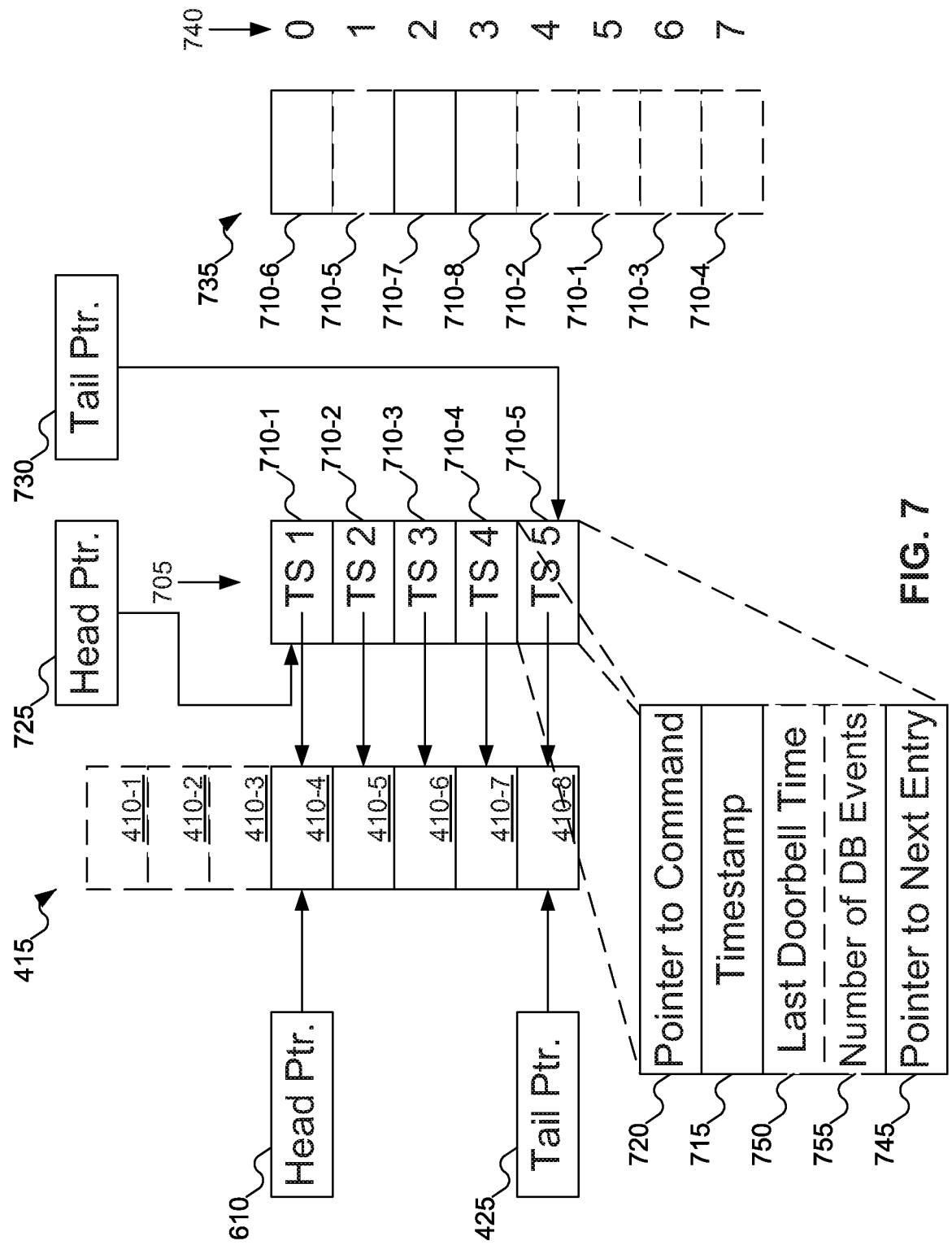
FIG. 7 shows how the storage device of FIG. 1 may use entries to track timestamps for the commands of FIG. 4, according to some embodiments of the disclosure.

The above discussion focuses on how different data structures 605 may be used to represent submission queues 415 of FIG. 4. Other data structures may also be used. In addition, similar data structures may be used for other purposes: for example, to store information about timestamps. FIG. 7 illustrates how this may be done.

In FIG. 7, submission queue 415 is shown, which may use any of the data structures 605 of FIGS. 6A-6C described above, as well as other possible data structures. For purposes of this discussion, submission queue 415 may be assumed to use an array as shown in FIG. 6C. Embodiments of the disclosure may use a second data structure to track timestamp information. This second data structure may be called linked list 705. While the second data structure is described as using a linked list (such as that shown in FIG. 6B above), embodiments of the disclosure may use a circular queue as shown in FIG. 6A, an array as shown in FIG. 6C, or any alternative data structure that may store the requisite information. And while FIG. 7 shows linked list 705 as including five entries 710-1 through 710-5 (which may be referred to collectively as entries 710), embodiments of the disclosure may include any number (zero or more) of entries 710 in linked list 705. In some embodiments of the disclosure the number of entries 710 in linked list 705 may be expected to equal the number of commands 410 awaiting execution; in other embodiments of the disclosure, the number of entries 710 in linked list 705 may differ from the number of commands 410 awaiting execution.

When storage device 120 of FIG. 1 receives a notification from processor 110 of FIG. 1 that command 410 is available for execution (operation 420 of FIG. 4), storage device 120 of FIG. 1 may also add an entry, such as entry 710-5 to linked list 705. Entry 710-5 may store timestamp 715. Timestamp 715 may be a timestamp generated when storage device 120 of FIG. 1 receives the notification from processor 110 of FIG. 1 that command 410-8 is available for execution. In this manner, storage device 120 of FIG. 1 may track when command 410-8 was received from processor 110 of FIG. 1, which means that the time command 410-8 was waiting in submission queue 415 may be factored in when computing the age of command 410-8.

Entry 710-5 may also be associated with command 410-8. There are various ways in which entry 710-5 may be associated with command 410-8. In some embodiments of the disclosure, entry 710-5 may include pointer 720 to command 410-8. Pointer 720 may store the address in memory 115 of FIG. 1 where command 410-8 is stored. Alternatively, if submission queue 415 is implemented using a structure that is static (such as array data structure 605 of FIG. 6C, and which may be compared with dynamic data structures were the elements in the data structure may be added and removed, such as linked list data structure 605 of FIG. 6B), pointer 720 may store index 615 of FIG. 6C into submission queue 415. Because index 615 of FIG. 6C may require fewer bytes than a memory address, storing index 615 of FIG. 6C may reduce the amount of storage needed for entry 710-5.

Alternatively, entry 710-5 may include a count or offset. A count may represent the number of commands 410 in submission queue 415 that are associated with entry 710-5. An offset may indicate the distance to the last command associated with entry 710-5. In FIG. 7, entry 710-5 may have a count of one, or an offset of zero (as discussed further with reference to FIG. 8 below, the number of commands 410 associated with an entry 710 may be larger than one).

The count or offset may be relative to a specific command 410 in submission queue 415. For example, entry 710-5 may include both pointer 720 (or index 615 of FIG. 6C) and a count or offset, in which case command 410-8 is specifically identified as associated with entry 710-5. Alternatively, the count or offset may be relative to the "first" command 410 in submission queue 415 associated with entry 710-5, but that command 410 might not be directly identified, and may be determined relative to head pointer 610. That is, the command(s) associated with entry 710-5 might not be uniquely identified by entry 710-5 until head pointer 725 points to entry 725. At that point, header pointer 610 may point to command 410-8, and the count or offset may be determined relative to command 410-8.

As linked list 705 may be just that—a linked list—linked list 705 may have head pointer 725 and tail pointer 730. Head pointer 725 and tail pointer 730 may function similarly to head pointer 610 and tail pointer 425 of submission queue 415. But as processor 110 of FIG. 1 may not need to access linked list 705, head pointer 725 and tail pointer 730 may be stored locally to storage device 120 of FIG. 1, and might not be remotely accessible.

When storage device 120 of FIG. 1 is ready to execute command 410, storage device 120 of FIG. 1 may access head pointer 725 to determine what entry 710 is next to use. In embodiments of the disclosure where there is a one-to-one correspondence between commands 410 in submission queue 415 and entries 710 in linked list 705, entry 710 pointed to by head pointer 725 may correspond to the next command 410 in submission queue 415 to be executed. Storage device 120 of FIG. 1 may then execute command 410 and return any result. Once command 410 has completed, storage device 120 of FIG. 1 may use timestamp 715 and compare it with the current timestamp to determine the age of command 410. If appropriate, storage device 120 may then return the age of command 410 to host 105 of FIG. 1. Finally, storage device 120 of FIG. 1 may release entry 710 and update head pointer 725 into linked list 705 (head pointer 610 into submission queue 415 may be similarly updated, either at this time, when command 410 completes execution, or when storage device 120 of FIG. 1 accesses command 410 from submission queue 415, depending on the embodiment of the disclosure).

In embodiments of the disclosure where there is only one submission queue 415, there might be only one linked list 705. But in embodiments of the disclosure where there may be more than one submission queue 415, storage device 120 of FIG. 1 may need a separate linked list 705 to be associated with each submission queue 415 (to be able to track timestamps for different commands in different submission queues). But there may be a concern when multiple submission queues are supported.

Consider, for example, the NVMe standard. The NVMe standard supports up to 65,536 ($2^{16}$, which may be represented as 64 K) submission queues, each of which may store up to 65,536 commands. That means that there might be up to 4,294,967,296 ($2^{32}$) commands awaiting execution by storage device 120 of FIG. 1.

Memory 115 of FIG. 1 in host 105 of FIG. 1 might be large enough to store so many commands in submission queues. But memory 340 of FIG. 3 within storage device 120 of FIG. 1 might not be as large as memory 115 of FIG. 1. Storage device 120 of FIG. 1 may include enough memory 340 of FIG. 3 to process commands locally: beyond that usage, it may be unnecessarily expensive to include additional memory 340 of FIG. 3 in storage device 120 of FIG. 1. Thus, manufacturers may seek to minimize the amount of memory 340 of FIG. 3 included in storage device 120. For example, memory 340 of FIG. 3 might be approximately 32 MB of DRAM, approximately 2 MB of SRAM, or some combination of DRAM and SRAM at approximately these sizes (embodiments of the disclosure may, of course, include other amounts of either DRAM or SRAM, both less than or more than these amounts). But since the information stored in linked list 705 might not be relevant to processor 110 of FIG. 1, linked list 705 may be stored in memory 340 of FIG. 3 (rather than in memory 115 of FIG. 1 of host 105 of FIG. 1). If memory 340 is not large enough to support approximately four billion entries 710, then entries 710 may have to be shared between linked lists 705 for the various submission queues 415. For example, memory 340 might be large enough to include only 1024 ($2^{10}$) entries 710: far fewer than the largest possible number of commands that might be awaiting execution by storage device 120 of FIG. 1.

Embodiments of the disclosure may address this consideration by sharing entries 710. That is, when not in use, entries 710 may be kept in pool of entries 735. When storage device 120 of FIG. 1 receives a notification from processor 110 of FIG. 1 that a new command 410 is available, storage device 120 of FIG. 1 may select an entry 710 from pool of entries 735. This entry 710 may then be added to linked list 705 to store timestamp 715 and pointer 720 to command 410. Note that embodiments of the disclosure may support the use of pool of entries 735 even in embodiments where there is only one submission queue 415 (and therefore there might be only one linked list 705).

Storage device 120 of FIG. 1 may use any desired technique for selecting an entry 710 from pool of entries 735. In some embodiments of the disclosure, storage device 120 of FIG. 1 may step through each entry 710, looking for an entry 710 that is currently in pool of entries 735: that is, an entry 710 not currently used in any linked list 705. In other embodiments of the disclosure, pool of entries 735 may be implemented as a linked list of entries 710, with a head pointer and a tail pointer, and entries 710 may be added or removed from the pool of entries 735 similar to how an entry 710 may be removed from the linked list data structure shown in FIG. 6B above. In still other embodiments of the disclosure, pool of entries 735 may be implemented as a stack, or a last in, first out (LIFO) queue. When implemented as a stack, a pointer may point to the top of the stack, and each entry 710 in the stack may point to the next entry 710. To remove an entry 710, the entry 710 at the top of the stack may be selected, and the pointer to the top of the stack may be adjusted to point to the next entry 710 in the stack (based on the pointer to the next entry 710 from the top entry 710). To return an entry 710 to the stack, the returned entry 710 may be set to point to the entry 710 that was previously at the top of the stack, and then the pointer to the top of the stack may be set to point to the returned entry 710. Embodiments of the disclosure may also include other methods to select an entry 710 from pool of entries 735.

By keeping entries 710 in pool of entries 735, storage device 120 of FIG. 1 may readily find entries 710 that may be added to linked list 705. In addition, if one submission queue 415 has a relatively large number of commands 410 ready but another linked list 705 does not, the first linked list 705 may use more entries without the concern that that linked list 705 might use up all of its "allocated" entries 710. Further, by keeping unused entries 710 in pool of entries 735, storage device 120 of FIG. 1 may avoid the (relatively slow) operations to allocate and/or deallocate memory to add entries to linked list 705, and also the concern that the usage of memory 340 of FIG. 3 (either for entries 710 or for other operations of storage device 120 of FIG. 1, such as executing commands 410 or background operations) has depleted memory 340 of FIG. 3 to the extent that there is insufficient memory for new entries 710 to be allocated.

But because entries 710 in pool of entries 735 may be used in any linked list 705 (rather than being dedicated to a particular linked list 705), some modifications to entries 710 may be made, so that entries 710 may be used in any linked list 705. First, note that instead of having a dedicated array to serve as linked list 705 (similar to the array shown in FIG. 6C), pool of entries 735 may be an array, and linked list 705 may operate more closely to the linked list data structure of FIG. 6B. That is, linked list 705 may include entries 710 with various indices 740 that may be in any order and might not be contiguous. For example, entry 710-1 (pointed to by head pointer 725) is neither entry 710-6 (the entry in pool of entries 735 with index zero) nor entry 710-2 (the entry in pool of entries 735 with index four, which would correspond to the index for the corresponding command 410 in submission queue 415). Entry 710-2, the second entry in linked list 705, has index zero in pool of entries 735, after which there is a jump to entry 710-3 with index six in pool of entries 735. The lack of order to the indices of entries 710 in linked list 705 may happen because, for example, other entries 710 (which might normally have the next index after the entry at the end of linked list 705) might have been used in another linked list 705 for another submission queue 415. Thus, to keep entries 710 "in order" within linked list 705, entries 710 may also include pointer 745 to the next entry 710 in linked list 705. Thus, for example, entry 710-1 may include a pointer (such as index four) to entry 710-2, entry 710-2 may include a pointer (such as index six) to entry 710-3, and so on. In this manner, linked list 705 may be traversed from head to tail as needed.

While it is convenient to keep entries 710 until it is time to calculate the age of command 410 (which is based on timestamp 715 and which may be determined after command 410 completes its execution), this choice means that entries 710 are kept in linked list 705 until after command 410 completes its execution. When entries 710 are shared among linked lists 705 using pool of entries 735, it may be useful to return entries 710 to pool of entries 735 faster, so that they may be reused. In some embodiments of the disclosure, storage device 120 of FIG. 1 may copy timestamp 715 from entry 710 and store it somewhere locally so that entry 710 may be returned to pool of entries 735 more rapidly (which means that entries 710 may be reused more rapidly). In such embodiments of the disclosure, entries 710 may be returned to pool of entries 735 at approximately the same time as when storage device 120 of FIG. 1 accesses command 410 from submission queue 415, rather than when command 410 completes its execution.

Not shown in FIG. 7 is a data structure to manage which entries are currently in use in linked list 705 (which entries are shown in pool of entries 735 with dashed lines). A separate data structure may be used to track which entries 710 in pool of entries 735 are currently in use. Alternatively, pointer 745 may be used to identify which entries 710 in pool of entries 735 are currently in use: entries 710 that are not currently in use (and thus are available from pool of entries 735) may use a special value (for example, an address such as a null pointer that does not exist, or an index such as −1 that does not represent a valid index into pool of entries 735) to identify those entries 710 as free. When a new entry 710 is needed for linked list 705, storage device 120 of FIG. 1 may then identify an entry 710 in pool of entries 735 that is currently free, and use that entry as the next entry in linked list 705. Of course, appropriate management of the data structures, both when adding an entry to linked list 705 and when returning an entry to pool of entries 735, is important: pointers may be properly initialized when adding an entry to linked list 705 (or the other data structure may have an identifier corresponding to the entry modified), and may be reset to the special value when returning the entry to pool of entries 735 (or the other data structure may have an identifier corresponding to the entry reset).

Entry 710-5 is also shown as including last doorbell time 750 and number of doorbell events 755. These fields are optional (which explains why these fields are shown with dashed lines), and may be useful in some embodiments of the disclosure. Last doorbell time 750 may store the last time storage device 120 of FIG. 1 received a notification from processor 110 of FIG. 1 that command 410 is ready in submission queue 415, and number of doorbell events 755 may track how many doorbell events have occurred. These fields are discussed further with reference to FIG. 8 below.

In FIG. 7, where there may be a one-to-one correspondence between commands 410 in submission queue 415 and entries 710 in linked list 705, pointer 720 may be implied. That is, the correspondence between commands 410 and entries 710 may be enough to identify a particular command 410 without using pointer 720.

Figure 8:
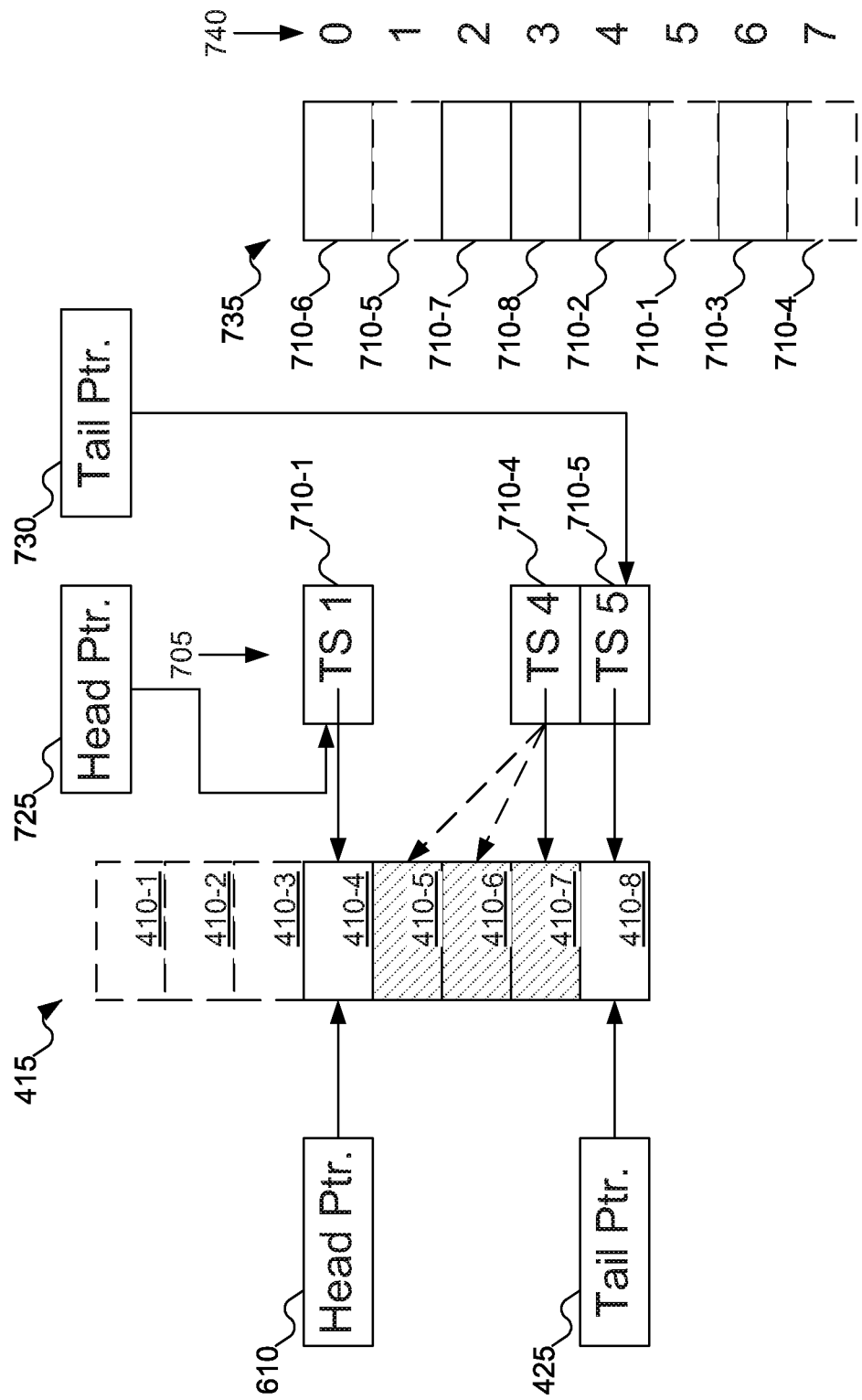
FIG. 8 shows how the storage device of FIG. 1 may use the entries of FIG. 7 to track the timestamps of FIG. 7 for the commands of FIG. 4, according to other embodiments of the disclosure.

In some embodiments of the disclosure describe above, there may be a one-to-one correspondence between commands 410 in submission queue 415 and entries 710 in linked list 705. But as noted above, depending on the number of commands 410 in submission queue 415, storage device 120 of FIG. 1 might not have enough memory 340 of FIG. 3 to store enough entries 710 for a one-to-one correspondence. Aside from pooling entries 710 and sharing entries 710 across linked lists 705, embodiments of the disclosure may also support other measures to reduce the number of entries 710 used in linked lists 705. FIG. 8 illustrates some such embodiments of the disclosure.

FIG. 8 shows how storage device 120 of FIG. 1 may use the entries of FIG. 7 to track timestamps 715 of FIG. 7 for commands 410 of FIG. 4, according to other embodiments of the disclosure. In FIG. 8, entries 710-1 and 710-5 may each be associated with individual commands: entry 710-1 may be associated with command 410-4, and entry 710-5 may be associated with command 410-8. But in FIG. 8, entry 710-4 may be associated with commands 410-5 through 410-7. By associating a single entry 710 with multiple commands 410, the number of entries 710 in use may be reduced.

There are a number of ways in which a single entry 710 may be associated with more than one command 410. In some embodiments of the disclosure, processor 110 of FIG. 1 may add multiple commands 410 to submission queue 415 and ring doorbell 425 only once for all the commands. This situation might occur, for example, if processor 110 of FIG. 1 receives multiple commands 410 from various processes (or from a single process) running on processor 110 of FIG. 1, or if a particular instruction specified by a process running on processor 110 of FIG. 1 involves multiple commands being performed by storage device 120 of FIG. 1. As a particular example, an application might request that some data be written to storage device 120 of FIG. 1, accelerator 335 of FIG. 3 to process that data, and then storage device 120 of FIG. 1 return the results to host 105. These instructions might involve two or three (or more) different commands 410. Processor 110 of FIG. 1 may load these commands 410 into submission queue 415 at approximately the same time and ring doorbell 425 once to indicate that there are commands 410 available for execution. (This example assumes that embodiments of the disclosure support processor 110 of FIG. 1 ringing doorbell 425 for multiple commands 410 added to submission queue 415 at one time. In embodiments of the disclosure where each addition of a command 410 to submission queue 415 requires its own ringing of doorbell 425, such a reduction in the number of rings of doorbell 425 might not be possible, and storage device 120 of FIG. 1 may use other approaches to reduce the number of entries 710 used, as discussed further below).

Another way in which a single entry 710 may be associated with more than one command 410 may be if storage device 120 of FIG. 1 only establishes entry 710 when storage device 120 of FIG. 1 responds to the ringing of doorbell 425. In other words, processor 110 of FIG. 1 might ring doorbell 425 multiple times before storage device 120 of FIG. 1 adds entries 710 to linked list 705. This situation might occur if, for example, processor 110 of FIG. 1 rings doorbell 425 multiple times in quick succession, and/or storage device 120 of FIG. 1 is sufficiently busy carrying out other tasks (for example, processing commands and/or performing background operations) that responding to doorbell 425 is temporarily delayed.

Yet another way in which a single entry 710 may be associated with more than one command 410 may be if storage device 120 of FIG. 1 uses time windows. That is, rather than responding to each ring of doorbell 425 by adding an entry 710 to linked list 705, storage device 120 of FIG. 1 may start a timer. During a time window, which may be of any desired duration—for example, 1 millisecond (ms)—all rings of doorbell 425 may be grouped together and treated as one ring of doorbell 425. When the timer ends—that is, when the time window closes—storage device 120 of FIG. 1 may add a single entry 710 to linked list 705 which may be associated with all commands 410 added to submission queue 415 during the time window (perhaps more accurately, the single entry 710 may be associated with all commands 410 for which processor 110 of FIG. 1 rand doorbell 425 during the time window).

The time window may be started using any desired approach. In some embodiments of the disclosure, the time window may be started at regular intervals. For example, when one time window ends, another time window may be started. In such embodiments of the disclosure, storage device 120 of FIG. 1 may check that processor 110 of FIG. 1 rang doorbell 425 at least once during the time window: if not, then there is no need to add an entry 710 to linked list 705. In other embodiments of the disclosure, after one time window ends, storage device 120 of FIG. 1 may wait until processor 110 of FIG. 1 rings doorbell 425 before starting the next time window. In such embodiments of the disclosure, there should always be at least one doorbell event during the time window, and it should not be necessary to check that there is a command 410 to associate with the entry 710 in linked list 705.

As discussed above, there are multiple ways to represent the association between a single entry 710 in linked list 705 and multiple commands 410 in submission queue 415. In some embodiments of the disclosure, entry 710 may include multiple pointers 720 of FIG. 7, each pointing to a command 410 associated with entry 710 (as discussed above with reference to FIG. 7, these pointers may be addresses in memory or some other reference to commands 410 in submission queue 415, such as using indices 615 of FIG. 6C). In other embodiments of the disclosure, entry 710 may include a pointer to the first command 410 associated with entry 710, and a number of commands that are also associated with entry 710. For example, entry 710-4 might include a pointer to command 410-5, along with a command count of three to indicate that a total of three commands are associated with entry 710-4. Alternatively, entry 710-4 may include a pointer to command 410-5 and an offset identifying the last command 410 associated with entry 710. For example, entry 710-4 might include a pointer to command 410-5 and an offset of two to indicate that two additional commands 410 (commands 410-6 and 410-7) are also associated with entry 710-4. In yet other embodiments of the disclosure, entry 710 may simply include a pointer to the first command 410 associated with entry 710: after the first command 410 associated with entry 710 is retrieved for processing, timestamp 715 of FIG. 7 in entry 710 may continue to be used until a command 410 in submission queue 415 is encountered that is associated with another entry 710. Similarly, entry 710 might include a pointer to the last command 410 associated with entry 710: once that command 410 is encountered, the system may then begin to use timestamp 715 of FIG. 7 in the next entry 710. By reducing the amount of information stored in entries 710, the size of entries 710 may be reduced, which may enable reducing the size of memory 340 of FIG. 3 (or storing more entries 710 in memory 340 of FIG. 3).

In still other embodiments of the disclosure, entry 710-5 might include only a count or an offset, without including a pointer or index to a particular command 410 in submission queue 415. In such embodiments of the disclosure, commands 410 associated with entry 710 may be determined when entry 710 is pointed to by head pointer 725, and may include the command currently pointed to by head pointer 610. Because the commands 410 associated with entry 710 may depend on head pointer 610, the count or offset may be decremented as commands 410 are removed from submission queue 415 (that is, as head pointer 610 is advanced along submission queue 415), so that entry 710 continues to identify commands 410 that are associated with entry 710 but not other commands associated with other entries 710.

In the remainder of this document, the term "reference", at least in the context of identifying commands 410 associated with entries 710, is intended to mean that there is some way, directly or indirectly, of identifying a particular command 410 in submission queue 415 as being associated with an entry 710. In some embodiments of the disclosure, this reference may be direct, with entry 710 specifically identifying command 410 as associated with entry 710, be it by entry 710 including pointer 720 of FIG. 7 or index 615 of FIG. 6C of command 410 in submission queue 415, or any other desired direct reference. In some embodiments of the disclosure, the reference may be indirect, with entry 710 including enough information to conclude that command 410 is associated with entry 710 without entry 710 expressly identifying command 410 as identified with entry 710. For example, entry 710 may include pointer 720 of FIG. 7 (or index 615 of FIG. 6C) identifying command 410 in submission queue 415 and either a command count or offset that may indicate which other commands 410 may also be associated with entry 710: these other commands, while not directly associated with entry 710, may still be considered associated with entry 710. Or, command 410 may be associated with entry 710 based on entry 710 being at the head of linked list 705 (that is, pointed to by head pointer 725) and command 410 is in a set of commands starting at command 410 pointed to by head pointer 610 and continuing for a count or offset in entry 710. In addition, any mention of "pointer 720" of FIG. 7 may be understood to be replaceable with alternative forms for "pointer 720" of FIG. 7, or "reference" as this term is described above.

Entry 710, as shown in FIG. 7, includes one pointer 720 of FIG. 7 to command 410. The question may therefore arise as to how multiple commands 410 may be associated with a single entry 710. It is possible to add additional pointers to entry 710. For example, in some embodiments of the disclosure entry 710 might include two pointers to commands 410 in submission queue 415: one pointer to the first command 410 associated with entry 710, and another pointer (such as pointer 720 of FIG. 7) to the last command 410 associated with entry 710. By implication, any commands 410 in submission queue 415 between these two pointers may also be associated with entry 710. But such embodiments of the disclosure may increase the size of entries 710, which may reduce the number of entries 710 supported by memory 340 of FIG. 3. Other embodiments of the disclosure may therefore associate the last command 410 with entry 710. Then, by implication, any commands 410 between the current and previous entries 710 (and therefore are not associated with other entries 710) are considered associated with the entry 710. This choice is shown in FIG. 8 by using dashed lines from entry 710-4 to entries 410-5 and 410-6.

In some embodiments of the disclosure, entry 710 may include number of doorbell events 755 of FIG. 7. Number of doorbell events 755 of FIG. 7 may be a count of the number of times processor 110 of FIG. 1 rang doorbell 425 during a particular time window. Each time doorbell 425 is rung, number of doorbell events 755 of FIG. 7 may be incremented (when a new entry 410 is added to linked list 705, number of doorbell events 755 of FIG. 7 for the new entry may be set to zero). This information may be useful in case the number of doorbell events during a time window causes an overflow (for example, too many doorbell events occur during a time window).

In some embodiments of the disclosure, entries 710 may include last doorbell time 750 of FIG. 7. Last doorbell time 750 of FIG. 7 may be the timestamp when processor 110 of FIG. 1 last (that is, most recently) rang doorbell 425 during the time window. Last doorbell time 750 of FIG. 7 may be used, for example, in case of an overflow during a time window (such as an overflow of the number of doorbell events): last doorbell time 750 of FIG. 7 may provide additional information that may be used to address any problems. In some embodiments, last doorbell time 750 of FIG. 7 and timestamp 715 of FIG. 7 may be the same field, rather than different fields in entry 710.

Because there is more than one command 410 in submission queue 415, the commands 410 might have been added to submission queue 410 at different times. For example, if processor 110 of FIG. 1 rings doorbell 425 multiple times before storage device 120 of FIG. 1 adds entry 710 to linked list 705, it is possible that two or more commands 410 may have been added to submission queue 415 at different times, or if entry 710 is added to linked list 705 after a time window ends. In these embodiments of the disclosure, timestamp 715 of FIG. 7, as stored in entry 710, might be slightly incorrect with respect to one or more commands 410 associated with entry 710. But while a slight inaccuracy of timestamp 715 of FIG. 7 might mean that the tracked age for one (or more) commands 410 is not entirely accurate, the tracked age may still be more accurate than if the tracked age only measures the time storage device 120 of FIG. 1 spends processing the command.

When commands 410 that were added to submission queue 415 at different times are associated with a single entry 710, there may be a choice for timestamp 715 of FIG. 7. For example, the time any individual command 410 associated with entry 710 was added to submission queue 415 may be used as timestamp 715 of FIG. 7. Alternatively, for a time window, the start time or the end time for the time window may also be used as timestamp 715 of FIG. 7.

When multiple commands 410 are associated with a single entry 710 in linked list 715, management of entry 710 may be slightly different. Since there may be commands 410 that have not yet been executed by storage device 120 of FIG. 1 when one command 410 completes, it might not be appropriate to return entry 710 to pool of entries 735. For example, consider entry 710-4 in FIG. 8. When command 410-5 completes, commands 410-6 and 410-7 might still be pending execution, or waiting to be executed. Returning entry 710-4 to pool of entries 735 when commands 410-6 and 410-7 are still incomplete might make it more difficult to track the age of commands 410-6 and 410-7 (since timestamp 715 of FIG. 7 in entry 710-4 may no longer be available). Timestamp 715 of FIG. 7 in entry 710-4 might be copied into memory 340 of FIG. 3 so that entry 710-4 may be returned to pool of entries 735: but if multiple commands are being executed in parallel by storage device 120 of FIG. 1, storing timestamp 715 of FIG. 7 somewhere else in memory 340 of FIG. 3 to return entry 710-4 early might make it more complicated to track which timestamp 715 of FIG. 7 is for which command 410 being executed (particularly since commands 410 might complete in a different order than they were added to submission queue 415).

Some embodiments of the disclosure may address this issue by keeping entry 710-4 in linked list 705 until all commands 410 associated with entry 710-4 have completed execution. For example, until commands 410-5, 410-6, and 410-7 have all completed, entry 710-4 may be kept in linked list 705. If commands 410 are completed in the same order as they were added to submission queue 415 (for example, command 410-5 is guaranteed to complete no later than command 410-6, and command 410-6 is guaranteed to complete no later than command 410-7), returning entry 710-4 to pool of entries 735 may be simpler: once the command 410 identified by pointer 720 of FIG. 7 has completed execution, entry 710-4 may be returned to pool of entries 735.

Figure 9A:
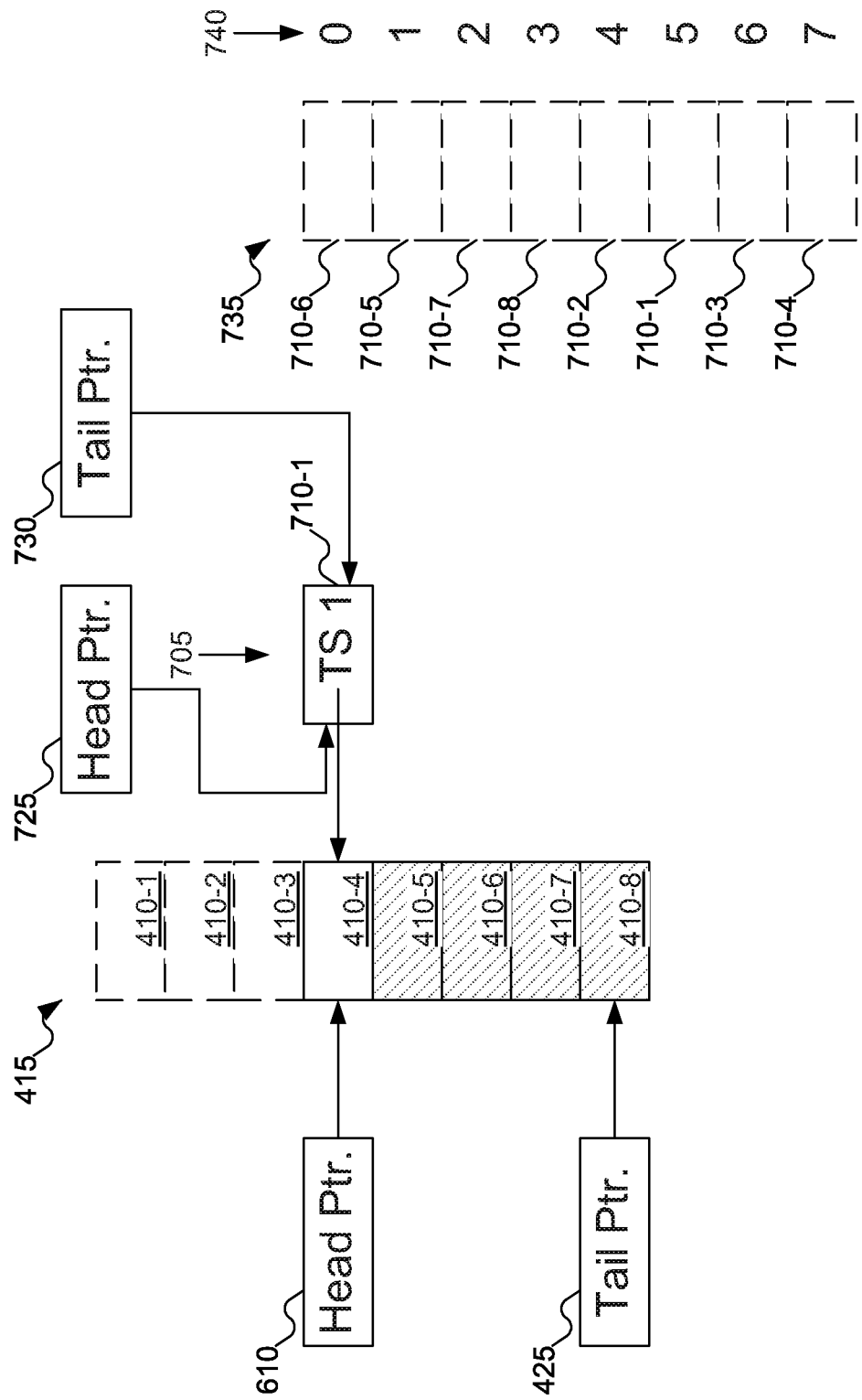
FIG. 9A shows how the storage device of FIG. 1 may use the entries of FIG. 7 to track the timestamps of FIG. 7 for the commands of FIG. 4, according to still other embodiments of the disclosure.

But even with associating multiple commands 410 with an entry 710, it might still happen that pool of entries 735 might be emptied: that is, pool of entries 735 might not have any free entries when processor 110 of FIG. 1 rings doorbell 425. For example, consider FIG. 9A. In FIG. 9A, pool of entries 735 has no entries available: they are all currently in use. (While linked list 705 only shows entry 710-1 in use, this situation may arise if there are multiple submission queues 415, in which case the other entries 710 may be used by linked lists 705 associated with the other submission queues 415.) Thus, when processor 110 of FIG. 1 notifies storage device 120 of FIG. 1 that commands 410-5 through 410-8 are available, storage device 120 of FIG. 1 may not have an entry 710 that may be associated with any or all of these commands. Entries 410-5 through 410-8 are shown with hatching to represent that they are not currently associated with an entry 710 in linked list 705.

Thus, another concern exists: how to handle age tracking when there are no entries 710 available to add to linked list 705. In such situations, age tracking may be based on the time at which storage device 120 of FIG. 1 removes command 410 from submission queue 415. But there are other options.

Figure 9B:
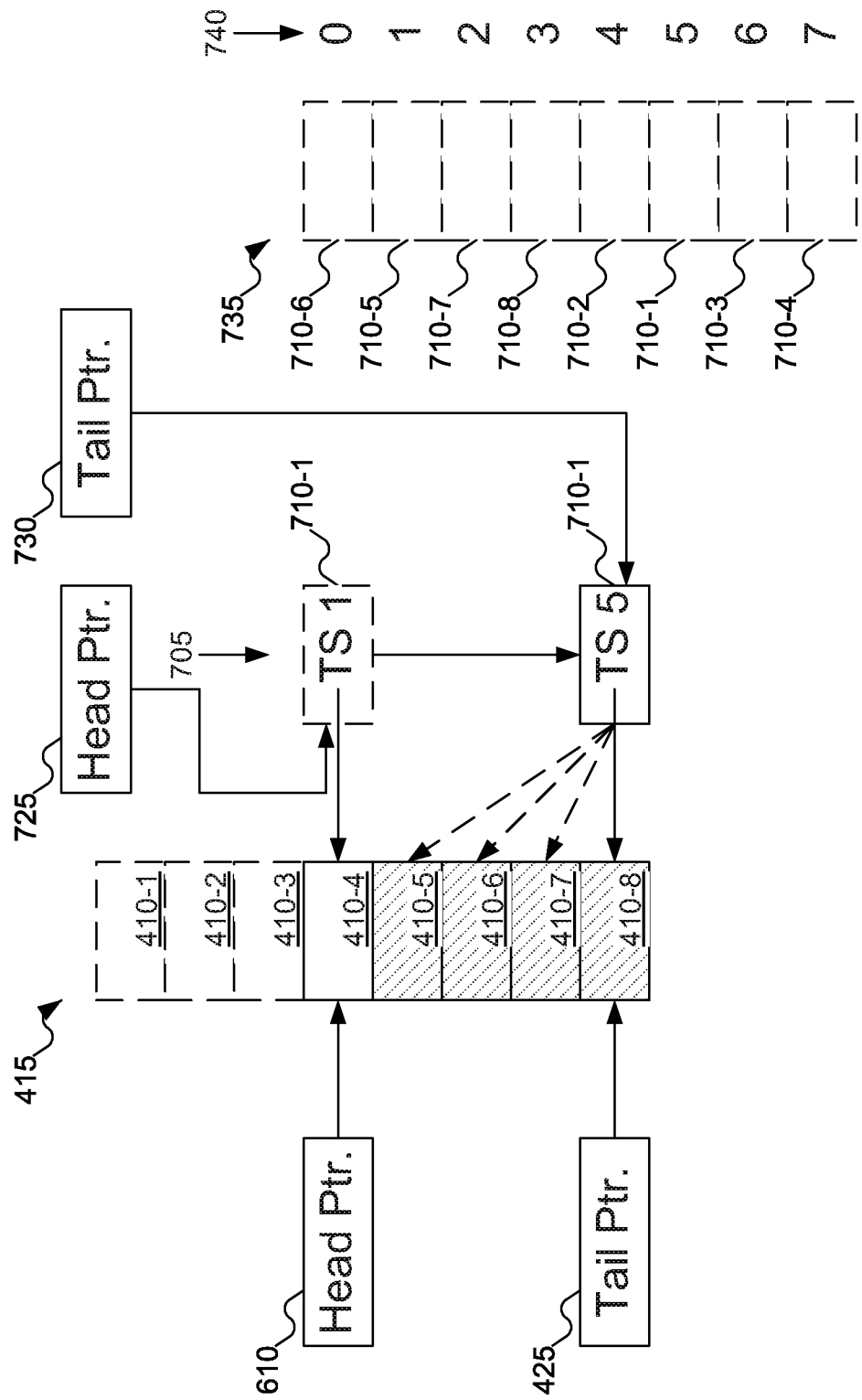
FIG. 9B shows how the storage device of FIG. 1 may use relaxed marking for the entries of FIG. 7 to track the timestamps of FIG. 7 for the commands of FIG. 4, according to still other embodiments of the disclosure.

FIG. 9B shows how storage device 120 of FIG. 1 may use relaxed marking for entries 710 of FIG. 7 to track timestamps 715 of FIG. 7 for commands 410 of FIG. 4, according to still other embodiments of the disclosure. In relaxed marking, in some embodiments of the disclosure, when entry 710 becomes free, rather than returning entry 710 to pool of entries 735 and then using entry 710 to add to linked list 705, entry 710 may be reused immediately in linked list 705. For example, in FIG. 9B, assume that command 410-4 has completed execution, as well as its age tracking (in which case head pointer 610 into submission queue 415 may be updated to point to command 410-5). Instead of returning entry 710-1 to pool of entries 735, entry 710-1 may be reused, timestamp 715 of FIG. 7 may be assigned a time, and entry 710-1 may be associated with commands 410-5 through 410-8.

The time assigned to timestamp 715 of FIG. 7 may be the time entry 710-1 is reused to be associated with commands 410-5 through 410-8. Alternatively, if storage device 120 of FIG. 1 tracks somewhere the last time processor 110 of FIG. 1 rang doorbell 425, that time may be used for timestamp 715 of FIG. 7. FIG. 9B is described as using "relaxed marking" because timestamp 715 of FIG. 7, as updated in entry 710-1 when it is reused, the time stored in timestamp 715 of FIG. 7 is later than the time at which at least one command 410 was added to submission queue. As discussed above with reference to FIG. 8, storing a time that is later than the time at which command 410 was added to submission queue 415 might mean that the age tracking for some commands is slightly inaccurate, but such age tracking is still no worse than only measuring the time storage device 120 of FIG. 1 actually spends executing commands 410 (and the age tracking is likely more accurate than such measuring).

Figure 9C:
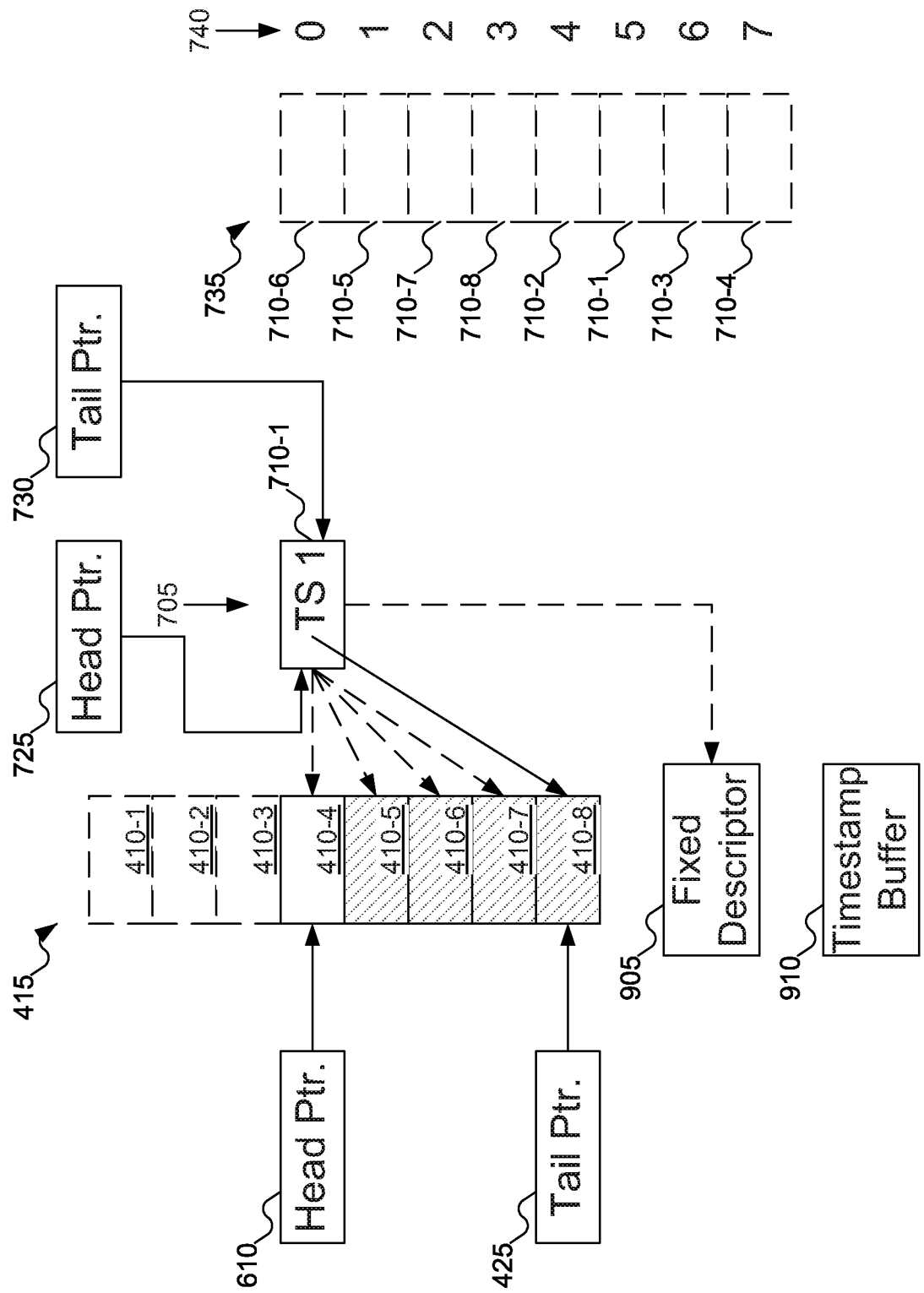
FIG. 9C shows how the storage device of FIG. 1 may use conservative marking for the entries of FIG. 7 to track the timestamps of FIG. 7 for the commands of FIG. 4, according to still other embodiments of the disclosure.

As an alternative to relaxed marking, FIG. 9C shows how storage device 120 of FIG. 1 may use conservative marking for entries 710 of FIG. 7 to track timestamps 715 of FIG. 7 for commands 410 of FIG. 4, according to still other embodiments of the disclosure. As with FIGS. 9A and 9B, in FIG. 9C, processor 110 of FIG. 1 may notify storage device 120 of FIG. 1 that commands 410-5 through 410-8 are available, but no entries 710 may be available to add to linked list 705. But unlike relaxed marking as shown in FIG. 9B, when storage device 120 of FIG. 1 is notified that commands 410-5 through 410-8 are available, storage device 120 of FIG. 1 may associate commands 410-5 through 410-8 with entry 710-1 as already established. Thus, pointer 720 of FIG. 7 may be updated to point to each of commands 410-5 through 410-8 as they are added (with implied associations to the other commands, similar to the implied associations described above with reference to FIG. 8.

The time assigned to timestamp 715 of FIG. 7 may be set when command 410-4 entry 710-1 is first added to linked list 705. That is, when commands 410-5 through 410-8 are associated with entry 710-1, timestamp 715 of FIG. 7 may remain unchanged. This choice explains why FIG. 9C is described as using "conservative marking": timestamp 715 of FIG. 7 may be approximately no later than when any associated command 410 was added to submission queue 415 (and may be earlier than when one or more associated commands 410 were added to submission queue 415). The age of any command 410 associated with entry 710, as calculated by storage device 120 of FIG. 1, may be conservative relative to the actual age of the command 410. (In some embodiments timestamp 715 of FIG. 7 may be updated to the time when commands 410 are associated with entry 710, combining aspects of both conservative marking and relaxed marking.)

Because timestamp 715 of FIG. 7 might not reflect the time processor 110 of FIG. 1 notified storage device 120 of FIG. 1 that commands 410 are available, the ages for commands 410 might not be completely accurate. With relaxed marking, the age of commands 410 might be greater than reported; with conservative marking, the age of commands 410 might be less than reported. Therefore, with relaxed marking, storage device 120 of FIG. 1 might not detect that a command 410 did not complete within the expected time; with conservative marking, storage device 120 of FIG. 1 might determine that a command 410 did not complete within the expected time when it actually did. The choice between relaxed marking and conservative marking may be decided by the manufacturer based on which result is considered desirable.

Both relaxed marking and conservative marking have a potential concern: the entry 710 associated with the commands 410 that became available when pool of entries 735 was empty may have a significant number of commands associated with it. For example, entry 710-5 of FIG. 9B has four commands associated with it, and entry 710-1 of FIG. 9C has five commands associated with it. If entries 710 are returned to pool of entries 735 after all associated commands 410 have been processed, these entries may remain in linked list 705 for an extended period until all associated commands are completely processed. This delay in returning entries 710 to pool of entries 735 may mean that no entries may be available to associate with new commands 410 in other linked lists 705: the issue may perpetuate itself, like a snake eating its own tail.

To address such issues, some modifications may be made. One option that may be used in embodiments of the disclosure is to reserve at least one entry 710 for linked list 705. If each linked list 705 is guaranteed at least one entry 710, then no linked list 705 may expect to find itself without any available entries 710. For example, entry 710-1 might be reserved for linked list 705, and no other linked list 705 may use entry 710-1, even if pool of entries 735 is otherwise empty and linked list 705 is not currently using entry 710-1. Another option that may be used in embodiments of the disclosure is to cap the number of entries 710 that may be used by each linked list 705. If linked list 705 has reached its upper bound of entries 710, no additional entries 710 may be added to linked list 705, even if there are entries 710 available in pool of entries 735. These options may help to limit pool of entries 735 becoming empty and forcing the use of relaxed or conservative marking.

A variation on the concept of dedicating an entry 710 to linked list 705 that may be used in some embodiments of the disclosure is to use a fixed descriptor (which may also be referred to as a submission queue descriptor), such as fixed descriptor 905. While fixed descriptor 905 may be dedicated to linked list 705, fixed descriptor 905 may be a copy of the contents of entry 710 pointed to by head pointer 725 of linked list 705. Put another way, the next entry 710 in linked list 705 is to be accessed for age tracking commands 410 at the head of submission queue 415, that entry 710 may be copied into fixed descriptor 905, and entry 710-1 may be immediately returned to pool of entries 735. Using fixed descriptor 905 has the benefit that an entry, such as entry 710-1, associated with several commands 410 may be returned to pool of entries 735 before all the associated commands are executed. By returning entries 710 to pool of entries 710 more quickly, the use of relaxed marking or conservative marking may be minimized (since entries 710 may be used from pool of entries 735).

In some embodiments of the disclosure, storage device 120 of FIG. 1 may include timestamp buffer 910 (which may also be referred to as a buffer). Timestamp buffer 910 may be another variation on the concept of a dedicated entry 710 to linked list 705. But rather than being a full entry 710, timestamp buffer 910 may be a temporary storage for a timestamp associated with one or more commands 410. Timestamp buffer 910 may be used when no entry 710 may be added to linked list 705 (for example, if pool of entries 735 is empty). Timestamp buffer 910, like entries 710, may also identify which command or commands 410 is/are associated with the timestamp, similar to pointer 720 of FIG. 7. Then, when an entry 710 becomes available for linked list 705, that entry 710 may be updated with information from timestamp buffer 910, and timestamp buffer 910 may be free to be used again when needed. Note that if timestamp buffer 910 is in use and additional commands 410 become available, relaxed marking or conservative marking may still be used for the additional commands. In some embodiments of the disclosure, there may be more than one timestamp buffer 910 associated with linked list 705.

In some embodiments of the disclosure, fixed descriptor 905 and/or timestamp buffer 910 may be used as entries 710 in linked list 705 (essentially, how a dedicated entry might be used). While FIG. 9C shows one fixed descriptor 905 and one timestamp buffer 910, embodiments of the disclosure may include any number (zero or more) fixed descriptors 905 and/or timestamp buffers 910. In addition, embodiments of the disclosure may include different numbers of fixed descriptor 905 and timestamp buffers 910.

In embodiments of the disclosure where there may be more than one submission queue 415 of FIG. 4, embodiments of the disclosure may have any number (zero or more) of fixed descriptors 905 and/or timestamp buffers 910 for each data structure 705. Each data structure 705 may have different numbers of fixed descriptors 905 and/or timestamp buffers 910: there is no requirement that each data structure 705 have the same number of fixed descriptors 905 or timestamp buffers 910.

The number of fixed descriptors 905 and/or timestamp buffers 910 may be known in advance: zero or more of each of fixed descriptor 905 and/or timestamp buffer 910, for each submission queue 415. Even though there may be as many as, for example, $2^{16}$ submission queues 415, in practice the number of submission queues 415 may be relatively small. The number fixed descriptors 905 and/or timestamp buffers 910 may be a small multiple (for example, five or fewer) of the number of submission queues 415. Since fixed descriptor 905 and/or timestamp buffer 910 may be relatively small (for example, approximately 40 bytes each), the overall storage needed for fixed descriptors 905 and/or timestamp buffers 910 may be relatively small (as compared with, for example, the storage used by submission queues 415 or even linked lists 705).

It is desirable for fixed descriptor 905 and/or timestamp buffer 910, like entries 710, to have a low latency. Further, because fixed descriptor 905 and/or timestamp buffer 910 may be associated with submission queue 415, fixed descriptor 905 and/or timestamp buffer 910 may not be reused like entries 710. Thus, while fixed descriptor 905 and/or timestamp buffer 910 may be stored in addresses in memory 340 of FIG. 3, other embodiments of the disclosure may offer alternative places to store fixed descriptor 905 and/or timestamp buffer 910.

In some embodiments of the disclosure, fixed descriptor 905 and/or timestamp buffer 910 may be stored in another volatile storage (not shown in FIG. 3), such as another DRAM, or in a non-volatile storage, such as flash memory chips 315 of FIG. 3 or another non-volatile storage (not shown in FIG. 3). In other embodiments of the disclosure, fixed descriptor 905 and/or timestamp buffer 910 may be stored in yet another storage element (not shown in FIG. 3). This storage element may be, for example, a small but fast hardware storage, such as hardware register in controller 310 of FIG. 3 or addresses in an SRAM.

In some embodiments of the disclosure, linked list 705 of FIGS. 7-9C may be just that: a linked list. But in other embodiments of the disclosure, linked list 705 may be replaced with any desired data structure, such as those shown in FIGS. 6A-6C.

In the above discussion, the term pointer is used. In some embodiments of the disclosure, the pointer may be an address in memory where a target data may be located. But as discussed above with reference to FIG. 6C, an index into an array may be used as a pointer. If the memory includes four GB ($2^{32}$ bits) of memory, an address might require 32 bits (four bytes) to fully represent the address, But if the array itself is relatively smaller than memory as a whole, the index into the array might require fewer bits to store. For example, if an array includes 1024 elements, then only 10 bits are needed to represent all possible indices. In the remainder of this document, the term pointer is intended to mean any desired approach to identify where a target data may be stored, including pointers and array indices.

Figure 10:
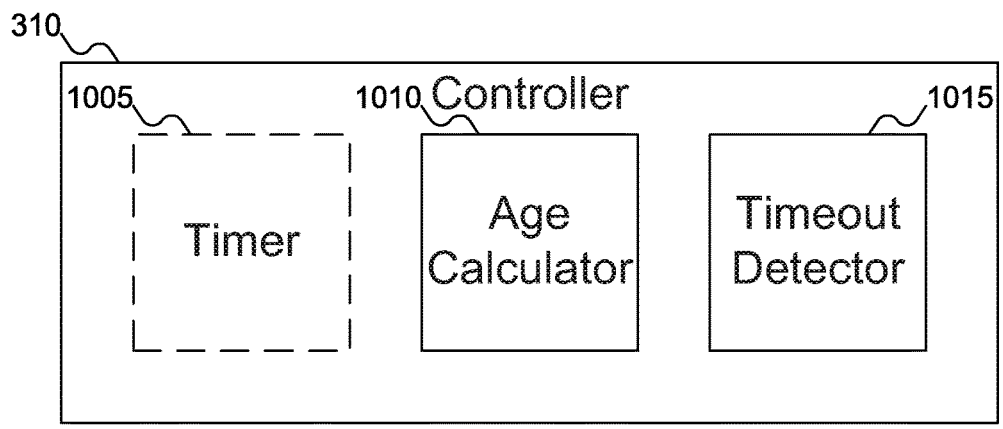
FIG. 10 shows details of the controller of FIG. 3, according to embodiments of the disclosure.

FIG. 10 shows details of controller 310 of FIG. 3, according to embodiments of the disclosure. In FIG. 10, controller 310 is shown. The components shown in controller 310 in FIG. 10 may be used for age tracking, and may be supplementary to flash memory controller 325 of FIG. 3, translation layer 330 of FIG. 3, accelerator 335 of FIG. 3, and/or memory 340 of FIG. 3: FIG. 10 is not intended to suggest that controller 310 may include either the components shown in FIG. 3 or in FIG. 10 but not both.

In FIG. 10, controller 310 is shown as including timer 1005, age calculator 1010, and timeout detector 1015. Timer 1005 may be used when commands 410 of FIG. 4 are associated with entries 710 of FIG. 8 using time windows, as described above with reference to FIG. 8. As such, timer 1005 may be optional if time windows are not being used. Age calculator 1010 may be used to calculate the age for a particular command 410 of FIG. 4. Age calculator 1010 is discussed further with reference to FIG. 11 below. Timeout detector 1015 may be used by a background process to check whether a timeout event, where a command 410 has been waiting too long for execution, has occurred. Timeout detector 1015 is discussed further with reference to FIG. 12 below.

Figure 11:
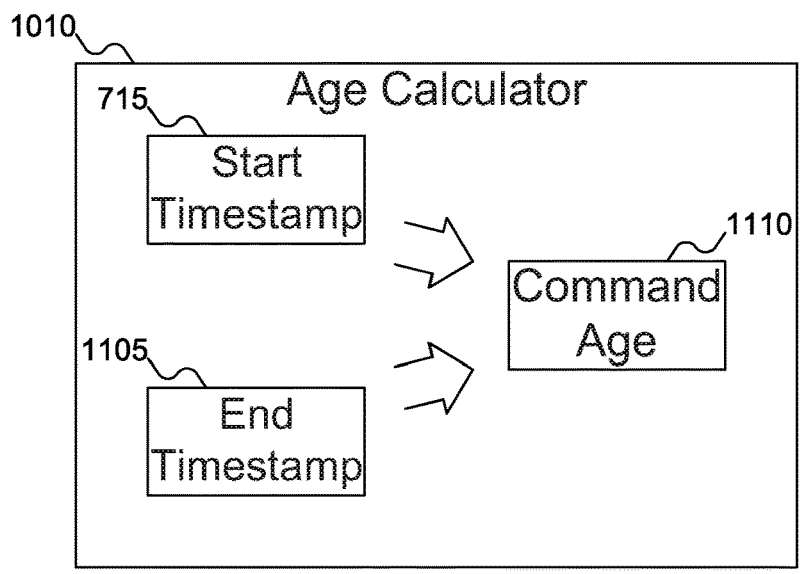
FIG. 11 shows details of the age calculator of FIG. 10, according to embodiments of the disclosure.

FIG. 11 shows details of age calculator 1010 of FIG. 10, according to embodiments of the disclosure. In FIG. 11, age calculator 1010 is shown as taking start timestamp 715, as stored in entries 710 of FIG. 7-9C and end timestamp 1105. End timestamp 1105 may be the timestamp when storage device 120 of FIG. 1 finishes processing the associated command 410 of FIG. 4. Command age 1110 may then be determined as the difference between end timestamp 1105 and start timestamp 715.

Figure 12:
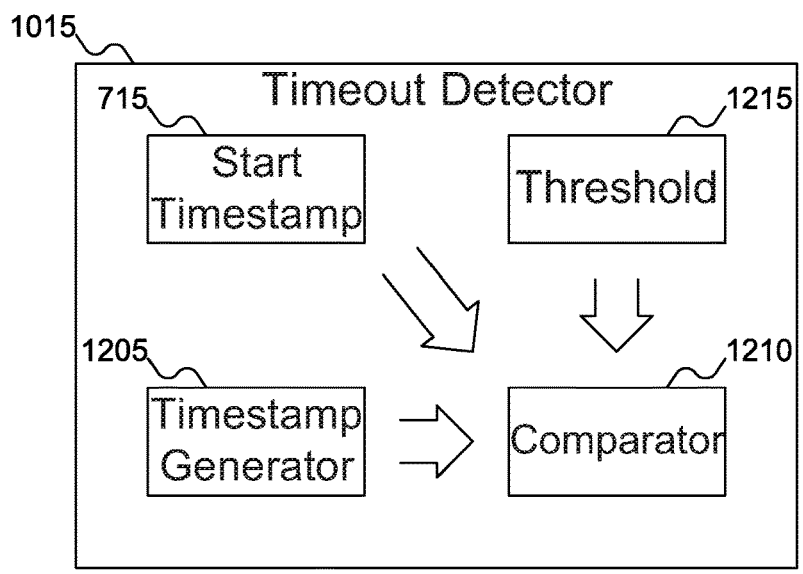
FIG. 12 shows details of the timeout detector of FIG. 10, according to embodiments of the disclosure.

FIG. 12 shows details of timeout detector 1015 of FIG. 10, according to embodiments of the disclosure. In FIG. 12, timeout detector 1015 is shown as taking start timestamp 715, as stored in entries 710 of FIG. 7-9C, and a timestamp produced by timestamp generator 1205. As timeout detector 1015 may be used to detect if a command has been waiting too long for execution, timestamp generator 1205 may generate a timestamp for the current time. The difference between the timestamp generated by timestamp generator 1205 and start timestamp 715 may be calculated, and comparator 1210 may then compare that difference with threshold 1215. Threshold 1215 may be predetermined threshold amount of time that is considered too long for a command 410 of FIG. 4 to execute. If the difference between the current timestamp and start timestamp 715 exceeds threshold 1215 as determined by comparator 1210, then timeout detector 1015 may determine that a timeout has occurred (alternatively, that a command is overage). If a timeout has occurred, the associated command 410 of FIG. 4 may be removed from submission queue 415 of FIG. 4 and subjected to error handling or may trigger an abort.

A question may arise as to what value to use for start timestamp 715. For example, if linked list 705 of FIGS. 7-9C includes multiple entries 710 of FIGS. 7-9C, there may be multiple timestamps 715 that may be used. The simplest solution is to use the entry 710 of FIGS. 7-9C pointed to by head pointer 725 of FIGS. 7-9C. If any command 410 of FIG. 4 has been waiting too long for execution, it would be the oldest command 410 available to storage device 120 of FIG. 1. In general, the entry 710 of FIGS. 7-9C pointed to by head pointer 725 of FIGS. 7-9C may be associated with the command 410 of FIG. 4 that has been waiting for execution the longest: it is unlikely (but possible) that another command 410 of FIG. 4 has an earlier start timestamp 715. Thus, start timestamp 715 may use timestamp 715 of the entry 710 of FIGS. 7-9C pointed to by head pointer 725 of FIGS. 7-9C. Of course, if entry 710 of FIGS. 7-9C pointed to be head pointer 725 of FIGS. 7-9C has been pending sufficiently long that that entry 710 of FIGS. 7-9C has timed out, there may be other entries 710 of FIGS. 7-9C that have also timed out. Timeout detector 1015 may be used with other entries 710 of FIGS. 7-9C.

But note that if there are multiple linked lists 705 of FIGS. 7-9C, it may be worthwhile to check the start timestamp 715 of the entry 710 of FIGS. 7-9C pointed to by head pointer 725 of FIGS. 7-9C of each such linked list 705 of FIGS. 7-9C. After all, while the entry 710 of FIGS. 7-9C pointed to by head pointer 725 of FIGS. 7-9C of each linked list 705 of FIGS. 7-9C may be associated with the command 410 of FIG. 4 that has been waiting for execution the longest, there may be no relative order among the start timestamps 715 associated with each such command 410 of FIG. 4.

In some embodiments of the disclosure, timeout detector 1015 may be used periodically. That is, just because storage device 120 of FIG. 1 did not experience a timeout at one point in time does not mean that a timeout might not occur later. Thus, periodically using timeout detector 1015 may be beneficial. Timeout detector 1015 may be scheduled to occur at regular intervals to scan the entirety of linked list 705 of FIG. 7-9C, or to scan entry 710 of FIGS. 7-9C pointed to by head pointer 725 of FIGS. 7-9C. Timeout detector 1015 may be used as a background process. Timeout detector 1015 may also be run when storage device 120 of FIG. 1 fetches one or more commands 410 of FIG. 4 from submission queue 415 of FIG. 4: either whenever a command 410 of FIG. 4 is fetched or periodically.

Timeout detector 1015 may operate independently from processing of command 410 of FIG. 4. That is, while timeout detector 1015 might be triggered when command 410 of FIG. 4 is fetched from submission queue 415 of FIG. 4 by storage device 120 of FIG. 1, timeout detector 1015 may function without using any information in command 410 of FIG. 4. In some embodiments of the disclosure, timeout detector 1015 may operate in a manner that is aligned with how commands 410 of FIG. 4 are removed from submission queue 415 of FIG. 4 by storage device 120 of FIG. 1, but such alignment is not required.

Figure 13:
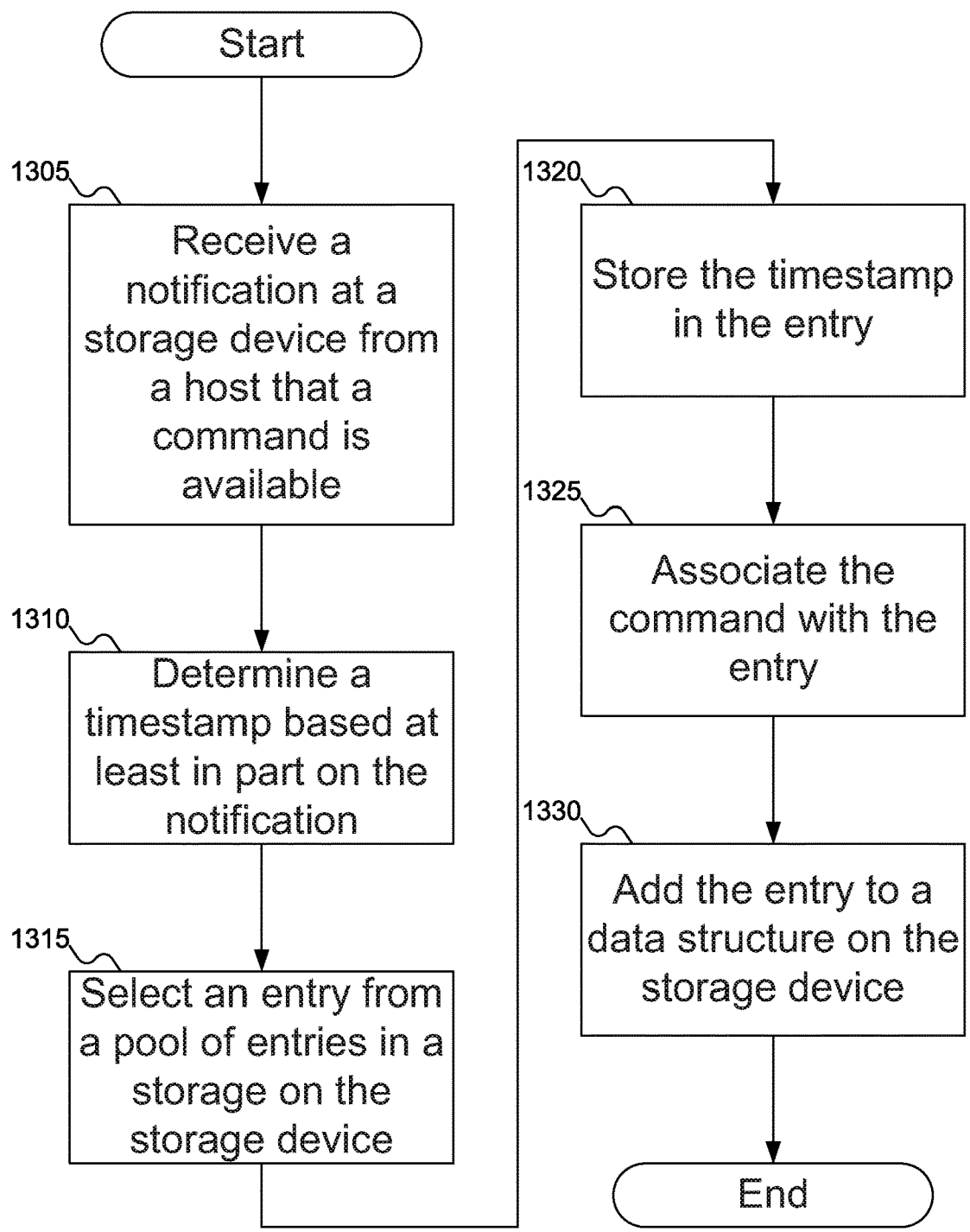
FIG. 13 shows a flowchart of an example procedure for the storage device of FIG. 1 to track command age using the entries of FIGS. 7-9C, according to embodiments of the disclosure.

FIG. 13 shows a flowchart of an example procedure for storage device 120 of FIG. 1 to track command age 1110 of FIG. 11 using entries 710 of FIGS. 7-9B, according to embodiments of the disclosure. In FIG. 13, at block 1305, storage device 120 of FIG. 1 may receive a notification from processor 110 of FIG. 1 that a command 410 of FIG. 4 is available. At block 1310, storage device 120 of FIG. 1 may determine a timestamp based on receiving the notification from processor 110 of FIG. 1. At block 1315, storage device 120 of FIG. 1 may select an entry 710 of FIGS. 7-9C from pool of entries 735 of FIGS. 7-9C. At block 1320, storage device 120 of FIG. 1 may store the timestamp 715 of FIG. 7 in the selected entry 710 of FIGS. 7-9C. At block 1325, storage device 120 of FIG. 1 may associate the selected entry 710 of FIGS. 7-9C with the command 410 of FIG. 4. Finally, at block 1330, storage device 120 of FIG. 1 may add the selected entry 710 of FIGS. 7-9C to the data structure 705 of FIGS. 7-9C used to entries 710 of FIGS. 7-9C.

Figure 14:
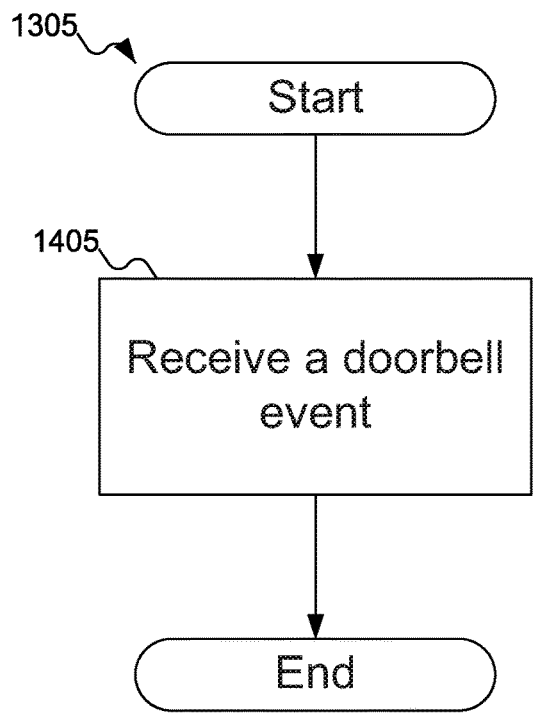
FIG. 14 shows a flowchart of an example procedure for the storage device of FIG. 1 to receive a notification from the host of FIG. 1 that a new command of FIG. 4 is ready, according to embodiments of the disclosure.

FIG. 14 shows a flowchart of an example procedure for storage device 120 of FIG. 1 to receive a notification from host 105 of FIG. 1 that a new command 410 of FIG. 4 is ready, according to embodiments of the disclosure. In FIG. 14, at block 1405, storage device 120 of FIG. 1 may receive a doorbell event from processor 110 of FIG. 1, such as processor 110 of FIG. 1 ringing doorbell 425 of FIG. 4. This doorbell event may include, for example, an update to tail pointer 425 of FIG. 4.

Figure 15:
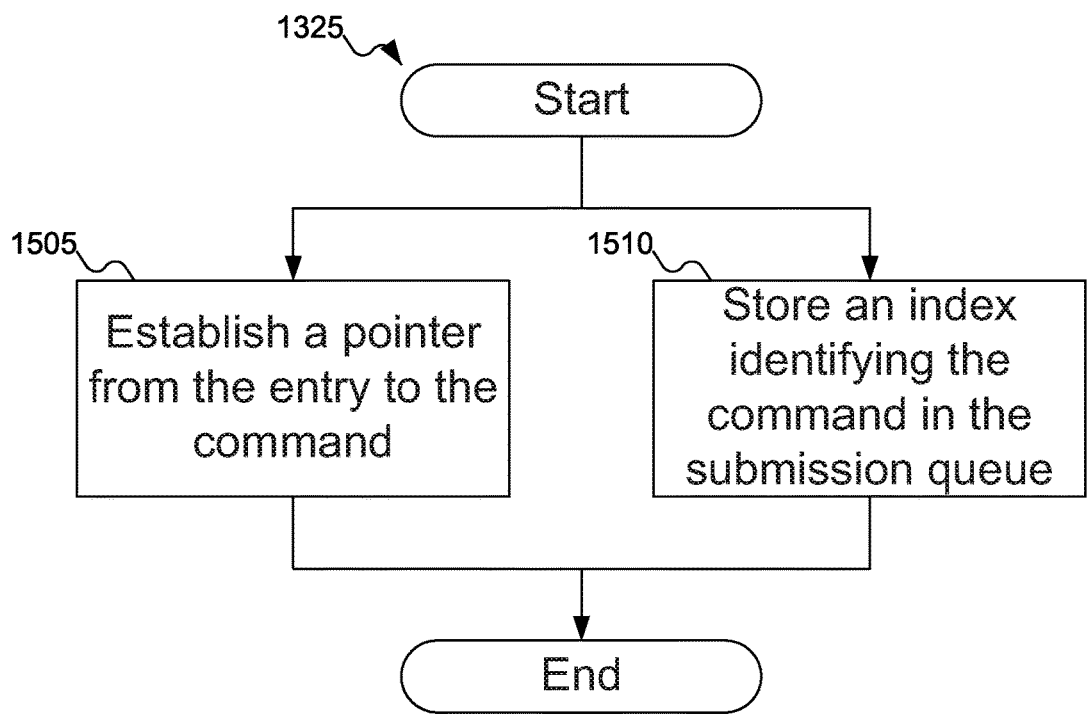
FIG. 15 shows a flowchart of an example procedure for the storage device of FIG. 1 to associate the entries of FIGS. 7-9C with the commands of FIG. 4, according to embodiments of the disclosure.

FIG. 15 shows a flowchart of an example procedure for storage device 120 of FIG. 1 to associate entries 710 of FIGS. 7-9C with commands 410 of FIG. 4, according to embodiments of the disclosure. FIG. 15 shows two different approaches to associate entries 710 of FIGS. 7-9C with commands 410 of FIG. 4. At block 1505, storage device 120 of FIG. 1 may establish pointer 720 of FIG. 7, such as a memory address, or some other reference in entry 710 of FIGS. 7-9C. This pointer may identify where the command 410 of FIG. 4 is stored. Alternatively, at block 1510, storage device 120 of FIG. 1 may store index 615 of FIG. 6C into submission queue 415 of FIG. 4, which may identify command 410 of FIG. 4 within submission queue 415 of FIG. 4.

FIG. 16 shows a flowchart of an example procedure for storage device 120 of FIG. 1 to initialize entries 710 of FIGS. 7-9C, according to embodiments of the disclosure. In FIG. 16, at block 1605, storage device 120 of FIG. 1 may initialize entry 710 of FIGS. 7-9C. This initialization may include clearing any data previously stored in entry 710 of FIGS. 7-9C, such as timestamp 715 of FIG. 7, last doorbell time 750 of FIG. 7, and/or number of doorbell events 755 of FIG. 7. At block 1610, storage device 120 of FIG. 1 may erase or overwrite pointers 720 and/or 745 of FIG. 7, to ensure that entry 710 of FIGS. 7-9C is no longer connected to any other data structure 705 of FIGS. 7-9C.

FIG. 17 shows a flowchart of an example procedure for storage device 120 of FIG. 1 to add entries 710 of FIGS. 7-9C to the data structures of FIGS. 6A-6C, according to embodiments of the disclosure. At block 1705, as entry 710 of FIGS. 7-9C may be associated with the most recent command 410 of FIG. 4 added to submission queue 415 of FIG. 4, entry 710 of FIGS. 7-9C may be at the end of data structure 705 of FIGS. 7-9C. Thus, storage device 120 of FIG. 1 may establish pointer 745 of FIG. 7 in entry 710 of FIGS. 7-9C as a null pointer. At block 1710, storage device 120 of FIG. 1 may establish pointer 745 of FIG. 7 from the entry 710 of FIGS. 7-9C previously at the end of data structure 705 of FIGS. 7-9C to point to entry 710 of FIGS. 7-9C. Finally, at block 1715, tail pointer 730 may be set to point to entry 710 of FIGS. 7-9C (so that future entries 710 of FIGS. 7-9C that may be added to data structure 705 of FIGS. 7-9C may be added at the end of data structure 705 of FIGS. 7-9C.

Figure 18:
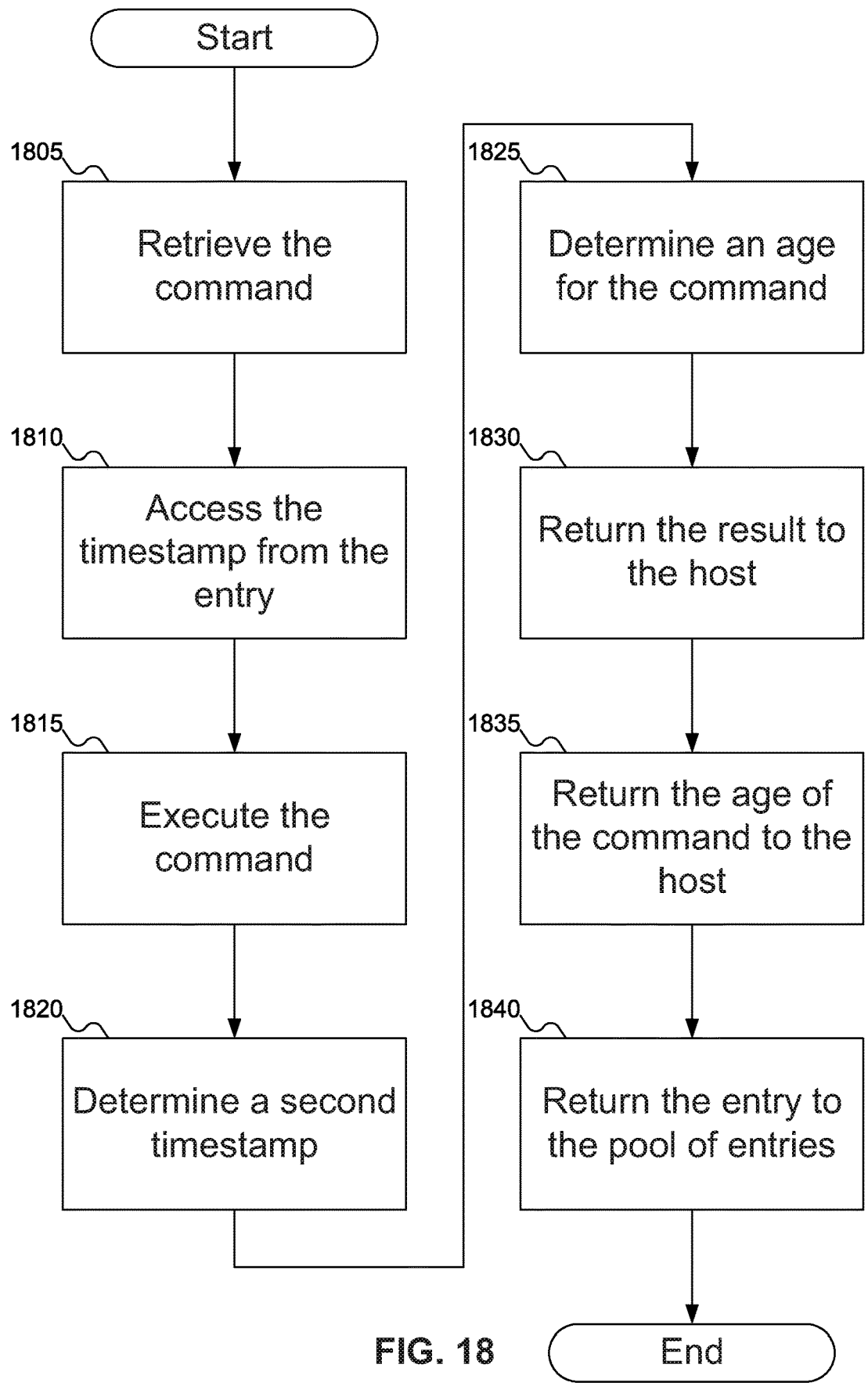
FIG. 18 shows a flowchart of an example procedure for the storage device of FIG. 1 to retrieve the command of FIG. 4 and track its age, according to embodiments of the disclosure.

FIG. 18 shows a flowchart of an example procedure for storage device 120 of FIG. 1 to retrieve command 410 of FIG. 4 and track its age, according to embodiments of the disclosure. In FIG. 18, at block 1805, storage device 120 of FIG. 1 may retrieve command 410 of FIG. 4 from submission queue 415 of FIG. 4. At block 1810, storage device 120 of FIG. 1 may access timestamp 715 of FIG. 7 from the entry 710 of FIGS. 7-9C associated with command 410 of FIG. 4. In some embodiments of the disclosure, storage device 120 of FIG. 1 may identify this entry 710 of FIGS. 7-9C as it is pointed to by head pointer 725 of FIGS. 7-9C.

At block 1815, storage device 120 of FIG. 1 may execute command 410 of FIG. 4. At block 1820, storage device 120 of FIG. 1 may determine timestamp 1105 of FIG. 1, which may represent the time when storage device 120 of FIG. 1 completes execution of command 410 of FIG. 4. At block 1825, age calculator 1010 of FIG. 10 may determine command age 1110 of FIG. 11 using timestamp 715 of FIG. 7 and timestamp 1105 of FIG. 11.

At block 1830, storage device 120 of FIG. 1 may return a result of executing command 410 of FIG. 4 to processor 110 of FIG. 1. At block 1835, if processor 110 of FIG. 1 is interested in command age 1110 of FIG. 11, storage device 120 of FIG. 1 may return command age 1110 of FIG. 11 to processor 110 of FIG. 1. Finally, at block 1840, storage device 120 of FIG. 1 may return entry 710 of FIGS. 7-9C to pool of entries 735 of FIGS. 7-9C.

Retrieving command 410 of FIG. 4 from submission queue 415 of FIG. 4 may include adjusting head pointer 610 of FIGS. 6A-6C to point to the next command 410 of FIG. 4 in submission queue 415. Note that updating head pointer 610 of FIGS. 6A-6C may also be done at other times: for example, as part of returning the result of executing command 410 of FIG. 4 to processor 110 of FIG. 1 (block 1830).

While FIG. 18 implies that block 1840, where entry 710 of FIGS. 7-9C is returned to pool of entries 735 of FIGS. 7-9C, is the last operation, some embodiments of the disclosure may include block 1840 at a different location. For example, in embodiments of the disclosure that use fixed descriptor 905 of FIG. 9C, block 1840 may be performed after the data in entry 710 of FIGS. 7-9C is copied into fixed descriptor 905 of FIG. 9C, to attempt to minimize the possibility that pool of entries 735 of FIGS. 7-9C is empty.

Figure 19:
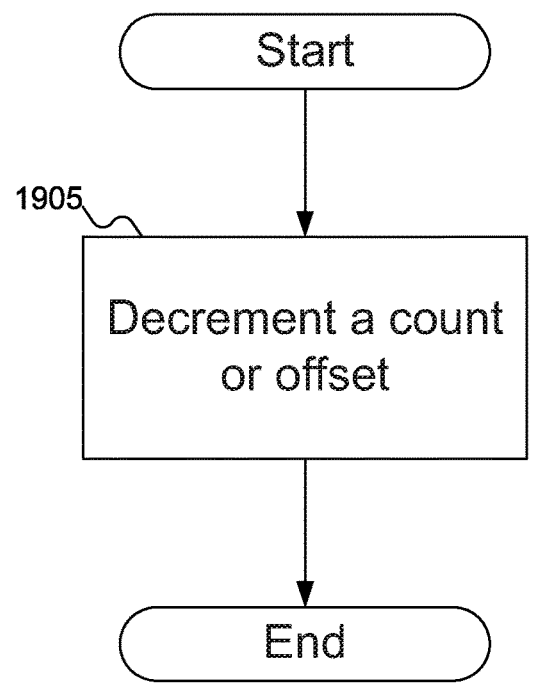
FIG. 19 shows a flowchart of an example procedure for the storage device of FIG. 1 to update the entries of FIGS. 7-9C, according to embodiments of the disclosure.

FIG. 19 shows a flowchart of an example procedure for storage device 120 of FIG. 1 to update entries 710 of FIGS. 7-9C, according to embodiments of the disclosure. Entries 710 of FIG. 7-9C may need to be updated, for example, if entries 710 of FIGS. 7-9C include references to commands 410 of FIG. 4 that are relative to head pointer 610 of FIGS. 6A-6C: as head pointer 610 of FIGS. 6A-6C change, the references may need to be updated. This situation may arise, for example, if the references in entries 710 of FIGS. 7-9C include a count or offset. For example, if an entry 710 of FIGS. 7-9C includes a count of three, that count may indicate that there are three commands 410 of FIG. 4 in submission queue 415 of FIG. 4 associated with the entry 710 of FIGS. 7-9C. But if the count is not updated as commands 410 of FIG. 4 are removed from submission queue 415 of FIG. 4, then timestamp 715 of FIG. 7 in entry 710 of FIGS. 7-9C may be considered "associated" with a command 410 of FIG. 4 with which timestamp 715 of FIG. 7 was not supposed to be associated. Thus, as commands 410 of FIG. 4 are removed from submission queue 415 of FIG. 5, at block 1905, the reference may be updated by decrementing the count or offset in entry 710 of FIGS. 7-9C. In this manner, when the count reaches zero, or after a command 410 of FIG. 4 is removed from submission queue 415 of FIG. 4 when the offset is zero, storage device 120 of FIG. 1 may know that it is time to return entry 710 of FIGS. 7-9C to pool of entries 735 of FIGS. 7-9C.

Figure 20:
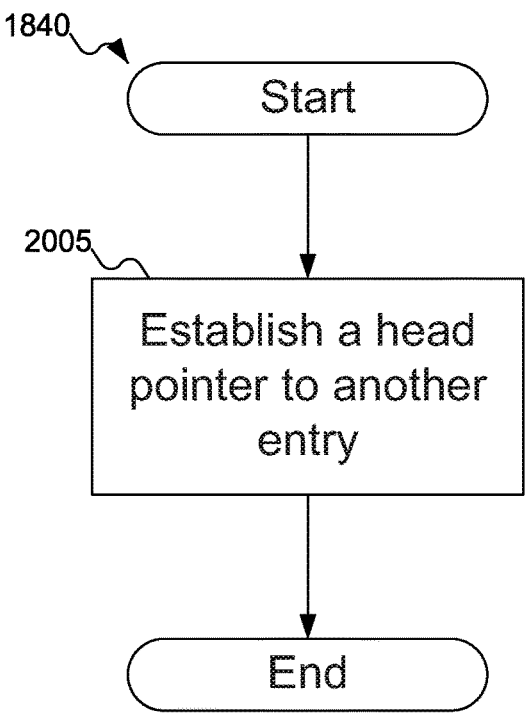
FIG. 20 shows a flowchart of an example procedure for the storage device of FIG. 1 to update the data structures of FIGS. 6A-9C upon removing the entries of FIGS. 7-9C, according to embodiments of the disclosure.

FIG. 20 shows a flowchart of an example procedure for storage device 120 of FIG. 1 to update the data structures of FIGS. 6A-9C upon removing entries 710 of FIGS. 7-9C, according to embodiments of the disclosure. At block 2005, storage device may advance head pointer 725 of FIGS. 7-9C to point to another entry 710 of FIGS. 7-9C in data structure 705 of FIGS. 7-9C.

Figure 21:
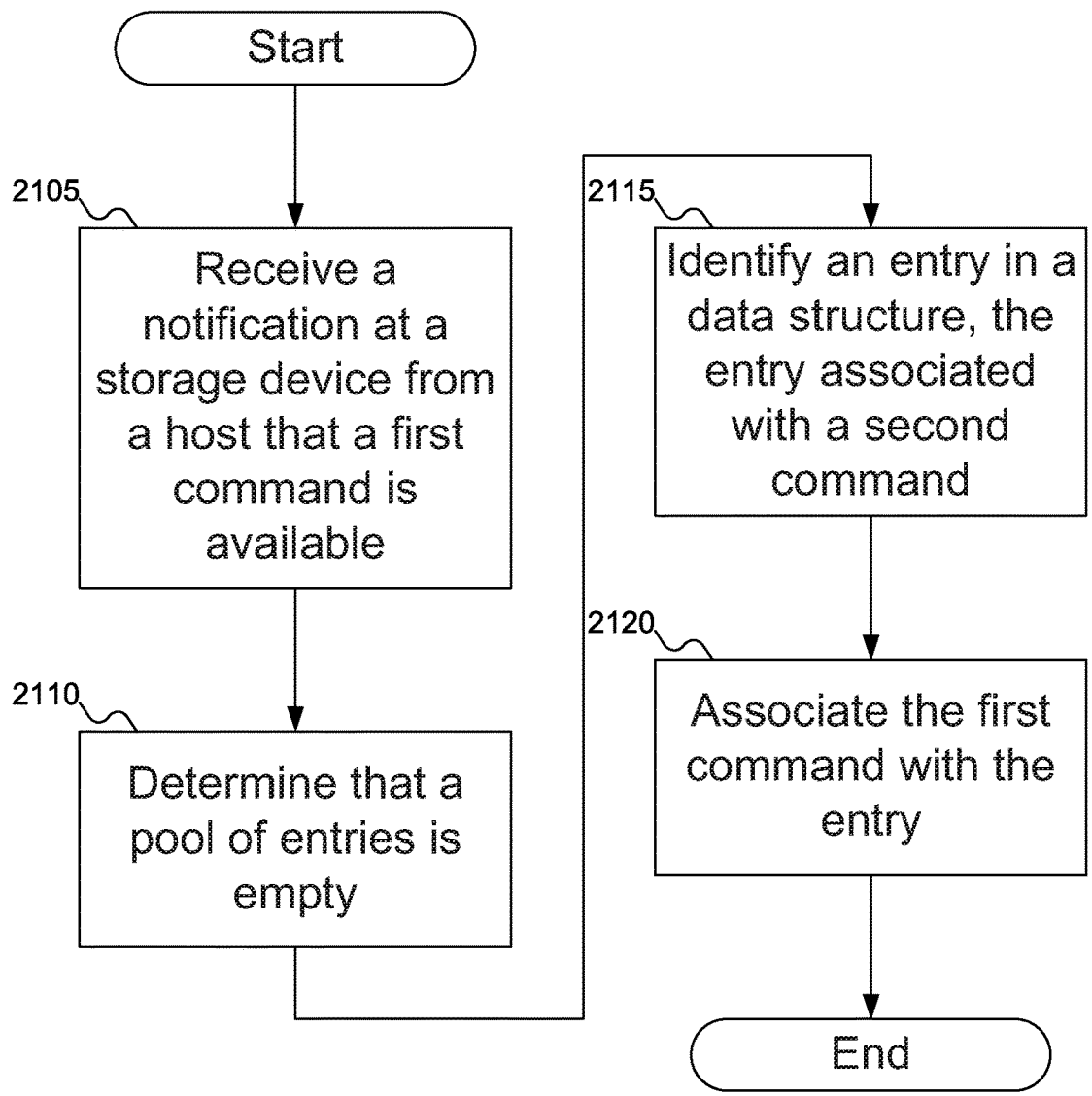
FIG. 21 shows a flowchart of an example procedure for the storage device of FIG. 1 to track command age when the pool of entries of FIGS. 7-9C is empty, according to embodiments of the disclosure.

FIG. 21 shows a flowchart of an example procedure for storage device 120 of FIG. 1 to track command age 1110 of FIG. 11 when pool of entries 735 of FIGS. 7-9C is empty, according to embodiments of the disclosure. In FIG. 21, at block 2105, storage device 120 of FIG. 1 may receive a notification from processor 110 of FIG. 1 that a command 410 of FIG. 4 is available. At block 2110, storage device 120 of FIG. 1 may determine that pool of entries 735 of FIGS. 7-9C is empty: that is, there is no entry 710 of FIGS. 7-9C available in pool of entries 735 of FIGS. 7-9C. At block 2115, storage device 120 of FIG. 1 may identify an entry 710 of FIGS. 7-9C in data structure 705 of FIGS. 7-9C already associated with another command 410 of FIG. 4. Finally, at block 2120, storage device 120 of FIG. 1 may associate command 410 of FIG. 4 with the entry 710 of FIGS. 7-9C in data structure 705 of FIGS. 7-9C.

Figure 22:
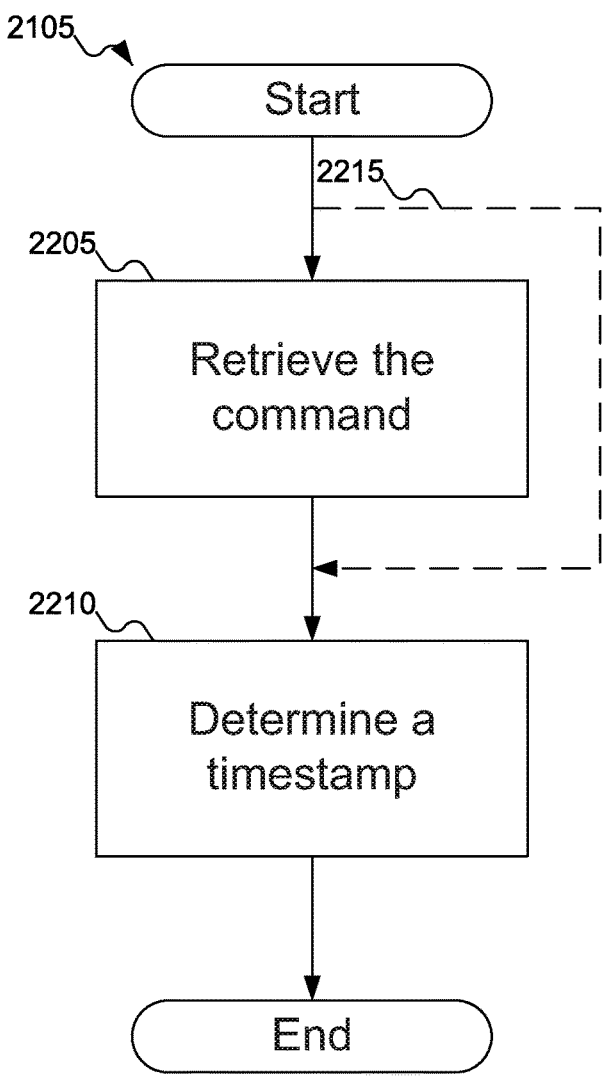
FIG. 22 shows a flowchart of an example procedure for the storage device of FIG. 1 to determine the timestamps of FIG. 7 for the commands of FIG. 4, according to embodiments of the disclosure.

FIG. 22 shows a flowchart of an example procedure for storage device 120 of FIG. 1 to determine timestamps 715 of FIG. 7 for commands 410 of FIG. 4, according to embodiments of the disclosure. In FIG. 22, at block 2205, storage device 120 of FIG. 1 may retrieve command 410 of FIG. 4 from submission queue 415 of FIG. 4. Then, at block 2210, storage device 120 of FIG. 1 may determine timestamp 715 of FIG. 7 to be used for command 410 of FIG. 4.

In some embodiments of the disclosure, storage device 120 of FIG. 1 may determine timestamp 715 of FIG. 7 as soon as possible, which might be before storage device 120 of FIG. 1 retrieves command 410 of FIG. 4 from submission queue 415 of FIG. 4. In such embodiments of the disclosure, block 2205 may effectively be skipped, as shown by dashed line 2215. Alternatively, block 2205 may be performed sometime after block 2210. But if storage device 120 of FIG. 1 does not determine timestamp 715 of FIG. 7 before retrieving command 410 of FIG. 4, storage device 120 of FIG. 1 may determine timestamp 715 of FIG. 7 when storage device 120 of FIG. 1 retrieves command 410 of FIG. 4 from submission queue 415 of FIG. 4.

Figure 23:
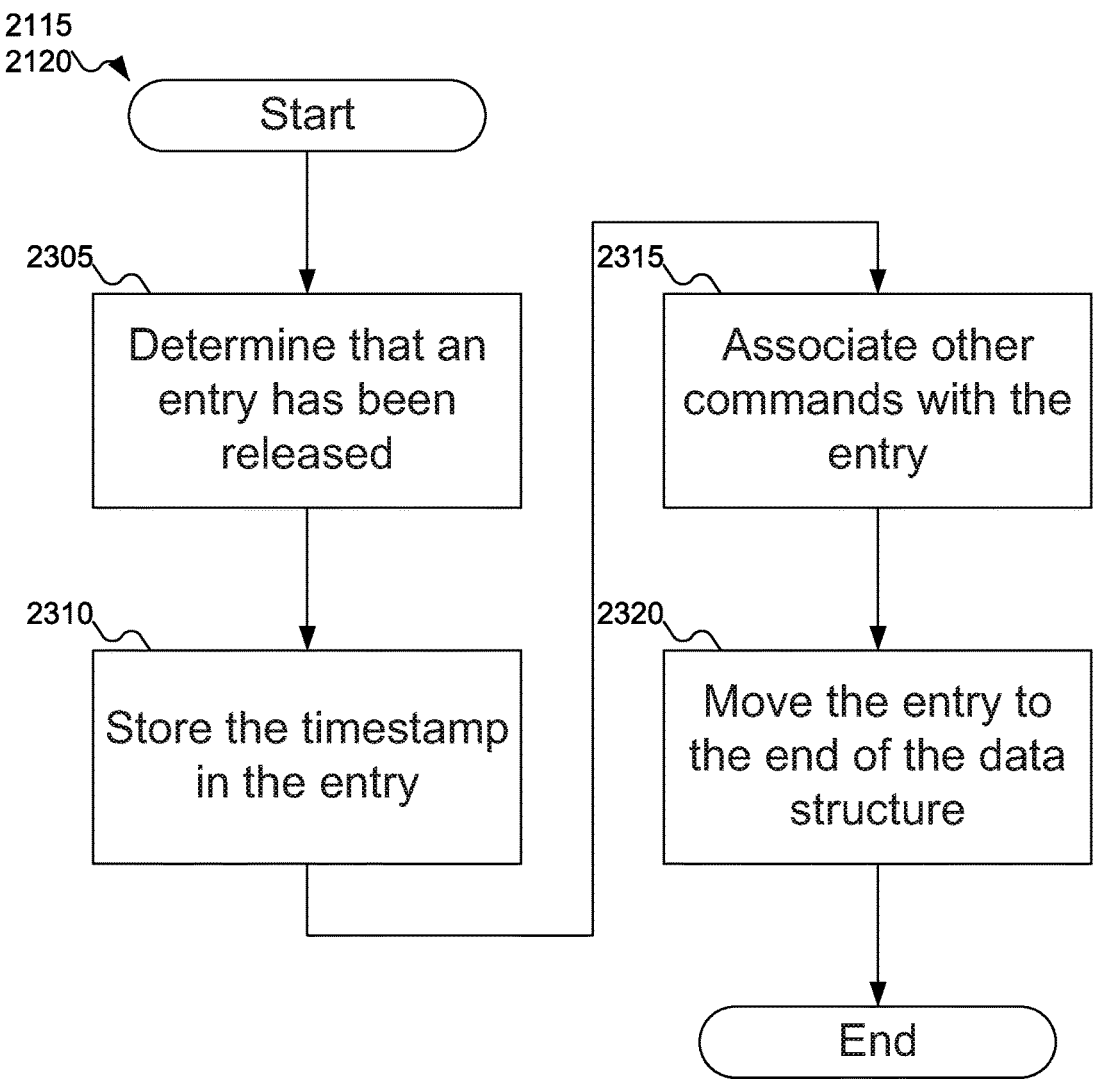
FIG. 23 shows a flowchart of an example procedure for the storage device of FIG. 1 to track command age using relaxed marking, according to embodiments of the disclosure.

FIG. 23 shows a flowchart of an example procedure for storage device 120 of FIG. 1 to track command age 1110 of FIG. 11 using relaxed marking, according to embodiments of the disclosure. In FIG. 23, at block 2305, storage device 120 of FIG. 1 may determine that entry 710 of FIGS. 7-9C has been released from data structure 705 of FIGS. 7-9C. Note that in some embodiments of the disclosure, the entry 710 of FIGS. 7-9C may be in data structure 705 of FIGS. 7-9C associated with submission queue 415 of FIG. 4 including command 410 of FIG. 4 for which entry 710 of FIGS. 7-9C is to be used. At block 2310, storage device 120 of FIG. 1 may store timestamp 715 of FIG. 7 in entry 710 of FIGS. 7-9C. Timestamp 715 may be determined at the time entry 710 of FIGS. 7-9C becomes available, or it may have been determined earlier (and stored). At block 2315, storage device 120 of FIG. 1 may associate entry 710 of FIGS. 7-9C with other commands 410 of FIG. 4 (as more than one command 410 of FIG. 4 may have become available to storage device 120 of FIG. 1 while storage device 120 of FIG. 1 was waiting for entry 710 of FIGS. 7-9C to become free. Finally, at block 2320, entry 710 of FIGS. 7-9C may be moved to the tail of data structure 705 of FIGS. 7-9C.

Figure 24:
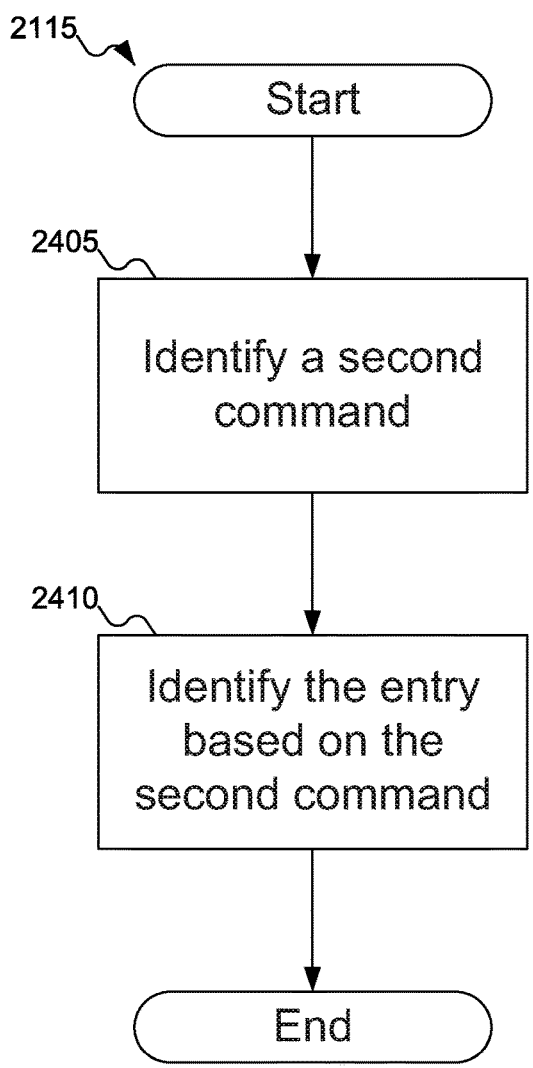
FIG. 24 shows a flowchart of an example procedure for the storage device of FIG. 1 to track command age using conservative marking, according to embodiments of the disclosure.

FIG. 24 shows a flowchart of an example procedure for storage device 120 of FIG. 1 to track command age 1110 of FIG. 11 using conservative marking, according to embodiments of the disclosure. In FIG. 24, at block 2405, storage device 120 of FIG. 1 may identify another command 410 of FIG. 4: for example, the command at the tail end of data structure 705 of FIGS. 7-9C. At block 2410 of FIG. 1, storage device 120 of FIG. 1 may identify entry 710 of FIGS. 7-9C associated with the command 410 of FIG. 4 identified at block 2405: this entry 710 of FIGS. 7-9C may also be associated with command 410 of FIG. 4.

Figure 25:
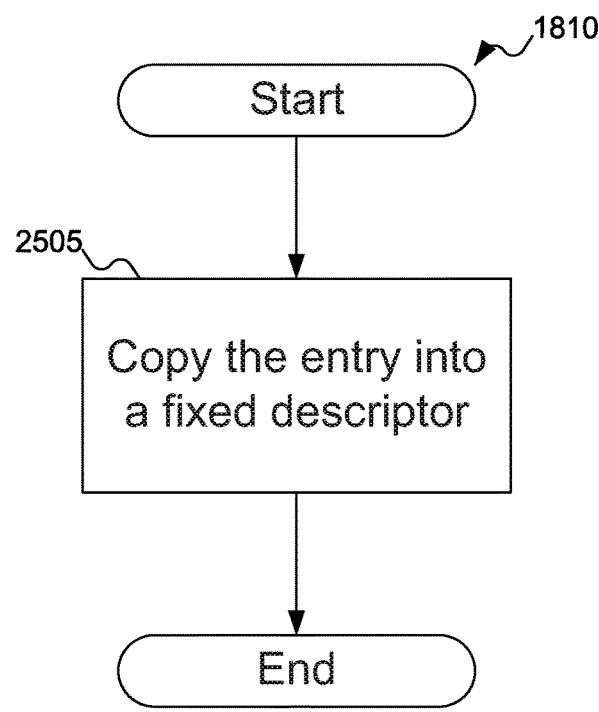
FIG. 25 shows a flowchart of an example procedure for the storage device of FIG. 1 to track command age using the fixed descriptor of FIG. 9C, according to embodiments of the disclosure.

FIG. 25 shows a flowchart of an example procedure for storage device 120 of FIG. 1 to track command age 1110 of FIG. 11 using the fixed descriptor of FIG. 9C, according to embodiments of the disclosure. In FIG. 25, at block 2505, storage device 120 of FIG. 1 may copy entry 710 of FIGS. 7-9C into fixed descriptor 905 of FIG. 9C. By copying the contents of entry 710 of FIGS. 7-9C into fixed descriptor 905 of FIG. 9C, entry 710 of FIGS. 7-9C may be released earlier, which may help to reduce or minimize the possibility that processor 110 of FIG. 1 may notify storage device 120 of FIG. 1 of a new command 410 of FIG. 4 when no entry 710 of FIGS. 7-9C is available from pool of entries 735 of FIGS. 7-9C.

Figure 26:
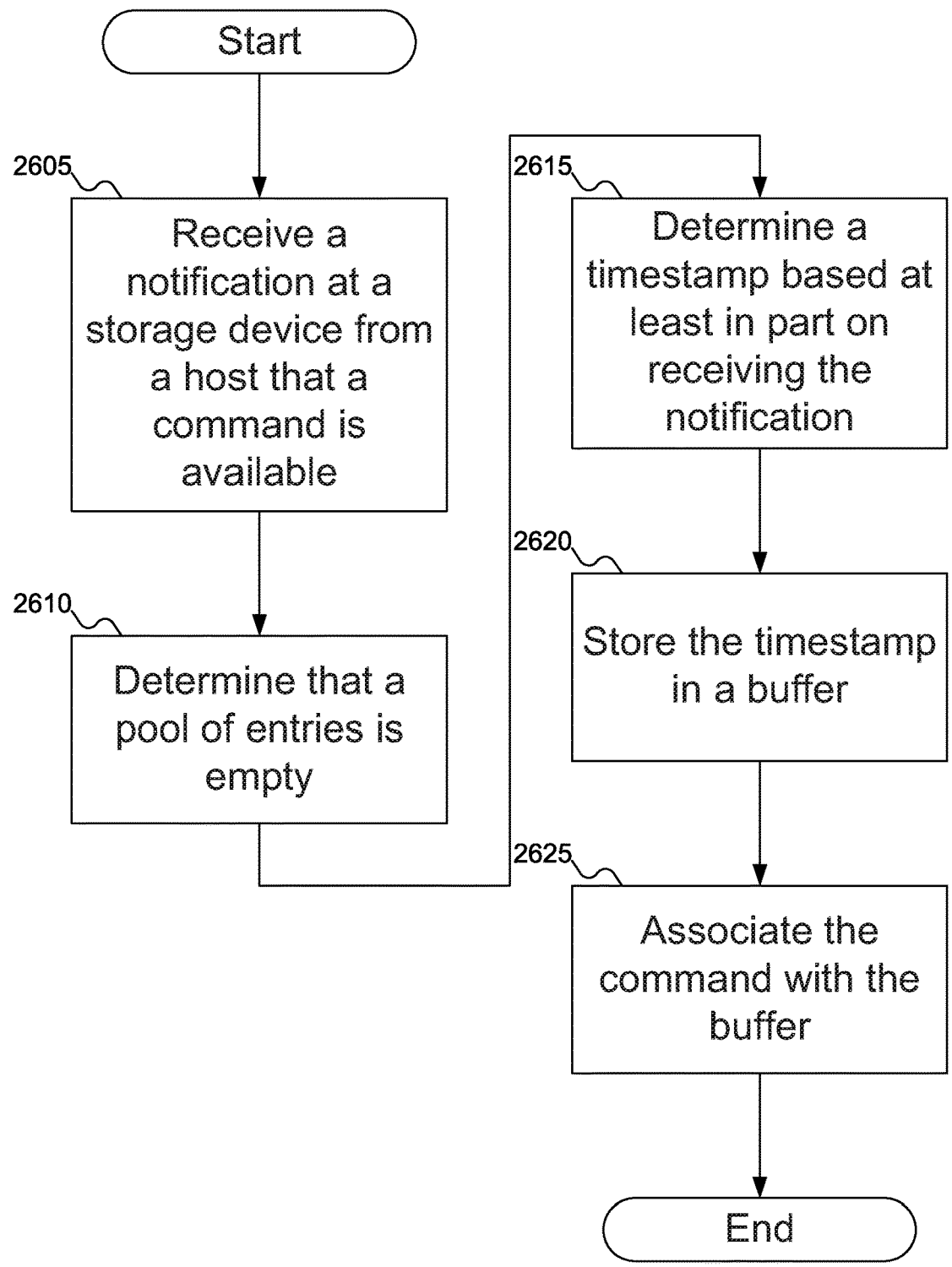
FIG. 26 shows a flowchart of an example procedure for the storage device of FIG. 1 to track command age using the timestamp buffer of FIG. 9C, according to embodiments of the disclosure.

FIG. 26 shows a flowchart of an example procedure for storage device 120 of FIG. 1 to track command age 1110 of FIG. 11 using the timestamp buffer of FIG. 9C, according to embodiments of the disclosure. In FIG. 26, at block 2605, storage device 120 of FIG. 1 may receive a notification from processor 110 of FIG. 1 that command 410 of FIG. 4 is available. At block 2610, storage device 120 of FIG. 1 may determine that pool of entries 735 of FIGS. 7-9C is empty: that is, pool of entries 735 of FIGS. 7-9C does not have an available entry 710 of FIGS. 7-9C. At block 2615, storage device 120 of FIG. 1 may determine a timestamp: for example, based on when storage device 120 of FIG. 1 received the notification from processor 110 of FIG. 1. At block 2620, storage device 120 of FIG. 1 may store the timestamp in timestamp buffer 910 of FIG. 9C. Finally, at block 2625, storage device 120 of FIG. 1 may associate command 410 of FIG. 4 with timestamp buffer 910 of FIG. 9C.

Figure 27:
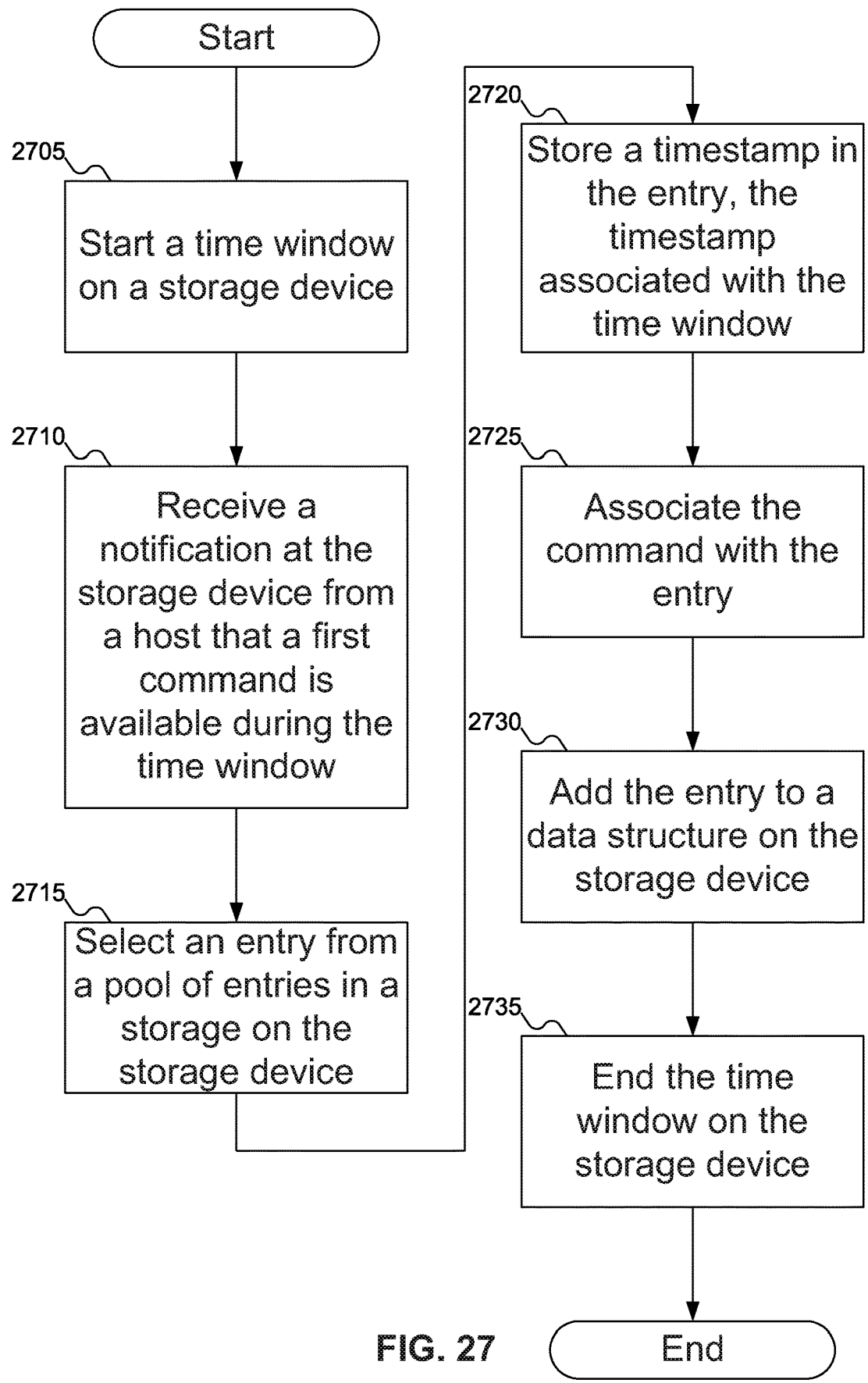
FIG. 27 shows a flowchart of an example procedure for the storage device of FIG. 1 to track command age using time windows, according to embodiments of the disclosure.

FIG. 27 shows a flowchart of an example procedure for storage device 120 of FIG. 1 to track command age 1110 of FIG. 11 using time windows, according to embodiments of the disclosure. In FIG. 27, at block 2705, storage device 120 of FIG. 1 may start a time window. At block 2710, storage device 120 of FIG. 1 may receive a notification from processor 110 of FIG. 1 that command 410 of FIG. 4 is available: this notification may be received during the time window. At block 2715, storage device 120 of FIG. 1 may select entry 710 of FIGS. 7-9C from pool of entries 735 of FIGS. 7-9C.

At block 2720, storage device may store timestamp 715 of FIG. 7 in entry 710 of FIGS. 7-9C. Timestamp 715 of FIG. 7 may be associated with the time window, and may be the start time, the (future) end time of the time window (if timestamp 715 of FIG. 7 is determined before the time window is closed), or the time when storage device 120 of FIG. 1 received the notification from processor 110 of FIG. 1 that command 410 of FIG. 4 is available. At block 2725, storage device 120 of FIG. 1 may associate command 410 of FIG. 4 with entry 710 of FIGS. 7-9C. At block 2730, storage device 120 of FIG. 1 may add entry 710 of FIGS. 7-9C to data structure 705 of FIGS. 7-9C.

If storage device 120 of FIG. 1 receives additional notifications from processor 110 of FIG. 1 that other commands 410 of FIG. 4 are available, blocks 2710 and 2725 may be repeated as necessary for each such command 410 of FIG. 4.

Finally, at block 2735, storage device 120 of FIG. 1 may end the time window.

Figure 28:
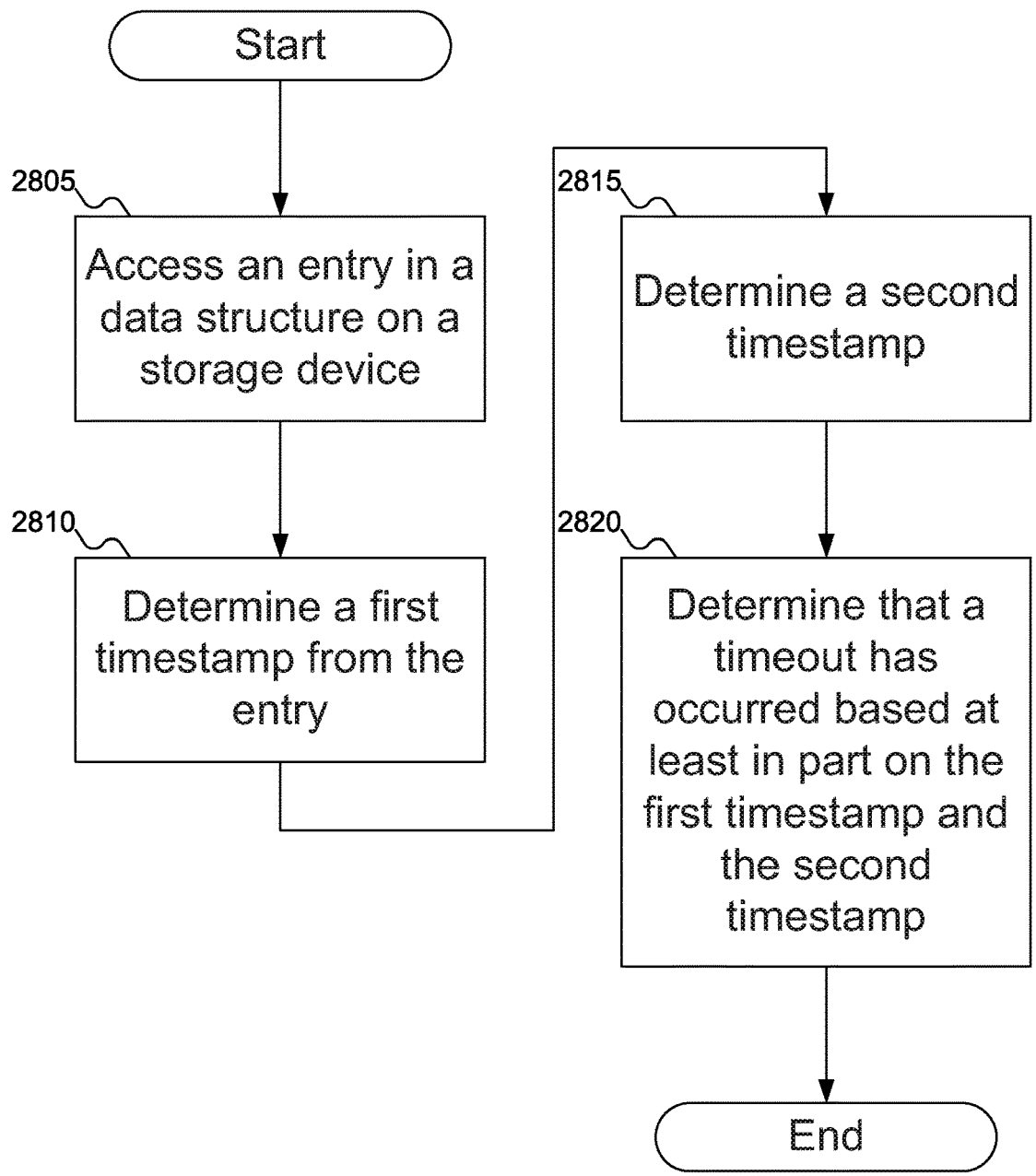
FIG. 28 shows a flowchart of an example procedure for the storage device of FIG. 1 to detect a timeout using the entries of FIGS. 7-9C, according to embodiments of the disclosure.

FIG. 28 shows a flowchart of an example procedure for storage device 120 of FIG. 1 to detect a timeout using entries 710 of FIGS. 7-9C, according to embodiments of the disclosure. In FIG. 28, at block 2805, timeout detector 1015 of FIG. 10 may access entry 710 of FIGS. 7-9C from data structure 705 of FIGS. 7-9C. In some embodiments of the disclosure, timeout detector 1015 of FIG. 10 may access entry 710 of FIGS. 7-9C pointed to by head pointer 725 of FIGS. 7-9C, as that entry 710 of FIGS. 7-9C may be the entry associated with command 410 of FIG. 4 that has been waiting the longest: if any command 410 of FIG. 4 has timed out, it would be the command 410 of FIG. 4 that has been waiting the longest. At block 2810, timeout detector 1015 of FIG. 10 may determine timestamp 715 of FIG. 7 from entry 710 of FIGS. 7-9C. At block 2815, timeout generator 1205 of FIG. 12 may determine a second timestamp, such as a timestamp for the current time. Finally, at block 2820, timeout detector 1015 of FIG. 10 may use comparator 1210 to determine if a timeout has occurred, based on timestamp 715 of FIG. 7 and the timestamp determined by timestamp generator 1205 of FIG. 12.

Figure 29:
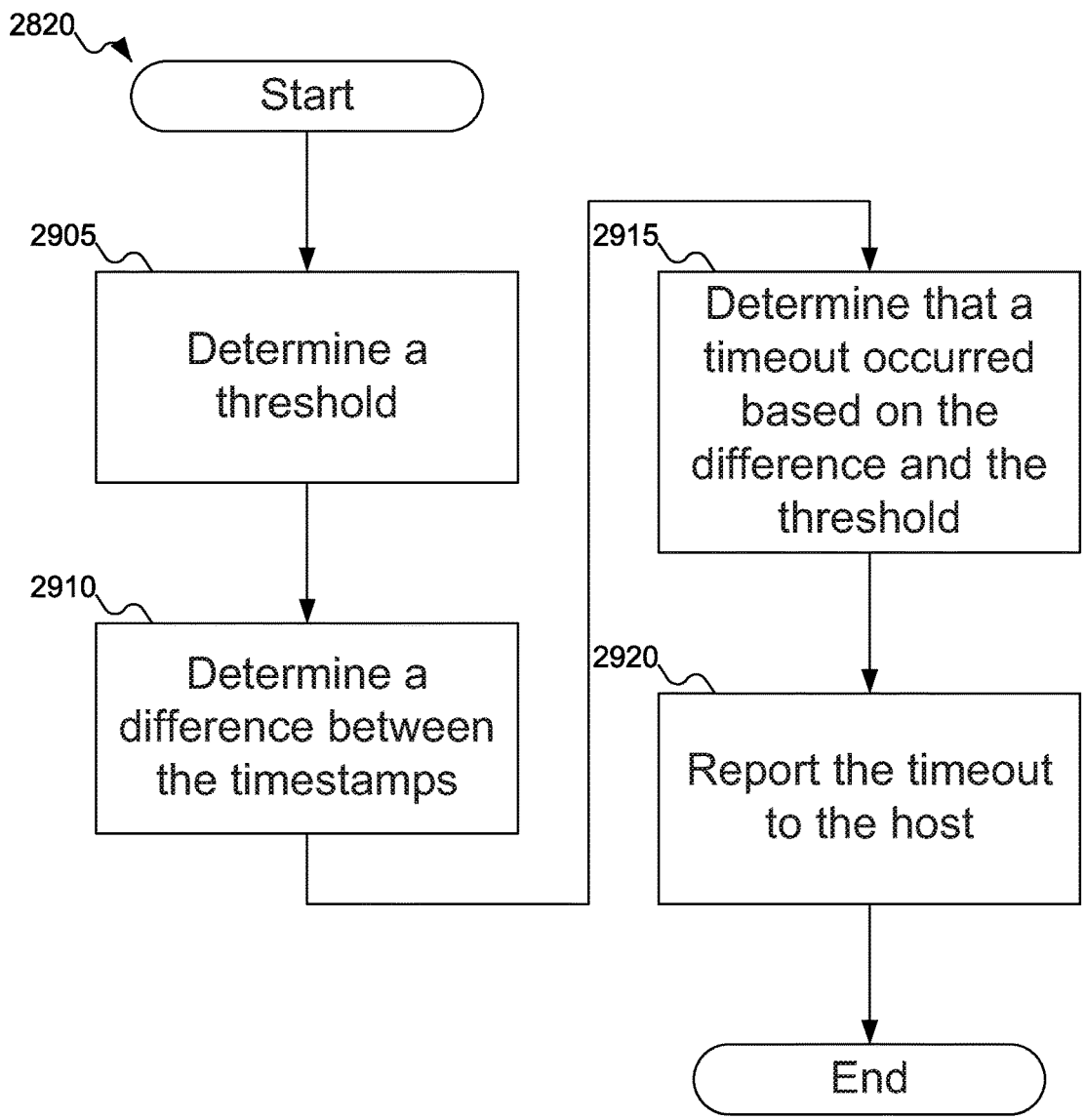
FIG. 29 shows a flowchart of an example procedure for the timeout detector of FIG. 10 to detect that a timeout has occurred, according to embodiments of the disclosure.

FIG. 29 shows a flowchart of an example procedure for timeout detector 1015 of FIG. 10 to detect that a timeout has occurred, according to embodiments of the disclosure. In FIG. 29, at block 2905, timeout detector 1015 of FIG. 10 may determine threshold 1215 of FIG. 12. Threshold 1215 of FIG. 12 may be set by the manufacturer of storage device 120 of FIG. 1, and may be a default threshold across all storage devices 120 of FIG. 1 or may be specific to storage device 120. Threshold 1215 of FIG. 12 may also be established by a customer, either programmed into storage device 120 of FIG. 1 as requested by the customer or configured into storage device 120 of FIG. 1 by the customer. At block 2910, timeout detector 1015 of FIG. 10 may determine a difference between timestamp 715 of FIG. 7 and the timestamp determined by timestamp generator 1205 of FIG. 12. At block 2915, comparator 1210 may compare the difference determined at block 2910 with threshold 1215 of FIG. 12: if the difference determined at block 2910 is greater than threshold 1215 of FIG. 12, then a timeout may have occurred. Finally, at block 2920, storage device 120 of FIG. 1 may report a timeout to host 105 of FIG. 1.

In FIGS. 13-29, some embodiments of the disclosure are shown. But a person skilled in the art will recognize that other embodiments of the disclosure are also possible, by changing the order of the blocks, by omitting blocks, or by including links not shown in the drawings. All such variations of the flowcharts are considered to be embodiments of the disclosure, whether expressly described or not.

FIGS. 6A-29 above describe various embodiments of the disclosure. These embodiments of the disclosure may be used individually or in combinations. For example, the idea of using entries 710 of FIG. 7 in data structure 705 of FIG. 7 may be combined with any of the approaches shown in FIGS. 9A-9C to deal with commands 410 of FIG. 4 received when pool of entries 735 of FIG. 7 does not have an entry 710 of FIG. 7 to store timestamp 715 of FIG. 7 for that command 410 of FIG. 4. In addition, for example, such combinations may include or omit associating multiple commands 410 of FIG. 4 with a single entry 710 of FIG. 7, as shown in FIG. 8.

Embodiments of the disclosure may have a storage device include a data structure that may store timestamps for when commands are received from the host. By storing timestamps when commands are received from the host, embodiments of the disclosure offer a technical advantage in tracking command age: the command age as tracked may be closer to the amount of time the host spends waiting for the command to be processed, rather than the amount of time the storage device spends processing the command.

In a described Non-Volatile Memory Express (NVMe) command lifecycle, a host may add command entries to a Submission Queue (SQ). The host may then ring the SQ Tail Doorbell (TDB) to notify NVMe device of the new commands. The device may fetch commands from the SQ head pointer, up to the SQ tail pointer. The device may then execute the work needed to complete command(s). Finally, the device may post completion queue (CQ) entries to a CQ, and may notify the host of presence of entries via an interrupt).

Some described NVMe devices start tracking command age after a command is fetched from a NVMe Submission Queue. The time gap between host updating SQ TDB and device SQ fetch might not be measured or monitored, as it may be expensive to do so for deep SQs or if the device supports many SQs. As a result, significant amount of a command's lifetime may be spent sitting in the SQ. In addition, device issues may cause fetch to never happen, and nothing will flag such an issue.

Embodiments of the disclosure may address such problems by using SQ TDB-based age tracking. The NVMe device may maintain a linked list (LL) per submission queue (SQ LL), and a LL of free LL Entries (Free Pool). Each LL Entry may include a timestamp of the associated SQ TDB event, an SQ Entry pointer that may be the SQ Tail pointer value associated with SQ TDB event, and a pointer to next LL Entry.

On an SQ TDB event, the NVMe device may allocate a LL Entry to track the timestamp and the SQ tail pointer value. The NVMe device may then add the LL Entry to the end of the associated SQ LL.

When the NVMe device performs a fetch event, the NVMe device may move the SQ LL head entry timestamp to the fetched command structure. If the SQ entry pointer equals the head entry of the SQ LL entry pointer, then the LL Entry may be removed from the SQ LL and release to Free Pool.

The NVMe device may include a process to scan/monitor the timestamps of SQ LL head entries to detect fetch inactivity/timeout.

In some embodiments of the disclosure, when releasing a LL Entry, and the Free Pool is empty, the NVMe device may evaluate if the LL Entry may be immediately reassigned to an SQ. This modification may limit "unknown age" duration.

In some embodiments of the disclosure, when a SQ TDB occurs, if Free Pool is empty, the tail SQ LL Entry may be reassigned to a new Tail pointer. The NVMe device may track the "last SQ TDB" time for every SQ, which a reassigned LL Entry may inherit.

In some embodiments of the disclosure, in a multi-SQ or tenant environment, LL Entries may be reserved for an SQ, or the number of LL Entries used by an SQ may be capped.

In some embodiments of the disclosure, one tracker may be used for multiple SQ TDB events that occur within a given time period (ex: 1 millisecond). This modification may reduce resource pressure (number of trackers, timestamp bits), at a possible cost of timestamp accuracy.

In some embodiments of the disclosure, additional data may be stored in an LL Entry: for example, the last SQ TDB time, or a doorbell count of time window overflows.

Embodiments of the disclosure may support improved NVMe command timeout and age tracking. Embodiments of the disclosure may catch 100% detection of "SQ entry fetching stuck" issues. In normal device use cases (limited numbers of SQs and SQ size), embodiments of the disclosure may enable more accurate end-to-end command age tracking and command timeout detection. Embodiments of the disclosure may enable flexibility, for debug or in-field (focus more trackers on SQs of greater interest). Embodiments of the disclosure may support hardware resource sizing independent of SQ sizing. Embodiments of the disclosure may be scalable: more age trackers=wider use case coverage.

The following discussion is intended to provide a brief, general description of a suitable machine or machines in which certain aspects of the disclosure may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present disclosure may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the disclosure may include a tangible, non-transitory machine-readable medium comprising instructions executable by one or more processors, the instructions comprising instructions to perform the elements of the disclosures as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the disclosure with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the disclosure" or the like are used herein, these phrases are meant to generally reference embodiment possibilities, and are not intended to limit the disclosure to particular embodiment configurations. As used herein, these terms may reference the same or different embodiments that are combinable into other embodiments.

The foregoing illustrative embodiments are not to be construed as limiting the disclosure thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this disclosure as defined in the claims.

Embodiments of the disclosure may extend to the following statements, without limitation:

Statement 1. An embodiment of the disclosure includes a storage device, comprising:
a first storage for a data;
an interface to access a command from a host, the command applicable to the data;
a controller to execute the command; and
a second storage for an entry, the entry including a first data field for a timestamp and a second data field for a reference to the command.

Statement 2. An embodiment of the disclosure includes the storage device according to statement 1, wherein the second storage includes at least one of a Static Random Access Memory (SRAM) or a Dynamic Random Access Memory (DRAM).

Statement 3. An embodiment of the disclosure includes the storage device according to statement 1, wherein the second storage includes a second entry.

Statement 4. An embodiment of the disclosure includes the storage device according to statement 3, wherein the second storage includes:
a data structure, the data structure including the entry; and
a pool of entries, the pool of entries including the second entry.

Statement 5. An embodiment of the disclosure includes the storage device according to statement 3, wherein the second storage includes:
a first data structure, the first data structure including the entry; and
a second data structure, the second data structure including the second entry.

Statement 6. An embodiment of the disclosure includes the storage device according to statement 5, wherein:
the first data structure is associated with a first submission queue; and
the second data structure is associated with a second submission queue.

Statement 7. An embodiment of the disclosure includes the storage device according to statement 1, wherein the storage device includes a Non-Volatile Memory Express (NVMe) storage device.

Statement 8. An embodiment of the disclosure includes the storage device according to statement 7, wherein the NVMe storage device includes an NVMe Solid State Drive (SSD).

Statement 9. An embodiment of the disclosure includes the storage device according to statement 1, wherein the storage device is configured to receive a notification from the host that the command is available.

Statement 10. An embodiment of the disclosure includes the storage device according to statement 9, wherein the storage device is configured to receive a doorbell event from the host as the notification.

Statement 11. An embodiment of the disclosure includes the storage device according to statement 9, wherein the storage device is configured to add the entry to a data structure based at least in part on receiving the notification from the host that the command is available.

Statement 12. An embodiment of the disclosure includes the storage device according to statement 11, wherein the storage device is configured to add the timestamp to the first data field in the entry and the reference to the command to the second data field in the entry based at least in part on receiving the notification from the host that the command is available.

Statement 13. An embodiment of the disclosure includes the storage device according to statement 11, wherein the data structure includes a linked list data structure.

Statement 14. An embodiment of the disclosure includes the storage device according to statement 13, wherein the controller is configured to establish a null pointer from the entry and to establish a pointer from a second entry in the linked list data structure to the entry.

Statement 15. An embodiment of the disclosure includes the storage device according to statement 13, wherein the controller is configured to establish a tail pointer of the linked list data structure to the entry.

Statement 16. An embodiment of the disclosure includes the storage device according to statement 1, wherein the controller includes a command accessor to access the command from a submission queue, the host including the submission queue.

Statement 17. An embodiment of the disclosure includes the storage device according to statement 1, wherein the controller is configured to update the entry based at least in part on executing the command.

Statement 18. An embodiment of the disclosure includes the storage device according to statement 1, wherein:
the reference includes a count or an offset; and
the controller is further configured to decrement the count or the offset based at least in part on executing the command.

Statement 19. An embodiment of the disclosure includes the storage device according to statement 1, wherein the controller is configured to return the entry to a pool of entries based at least in part on executing the command.

Statement 20. An embodiment of the disclosure includes the storage device according to statement 1, further comprising an age calculator to determine an age of the command based at least in part on the timestamp in the first data field in the entry and a second timestamp.

Statement 21. An embodiment of the disclosure includes the storage device according to statement 20, wherein the age calculator is configured to determine the second timestamp based at least on the controller executing the command.

Statement 22. An embodiment of the disclosure includes the storage device according to statement 1, wherein the entry further includes:
a third data field for a second timestamp;
and a fourth data field for a counter.

Statement 23. An embodiment of the disclosure includes the storage device according to statement 22, wherein the controller includes a timer to determine the second timestamp.

Statement 24. An embodiment of the disclosure includes the storage device according to statement 1, wherein the controller includes a timeout detector to determine that a timeout has occurred based at least in part on the entry.

Statement 25. An embodiment of the disclosure includes the storage device according to statement 24, wherein the timeout detector includes:
a timestamp generator to determine a second timestamp; and
a comparator to determine a difference between the timestamp and the second timestamp and compare the difference with a threshold.

Statement 26. An embodiment of the disclosure includes the storage device according to statement 1, wherein the entry is associated with a second command.

Statement 27. An embodiment of the disclosure includes the storage device according to statement 1, wherein:
the storage device further comprises a submission queue descriptor; and
the controller is configured to copy the timestamp and the reference from the entry to the submission queue descriptor and to return the entry to a pool of entries based at least in part on the controller executing the command.

Statement 28. An embodiment of the disclosure includes the storage device according to statement 27, wherein:
the second storage further includes a first data structure and a second data structure;
the storage device further comprises a second submission queue descriptor;
the submission queue descriptor is associated with the first data structure; and
the second submission queue descriptor is associated with the second data structure.

Statement 29. An embodiment of the disclosure includes the storage device according to statement 1, further comprising a buffer, the buffer including a third data field for a second timestamp, the buffer associated with a second command.

Statement 30. An embodiment of the disclosure includes the storage device according to statement 29, wherein buffer further includes a fourth data field for a second reference to the second command in a submission queue, the host including the submission queue.

Statement 31. An embodiment of the disclosure includes the storage device according to statement 30, wherein the second reference includes an index identifying an element in the submission queue including the second command.

Statement 32. An embodiment of the disclosure includes the storage device according to statement 29, further comprising a second buffer, the buffer including a fourth data field for a third timestamp, the second buffer associated with a third command.

Statement 33. An embodiment of the disclosure includes the storage device according to statement 32, wherein second buffer further includes a fifth data field for a third reference to the third command in a submission queue, the host including the submission queue.

Statement 34. An embodiment of the disclosure includes the storage device according to statement 33, wherein the third reference includes an index identifying an element in the submission queue including the third command.

Statement 35. An embodiment of the disclosure includes the storage device according to statement 29, wherein:
the second storage further includes a first data structure and a second data structure;
the storage device further comprises a second buffer;
the buffer is associated with the first data structure; and
the second buffer is associated with the second data structure.

Statement 36. An embodiment of the disclosure includes a method, comprising:
receiving a notification at a storage device from a host that a command is available;
determining a timestamp based at least in part on the notification;
selecting an entry from a pool of entries in a storage on the storage device;
storing the timestamp in the entry;
associating the command with the entry; and
adding the entry to a data structure on the storage device.

Statement 37. An embodiment of the disclosure includes the method according to statement 36, wherein receiving the notification at the storage device from the host that the command is available includes receiving a doorbell event at the storage device from the host.

Statement 38. An embodiment of the disclosure includes the method according to statement 37, wherein receiving the doorbell event at the storage device from the host includes receiving an update to a tail pointer from the host.

Statement 39. An embodiment of the disclosure includes the method according to statement 36, wherein associating the command with the entry includes establishing a reference from the entry to the command.

Statement 40. An embodiment of the disclosure includes the method according to statement 39, wherein establishing the reference from the entry to the command includes establishing the reference from the entry to the command in a submission queue, the host including the submission queue.

Statement 41. An embodiment of the disclosure includes the method according to statement 40, wherein:
the host further includes a second submission queue;
the data structure is associated with the submission queue; and
the storage device includes a second data structure associated with the second submission queue.

Statement 42. An embodiment of the disclosure includes the method according to statement 41, further comprising:
receiving a second notification at the storage device from the host that a second command is available, the second command in the second submission queue;
determining a second timestamp based at least in part on the second notification;
selecting a second entry from the pool of entries in the storage on the storage device;
storing the second timestamp in the second entry;
associating the second command with the second entry; and
adding the second entry to the second data structure on the storage device.

Statement 43. An embodiment of the disclosure includes the method according to statement 39, wherein establishing the reference from the entry to the command includes storing an index identifying an element in a submission queue including the command, the host including the submission queue.

Statement 44. An embodiment of the disclosure includes the method according to statement 36, wherein selecting the entry from the pool of entries in a storage on the storage device includes initializing the entry.

Statement 45. An embodiment of the disclosure includes the method according to statement 44, wherein initializing the entry includes clearing a reference in the entry.

Statement 46. An embodiment of the disclosure includes the method according to statement 36, wherein adding the entry to a data structure on the storage device includes adding the entry to a linked list data structure.

Statement 47. An embodiment of the disclosure includes the method according to statement 46, wherein adding the entry to the linked list data structure includes: establishing a null reference from the entry; and establishing a reference from a second entry in the linked list data structure to the entry.

Statement 48. An embodiment of the disclosure includes the method according to statement 46, wherein adding the entry to the linked list data structure includes establishing a tail pointer of the linked list data structure to the entry.

Statement 49. An embodiment of the disclosure includes the method according to statement 36, further comprising:
retrieving the command by the storage device;
accessing the timestamp from the entry;
executing the command to produce a result;
determining a second timestamp based at least in part on the result;
determining an age of the command based at least in part on the timestamp and the second timestamp;
returning the result to the host from the storage device; and
returning the age of the command to the host from the storage device.

Statement 50. An embodiment of the disclosure includes the method according to statement 49, further comprising returning the entry to the pool of entries.

Statement 51. An embodiment of the disclosure includes the method according to statement 50, wherein:
the data structure includes a linked list data structure; and
returning the entry to the pool of entries includes establishing a head pointer of the linked list data structure to a second entry based at least in part on the entry.

Statement 52. An embodiment of the disclosure includes the method according to statement 49, further comprising updating the entry based at least in part on executing the command to produce the result.

Statement 53. An embodiment of the disclosure includes the method according to statement 52, wherein:
the entry includes a reference including a count or an offset; and
updating the entry based at least in part on executing the command to produce the result includes decrementing (1905) the count or the offset in the entry based at least in part on executing the command to produce the result.

Statement 54. An embodiment of the disclosure includes a method, comprising:
receiving a notification at a storage device from a host that a first command is available;
determining that a pool of entries is empty;
identifying an entry in a data structure, the entry associated with a second command; and
associating the first command with the entry.

Statement 55. An embodiment of the disclosure includes the method according to statement 54, wherein receiving the notification at the storage device from the host that the first command is available includes receiving a doorbell event at the storage device from the host.

Statement 56. An embodiment of the disclosure includes the method according to statement 55, wherein receiving the doorbell event at the storage device from the host includes receiving an update to a tail pointer from the host.

Statement 57. An embodiment of the disclosure includes the method according to statement 54, wherein identifying the entry in the data structure includes:
determining that the entry is available; and
storing a timestamp in the entry.

Statement 58. An embodiment of the disclosure includes the method according to statement 57, wherein associating the first command with the entry includes associating the first command and a third command with the entry.

Statement 59. An embodiment of the disclosure includes the method according to statement 57, wherein associating the first command with the entry includes establishing a reference from the entry to the first command.

Statement 60. An embodiment of the disclosure includes the method according to statement 59, wherein establishing the reference from the entry to the first command includes establishing the reference from the entry to the first command in a submission queue, the host including the submission queue.

Statement 61. An embodiment of the disclosure includes the method according to statement 59, wherein establishing the reference from the entry to the first command includes storing an index identifying an element in a submission queue including the first command, the host including the submission queue.

Statement 62. An embodiment of the disclosure includes the method according to statement 57, wherein identifying the entry in the data structure further includes identifying the entry in a linked list data structure.

Statement 63. An embodiment of the disclosure includes the method according to statement 62, wherein associating the first command with the entry includes moving the entry to an end of the linked list data structure.

Statement 64. An embodiment of the disclosure includes the method according to statement 62, wherein associating the first command with the entry includes:
establishing a null reference from the entry; and
establishing a reference from a second entry in the linked list data structure to the entry.

Statement 65. An embodiment of the disclosure includes the method according to statement 62, wherein associating the first command with the entry includes establishing a tail pointer of the linked list data structure to the entry.

Statement 66. An embodiment of the disclosure includes the method according to statement 57, wherein receiving the notification at the storage device from the host that the first command is available includes determining the timestamp for the first command.

Statement 67. An embodiment of the disclosure includes the method according to statement 66, wherein determining the timestamp for the first command includes determining the timestamp based at least in part on receiving the notification at the storage device from the host that the first command is available.

Statement 68. An embodiment of the disclosure includes the method according to statement 66, wherein:
the method further comprises retrieving the command; and
determining the timestamp for the first command includes determining the timestamp based at least in part on retrieving the command.

Statement 69. An embodiment of the disclosure includes the method according to statement 54, wherein identifying the entry in the data structure includes:
identifying the second command; and
identifying the entry in the data structure based at least in part on the second command.

Statement 70. An embodiment of the disclosure includes the method according to statement 69, wherein the entry includes a timestamp based at least in part on the second command.

Statement 71. An embodiment of the disclosure includes the method according to statement 69, wherein identifying the entry in the data structure based at least in part on the second command further includes identifying the entry in a linked list data structure based at least in part on the second command.

Statement 72. An embodiment of the disclosure includes the method according to statement 69, further comprising:
retrieving a third command by the storage device;

accessing a second entry associated with the third command;

copying a first timestamp in the second entry and a reference in the second entry to a submission queue descriptor;

returning the second entry to the pool of entries;

executing the third command to produce a result;

determining a second timestamp based at least in part on the result;

determining an age for the third command based at least in part on the first timestamp and the second timestamp;

returning the result to the host from the storage device; and returning the age for the third command to the host from the storage device.

Statement 73. An embodiment of the disclosure includes the method according to statement 72, wherein copying the first timestamp in the second entry and the reference in the second entry to a submission queue descriptor includes copying the first timestamp in the second entry and an index identifying an element in a submission queue including the command in the second entry to a submission queue descriptor, the host including the submission queue.

Statement 74. An embodiment of the disclosure includes the method according to statement 72, further comprising updating the submission queue descriptor based at least in part on executing the third command to produce the result.

Statement 75. An embodiment of the disclosure includes the method according to statement 74, wherein:

the reference includes a count or an offset; and updating submission queue descriptor based at least in part on executing the third command to produce the result includes decrementing (1905) the count or the offset in the submission queue descriptor based at least in part on executing the third command to produce the result.

Statement 76. An embodiment of the disclosure includes a method, comprising:

receiving a notification at a storage device from a host that a command is available;

determining that a pool of entries is empty;

determining a timestamp based at least in part on receiving the notification;

storing the timestamp in a buffer; and associating the command with the buffer.

Statement 77. An embodiment of the disclosure includes the method according to statement 76, wherein receiving the notification at the storage device from the host that the command is available includes receiving a doorbell event at the storage device from the host.

Statement 78. An embodiment of the disclosure includes the method according to statement 77, wherein receiving the doorbell event at the storage device from the host includes receiving an update to a tail pointer from the host.

Statement 79. An embodiment of the disclosure includes the method according to statement 76, wherein associating the command with the buffer includes establishing a reference from the buffer to the command.

Statement 80. An embodiment of the disclosure includes the method according to statement 79, wherein establishing the reference from the buffer to the command includes establishing the reference from the buffer to the command in a submission queue, the host including the submission queue.

Statement 81. An embodiment of the disclosure includes the method according to statement 79, wherein establishing the reference from the buffer to the command in the submission queue includes storing an index identifying an element in the submission queue including the command.

Statement 82. An embodiment of the disclosure includes the method according to statement 76, further comprising:

receiving a second notification at the storage device from the host that a second command is available;

determining that the pool of entries is empty;

determining a second timestamp based at least in part on receiving the second notification;

storing the second timestamp in a second buffer; and associating the second command with the second buffer.

Statement 83. An embodiment of the disclosure includes the method according to statement 82, wherein associating the second command with the second buffer includes establishing a reference from the second buffer to the second command in a submission queue, the host including the submission queue.

Statement 84. An embodiment of the disclosure includes the method according to statement 83, wherein establishing the reference from the second buffer to the second command in the submission queue includes storing an index identifying an element in the submission queue including the second command.

Statement 85. An embodiment of the disclosure includes the method according to statement 82, wherein:

the command is in a submission queue, the host including the submission queue; and the second command is in the submission queue.

Statement 86. An embodiment of the disclosure includes the method according to statement 82, wherein:

the command is in a submission queue, the host including the submission queue; and the second command is in a second submission queue, the host including the second submission queue.

Statement 87. An embodiment of the disclosure includes a method, comprising:

starting a time window on a storage device;

receiving a notification at the storage device from a host that a first command is available during the time window;

selecting an entry from a pool of entries in a storage on the storage device;

storing a timestamp in the entry, the timestamp associated with the time window;

associating the command with the entry;

adding the entry to a data structure on the storage device; and ending the time window on the storage device.

Statement 88. An embodiment of the disclosure includes the method according to statement 87, wherein the timestamp includes at least one of a start time for the time window or an end time for the time window.

Statement 89. An embodiment of the disclosure includes the method according to statement 87, wherein receiving the notification at the storage device from the host that the command is available includes receiving a doorbell event at the storage device from the host.

Statement 90. An embodiment of the disclosure includes the method according to statement 89, wherein receiving the doorbell event at the storage device from the host includes receiving an update to a tail pointer from the host.

Statement 91. An embodiment of the disclosure includes the method according to statement 87, further comprising:

receiving a second notification at the storage device from the host that a second command is available during the time window.

associating the second command with the entry.

Statement 92. An embodiment of the disclosure includes the method according to statement 87, wherein associating the command with the entry includes establishing a reference from the entry to the command.

Statement 93. An embodiment of the disclosure includes the method according to statement 92, wherein establishing the reference from the entry to the command includes establishing the reference from the entry to the command in a submission queue, the host including the submission queue.

Statement 94. An embodiment of the disclosure includes the method according to statement 93, wherein establishing the reference from the entry to the command in the submission queue includes storing an index identifying an element in the submission queue including the command, the host including the submission queue.

Statement 95. An embodiment of the disclosure includes the method according to statement 92, wherein:
the host further includes a second submission queue;
the data structure is associated with the submission queue; and
the storage device includes a second data structure associated with the second submission queue.

Statement 96. An embodiment of the disclosure includes the method according to statement 95, further comprising:
starting a second time window on the storage device;
receiving a second notification at the storage device from the host that a second command is available during the second time window;
selecting a second entry from the pool of entries in the storage on the storage device;
storing a second timestamp in the second entry;
associating the second command with the second entry;
adding the second entry to the second data structure on the storage device; and
ending the second time window on the storage device.

Statement 97. An embodiment of the disclosure includes the method according to statement 96, wherein the first time window is the second time window.

Statement 98. An embodiment of the disclosure includes the method according to statement 87, wherein selecting the entry from the pool of entries in a storage on the storage device includes initializing the entry.

Statement 99. An embodiment of the disclosure includes the method according to statement 98, wherein initializing the entry includes clearing a reference in the entry.

Statement 100. An embodiment of the disclosure includes the method according to statement 87, wherein adding the entry to a data structure on the storage device includes adding the entry to a linked list data structure.

Statement 101. An embodiment of the disclosure includes the method according to statement 100, wherein adding the entry to the linked list data structure includes:
establishing a null reference from the entry; and
establishing a reference from a second entry in the linked list data structure to the entry.

Statement 102. An embodiment of the disclosure includes the method according to statement 100, wherein adding the entry to the linked list data structure includes establishing a tail pointer of the linked list data structure to the entry.

Statement 103. An embodiment of the disclosure includes the method according to statement 87, further comprising:
retrieving the command by the storage device;
accessing the timestamp from the entry;
executing the command to produce a result;
determining a second timestamp based at least in part on the result;
determining an age of the command based at least in part on the timestamp and the second timestamp;
returning the result to the host from the storage device; and
returning the age of the command to the host from the storage device.

Statement 104. An embodiment of the disclosure includes the method according to statement 103, further comprising returning the entry to the pool of entries.

Statement 105. An embodiment of the disclosure includes the method according to statement 104, wherein:
the data structure includes a linked list data structure; and
returning the entry to the pool of entries includes establishing a head pointer of the linked list data structure to a second entry based at least in part on the entry.

Statement 106. An embodiment of the disclosure includes the method according to statement 103, further comprising updating the entry based at least in part on executing the command to produce the result.

Statement 107. An embodiment of the disclosure includes the method according to statement 106, wherein:
the entry includes reference including a count or an offset; and
updating the entry based at least in part on executing the command to produce the result includes decrementing (1905) the count or the offset in the entry based at least in part on executing the command to produce the result.

Statement 108. An embodiment of the disclosure includes a method, comprising:
accessing an entry in a data structure on a storage device;
determining a first timestamp from the entry;
determining a second timestamp; and
determining that a timeout has occurred based at least in part on the first timestamp and the second timestamp.

Statement 109. An embodiment of the disclosure includes the method according to statement 108, wherein determining that the timeout has occurred based at least in part on the first timestamp and the second timestamp includes:
determining a threshold;
determining a difference between the first timestamp and the second timestamp; and
determining that the timeout has occurred based at least in part on the difference and the threshold.

Statement 110. An embodiment of the disclosure includes the method according to statement 108, further comprising reporting the timeout to a host from the storage device.

Statement 111. An embodiment of the disclosure includes an article, comprising a non-transitory storage medium, the non-transitory storage medium having stored thereon instructions that, when executed by a machine, result in:
receiving a notification at a storage device from a host that a command is available;
determining a timestamp based at least in part on the notification;
selecting an entry from a pool of entries in a storage on the storage device;
storing the timestamp in the entry;
associating the command with the entry; and
adding the entry to a data structure on the storage device.

Statement 112. An embodiment of the disclosure includes the article according to statement 111, wherein receiving the notification at the storage device from the host that the command is available includes receiving a doorbell event at the storage device from the host.

Statement 113. An embodiment of the disclosure includes the article according to statement 112, wherein receiving the doorbell event at the storage device from the host includes receiving an update to a tail pointer from the host.

Statement 114. An embodiment of the disclosure includes the article according to statement 111, wherein associating the command with the entry includes establishing a reference from the entry to the command.

Statement 115. An embodiment of the disclosure includes the article according to statement 114, wherein establishing the reference from the entry to the command includes establishing the reference from the entry to the command in a submission queue, the host including the submission queue.

Statement 116. An embodiment of the disclosure includes the article according to statement 115, wherein:
the host further includes a second submission queue;
the data structure is associated with the submission queue; and
the storage device includes a second data structure associated with the second submission queue.

Statement 117. An embodiment of the disclosure includes the article according to statement 116, the non-transitory storage medium having stored thereon further instructions that, when executed by the machine, result in:
receiving a second notification at the storage device from the host that a second command is available, the second command in the second submission queue;
determining a second timestamp based at least in part on the second notification;
selecting a second entry from the pool of entries in the storage on the storage device;
storing the second timestamp in the second entry;
associating the second command with the second entry; and
adding the second entry to the second data structure on the storage device.

Statement 118. An embodiment of the disclosure includes the article according to statement 114, wherein establishing the reference from the entry to the command includes storing an index identifying an element in a submission queue including the command, the host including the submission queue.

Statement 119. An embodiment of the disclosure includes the article according to statement 111, wherein selecting the entry from the pool of entries in a storage on the storage device includes initializing the entry.

Statement 120. An embodiment of the disclosure includes the article according to statement 119, wherein initializing the entry includes clearing a reference in the entry.

Statement 121. An embodiment of the disclosure includes the article according to statement 111, wherein adding the entry to a data structure on the storage device includes adding the entry to a linked list data structure.

Statement 122. An embodiment of the disclosure includes the article according to statement 121, wherein adding the entry to the linked list data structure includes:
establishing a null reference from the entry; and
establishing a reference from a second entry in the linked list data structure to the entry.

Statement 123. An embodiment of the disclosure includes the article according to statement 121, wherein adding the entry to the linked list data structure includes establishing a tail pointer of the linked list data structure to the entry.

Statement 124. An embodiment of the disclosure includes the article according to statement 111, the non-transitory storage medium having stored thereon further instructions that, when executed by the machine, result in:
retrieving the command by the storage device;
accessing the timestamp from the entry;
executing the command to produce a result;
determining a second timestamp based at least in part on the result;
determining an age of the command based at least in part on the timestamp and the second timestamp;
returning the result to the host from the storage device; and
returning the age of the command to the host from the storage device.

Statement 125. An embodiment of the disclosure includes the article according to statement 124, the non-transitory storage medium having stored thereon further instructions that, when executed by the machine, result in returning the entry to the pool of entries.

Statement 126. An embodiment of the disclosure includes the article according to statement 125, wherein:
the data structure includes a linked list data structure; and
returning the entry to the pool of entries includes establishing a head pointer of the linked list data structure to a second entry based at least in part on the entry.

Statement 127. An embodiment of the disclosure includes the method according to statement 124, further comprising updating the entry based at least in part on executing the command to produce the result.

Statement 128. An embodiment of the disclosure includes the method according to statement 127, wherein:
the entry includes a reference including a count or an offset; and
updating the entry based at least in part on executing the command to produce the result includes decrementing (1905) the count or the offset in the entry based at least in part on executing the command to produce the result.

Statement 129. An embodiment of the disclosure includes an article, comprising a non-transitory storage medium, the non-transitory storage medium having stored thereon instructions that, when executed by a machine, result in:
receiving a notification at a storage device from a host that a first command is available;
determining that a pool of entries is empty;
identifying an entry in a data structure, the entry associated with a second command; and
associating the first command with the entry.

Statement 130. An embodiment of the disclosure includes the article according to statement 129, wherein receiving the notification at the storage device from the host that the first command is available includes receiving a doorbell event at the storage device from the host.

Statement 131. An embodiment of the disclosure includes the article according to statement 130, wherein receiving the doorbell event at the storage device from the host includes receiving an update to a tail pointer from the host.

Statement 132. An embodiment of the disclosure includes the article according to statement 129, wherein identifying the entry in the data structure includes:
determining that the entry is available; and
storing a timestamp in the entry.

Statement 133. An embodiment of the disclosure includes the article according to statement 132, wherein associating the first command with the entry includes associating the first command and a third command with the entry.

Statement 134. An embodiment of the disclosure includes the article according to statement 132, wherein associating the first command with the entry includes establishing a reference from the entry to the first command.

Statement 135. An embodiment of the disclosure includes the article according to statement 134, wherein establishing the reference from the entry to the first command includes establishing the reference from the entry to the first command in a submission queue, the host including the submission queue.

Statement 136. An embodiment of the disclosure includes the article according to statement 134, wherein establishing the reference from the entry to the first command includes storing an index identifying an element in a submission queue including the first command, the host including the submission queue.

Statement 137. An embodiment of the disclosure includes the article according to statement 132, wherein identifying the entry in the data structure further includes identifying the entry in a linked list data structure.

Statement 138. An embodiment of the disclosure includes the article according to statement 137, wherein associating the first command with the entry includes moving the entry to an end of the linked list data structure.

Statement 139. An embodiment of the disclosure includes the article according to statement 137, wherein associating the first command with the entry includes:
 establishing a null reference from the entry; and
 establishing a reference from a second entry in the linked list data structure to the entry.

Statement 140. An embodiment of the disclosure includes the article according to statement 137, wherein associating the first command with the entry includes establishing a tail pointer of the linked list data structure to the entry.

Statement 141. An embodiment of the disclosure includes the article according to statement 132, wherein receiving the notification at the storage device from the host that the first command is available includes determining the timestamp for the first command.

Statement 142. An embodiment of the disclosure includes the article according to statement 141, wherein determining the timestamp for the first command includes determining the timestamp based at least in part on receiving the notification at the storage device from the host that the first command is available.

Statement 143. An embodiment of the disclosure includes the article according to statement 141, wherein:
 the non-transitory storage medium has stored thereon further instructions that, when executed by the machine, result in retrieving the command; and
 determining the timestamp for the first command includes determining the timestamp based at least in part on retrieving the command.

Statement 144. An embodiment of the disclosure includes the article according to statement 129, wherein identifying the entry in the data structure includes:
 identifying the second command; and
 identifying the entry in the data structure based at least in part on the second command.

Statement 145. An embodiment of the disclosure includes the article according to statement 144, wherein the entry includes a timestamp based at least in part on the second command.

Statement 146. An embodiment of the disclosure includes the article according to statement 144, wherein identifying the entry in the data structure based at least in part on the second command further includes identifying the entry in a linked list data structure based at least in part on the second command.

Statement 147. An embodiment of the disclosure includes the article according to statement 144, the non-transitory storage medium having stored thereon further instructions that, when executed by the machine, result in:

retrieving a third command by the storage device;
accessing a second entry associated with the third command;
copying a first timestamp in the second entry and a reference in the second entry to a submission queue descriptor;
returning the second entry to the pool of entries;
executing the third command to produce a result;
determining a second timestamp based at least in part on the result;
determining an age for the third command based at least in part on the first timestamp and the second timestamp;
returning the result to the host from the storage device; and
returning the age for the third command to the host from the storage device.

Statement 148. An embodiment of the disclosure includes the article according to statement 147, wherein copying the first timestamp in the second entry and the reference in the second entry to a submission queue descriptor includes copying the first timestamp in the second entry and an index identifying an element in a submission queue including the command in the second entry to a submission queue descriptor, the host including the submission queue.

Statement 149. An embodiment of the disclosure includes the method according to statement 147, further comprising updating the submission queue descriptor based at least in part on executing the third command to produce the result.

Statement 150. An embodiment of the disclosure includes the method according to statement 149, wherein:
 the reference includes a count or an offset; and
 updating submission queue descriptor based at least in part on executing the third command to produce the result includes decrementing (1905) the count or the offset in the submission queue descriptor based at least in part on executing the third command to produce the result.

Statement 151. An embodiment of the disclosure includes an article, comprising a non-transitory storage medium, the non-transitory storage medium having stored thereon instructions that, when executed by a machine, result in:
 receiving a notification at a storage device from a host that a command is available;
 determining that a pool of entries is empty;
 determining a timestamp based at least in part on receiving the notification;
 storing the timestamp in a buffer; and
 associating the command with the buffer.

Statement 152. An embodiment of the disclosure includes the article according to statement 151, wherein receiving the notification at the storage device from the host that the command is available includes receiving a doorbell event at the storage device from the host.

Statement 153. An embodiment of the disclosure includes the article according to statement 152, wherein receiving the doorbell event at the storage device from the host includes receiving an update to a tail pointer from the host.

Statement 154. An embodiment of the disclosure includes the article according to statement 151, wherein associating the command with the buffer includes establishing a reference from the buffer to the command.

Statement 155. An embodiment of the disclosure includes the article according to statement 154, wherein establishing the reference from the buffer to the command includes establishing the reference from the buffer to the command in a submission queue, the host including the submission queue.

Statement 156. An embodiment of the disclosure includes the article according to statement 154, wherein establishing the reference from the buffer to the command in the submission queue includes storing an index identifying an element in the submission queue including the command.

Statement 157. An embodiment of the disclosure includes the article according to statement 151, the non-transitory storage medium having stored thereon further instructions that, when executed by the machine, result in:
receiving a second notification at the storage device from the host that a second command is available;
determining that the pool of entries is empty;
determining a second timestamp based at least in part on receiving the second notification;
storing the second timestamp in a second buffer; and
associating the second command with the second buffer.

Statement 158. An embodiment of the disclosure includes the article according to statement 157, wherein associating the second command with the second buffer includes establishing a reference from the second buffer to the second command in a submission queue, the host including the submission queue.

Statement 159. An embodiment of the disclosure includes the article according to statement 158, wherein establishing the reference from the second buffer to the second command in the submission queue includes storing an index identifying an element in the submission queue including the second command.

Statement 160. An embodiment of the disclosure includes the article according to statement 157, wherein:
the command is in a submission queue, the host including the submission queue; and
the second command is in the submission queue.

Statement 161. An embodiment of the disclosure includes the article according to statement 157, wherein:
the command is in a submission queue, the host including the submission queue; and
the second command is in a second submission queue, the host including the second submission queue.

Statement 162. An embodiment of the disclosure includes an article, comprising a non-transitory storage medium, the non-transitory storage medium having stored thereon instructions that, when executed by a machine, result in:
starting a time window on a storage device;
receiving a notification at the storage device from a host that a first command is available during the time window;
selecting an entry from a pool of entries in a storage on the storage device;
storing a timestamp in the entry, the timestamp associated with the time window;
associating the command with the entry;
adding the entry to a data structure on the storage device; and
ending the time window on the storage device.

Statement 163. An embodiment of the disclosure includes the article according to statement 162, wherein the timestamp includes at least one of a start time for the time window or an end time for the time window.

Statement 164. An embodiment of the disclosure includes the article according to statement 162, wherein receiving the notification at the storage device from the host that the command is available includes receiving a doorbell event at the storage device from the host.

Statement 165. An embodiment of the disclosure includes the article according to statement 166, wherein receiving the doorbell event at the storage device from the host includes receiving an update to a tail pointer from the host.

Statement 166. An embodiment of the disclosure includes the article according to statement 162, the non-transitory storage medium having stored thereon further instructions that, when executed by the machine, result in:
receiving a second notification at the storage device from the host that a second command is available during the time window.
associating the second command with the entry.

Statement 167. An embodiment of the disclosure includes the article according to statement 162, wherein associating the command with the entry includes establishing a reference from the entry to the command.

Statement 168. An embodiment of the disclosure includes the article according to statement 167, wherein establishing the reference from the entry to the command includes establishing the reference from the entry to the command in a submission queue, the host including the submission queue.

Statement 169. An embodiment of the disclosure includes the article according to statement 168, wherein establishing the reference from the entry to the command in the submission queue includes storing an index identifying an element in the submission queue including the command, the host including the submission queue.

Statement 170. An embodiment of the disclosure includes the article according to statement 167, wherein:
the host further includes a second submission queue;
the data structure is associated with the submission queue; and
the storage device includes a second data structure associated with the second submission queue.

Statement 171. An embodiment of the disclosure includes the article according to statement 170, the non-transitory storage medium having stored thereon further instructions that, when executed by the machine, result in:
starting a second time window on the storage device;
receiving a second notification at the storage device from the host that a second command is available during the second time window;
selecting a second entry from the pool of entries in the storage on the storage device;
storing a second timestamp in the second entry;
associating the second command with the second entry;
adding the second entry to the second data structure on the storage device; and
ending the second time window on the storage device.

Statement 172. An embodiment of the disclosure includes the article according to statement 171, wherein the first time window is the second time window.

Statement 173. An embodiment of the disclosure includes the article according to statement 162, wherein selecting the entry from the pool of entries in a storage on the storage device includes initializing the entry.

Statement 174. An embodiment of the disclosure includes the article according to statement 173, wherein initializing the entry includes clearing a reference in the entry.

Statement 175. An embodiment of the disclosure includes the article according to statement 162, wherein adding the entry to a data structure on the storage device includes adding the entry to a linked list data structure.

Statement 176. An embodiment of the disclosure includes the article according to statement 175, wherein adding the entry to the linked list data structure includes:
establishing a null reference from the entry; and establishing a reference from a second entry in the linked list data structure to the entry.

Statement 177. An embodiment of the disclosure includes the article according to statement 175, wherein adding the entry to the linked list data structure includes establishing a tail pointer of the linked list data structure to the entry.

Statement 178. An embodiment of the disclosure includes the article according to statement 162, the non-transitory storage medium having stored thereon further instructions that, when executed by the machine, result in:
retrieving the command by the storage device;
accessing the timestamp from the entry;
executing the command to produce a result;
determining a second timestamp based at least in part on the result;
determining an age of the command based at least in part on the timestamp and the second timestamp;
returning the result to the host from the storage device; and
returning the age of the command to the host from the storage device.

Statement 179. An embodiment of the disclosure includes the article according to statement 178, the non-transitory storage medium having stored thereon further instructions that, when executed by the machine, result in returning the entry to the pool of entries.

Statement 180. An embodiment of the disclosure includes the article according to statement 179, wherein:
the data structure includes a linked list data structure; and
returning the entry to the pool of entries includes establishing a head pointer of the linked list data structure to a second entry based at least in part on the entry.

Statement 181. An embodiment of the disclosure includes the method according to statement 178, further comprising updating the entry based at least in part on executing the command to produce the result.

Statement 182. An embodiment of the disclosure includes the method according to statement 181, wherein:
the entry includes reference including a count or an offset; and
updating the entry based at least in part on executing the command to produce the result includes decrementing (1905) the count or the offset in the entry based at least in part on executing the command to produce the result.

Statement 183. An embodiment of the disclosure includes an article, comprising a non-transitory storage medium, the non-transitory storage medium having stored thereon instructions that, when executed by a machine, result in:
accessing an entry in a data structure on a storage device;
determining a first timestamp from the entry;
determining a second timestamp; and
determining that a timeout has occurred based at least in part on the first timestamp and the second timestamp.

Statement 184. An embodiment of the disclosure includes the article according to statement 183, wherein determining that the timeout has occurred based at least in part on the first timestamp and the second timestamp includes:
determining a threshold;
determining a difference between the first timestamp and the second timestamp; and
determining that the timeout has occurred based at least in part on the difference and the threshold.

Statement 185. An embodiment of the disclosure includes the article according to statement 183, the non-transitory storage medium having stored thereon further instructions that, when executed by the machine, result in reporting the timeout to a host from the storage device.

Consequently, in view of the wide variety of permutations to the embodiments described herein, this detailed description and accompanying material is intended to be illustrative only, and should not be taken as limiting the scope of the disclosure. What is claimed as the disclosure, therefore, is all such modifications as may come within the scope and spirit of the following claims and equivalents thereto.

What is claimed is:

1. A storage device, comprising:
a first storage for a data;
an interface to access a command from a host, the command applicable to the data;
a submission queue descriptor;
a controller to execute the command; and
a second storage for an entry, the entry including a first data field for a timestamp and a second data field for an indication of a location of the command,
wherein the controller is configured to copy the timestamp and a reference from the entry to the submission queue descriptor and to return the entry to a pool of entries based at least in part on the controller executing the command.

2. The storage device according to claim 1, wherein the second storage includes:
a data structure, the data structure including the entry; and
a pool of entries, the pool of entries including a second entry, the second entry configured to be added to the data structure.

3. The storage device according to claim 1, wherein the second storage includes:
a first data structure, the first data structure including the entry; and
a second data structure, the second data structure including a second entry.

4. The storage device according to claim 1, wherein the storage device is configured to receive a notification from the host that the command is available.

5. The storage device according to claim 1, wherein the controller is configured to return the entry to a pool of entries based at least in part on executing the command.

6. The storage device according to claim 1, further comprising an age calculator to determine an age of the command based at least in part on the timestamp in the first data field in the entry and a second timestamp.

7. The storage device according to claim 1, wherein the controller includes a timeout detector to determine that a timeout has occurred based at least in part on the entry.

8. The storage device according to claim 1, further comprising a buffer, the buffer including a third data field for a second timestamp, the buffer associated with a second command.

9. The storage device according to claim 1, wherein the second data field includes a pointer to the command.

10. A method, comprising:
receiving a notification at a storage device from a host that a command is available;
determining a timestamp based at least in part on the notification;
selecting an entry from a pool of entries in a storage on the storage device;
storing the timestamp in the entry;
associating the command with the entry;
adding the entry to a data structure on the storage device;
copying the timestamp from the entry into a submission queue descriptor;
associating the command with the submission queue descriptor; and returning the entry to the pool of entries in the storage on the storage device.

11. The method according to claim 10, wherein associating the command with the entry includes establishing an indication of a location of the command in the entry.

12. The method according to claim 10, wherein adding the entry to a data structure on the storage device includes adding the entry to a linked list data structure.

13. The method according to claim 10, further comprising:
retrieving the command;
accessing the timestamp from the submission queue descriptor;
executing the command to produce a result;
determining a second timestamp based at least in part on the result;
determining an age of the command based at least in part on the timestamp and the second timestamp;
returning the result to the host from the storage device; and
returning the age of the command to the host from the storage device.

14. The method according to claim 13, further comprising updating the submission queue descriptor based at least in part on executing the command to produce the result.

15. A method, comprising:
receiving a notification at a storage device from a host that a first command is available;
determining that a pool is empty, the pool configured to include entries for use with a data structure;
identifying an entry in the data structure, the entry associated with a second command;
associating the first command with the entry;
retrieving a third command by the storage device;
accessing a second entry associated with the third command;
copying a first timestamp in the second entry and a reference in the second entry to a submission queue descriptor; and
returning the second entry to the pool of entries.

16. The method according to claim 15, wherein identifying the entry in the data structure includes:
determining that the entry is available; and
storing a timestamp in the entry.

17. The method according to claim 16, wherein associating the first command with the entry includes establishing an indication of a location of the first command in the entry.

18. The method according to claim 16, wherein:
identifying the entry in the data structure further includes identifying the entry in a linked list data structure; and
associating the first command with the entry includes moving the entry to an end of the linked list data structure.

19. The method according to claim 15, wherein identifying the entry in the data structure includes:
identifying the second command; and
identifying the entry in the data structure based at least in part on the second command.

20. The method according to claim 19, further comprising:
executing the second command to produce a result;
determining a second timestamp based at least in part on the result;
determining an age for the second command based at least in part on the first timestamp and the second timestamp;
returning the result to the host from the storage device; and
returning the age for the second command to the host from the storage device.

* * * * *